United States Patent [19]
Schipper et al.

[11] Patent Number: 5,754,657
[45] Date of Patent: May 19, 1998

[54] AUTHENTICATION OF A MESSAGE SOURCE

[75] Inventors: John F. Schipper, Palo Alto; Peter V. W. Loomis, Sunnyvale; Allan M. Pelley, Milpitas; James M. Janky, Los Altos; Len Sheynblat, Belmont, all of Calif.

[73] Assignee: Trimble Navigation Limited, Sunnyvale, Calif.

[21] Appl. No.: 815,370

[22] Filed: Mar. 10, 1997

Related U.S. Application Data

[63] Continuation of Ser. No. 521,661, Aug. 31, 1995, abandoned.

[51] Int. Cl.$^6$ ............................................. H04L 9/00
[52] U.S. Cl. .............................. 380/25; 380/4; 342/357
[58] Field of Search .................. 380/4, 9, 25, 24, 380/49; 340/825.34; 342/357

[56] References Cited

U.S. PATENT DOCUMENTS

| | | | |
|---|---|---|---|
| 3,665,086 | 5/1972 | Magee . | |
| 4,418,425 | 11/1983 | Fennel et al. . | |
| 4,463,357 | 7/1984 | MacDoran | 343/460 |
| 4,709,266 | 11/1987 | Hanas et al. | 380/20 |
| 4,860,352 | 8/1989 | Laurance et al. | 380/20 |
| 4,887,296 | 12/1989 | Horne | 380/21 |
| 4,916,737 | 4/1990 | Chomet et al. | 380/20 |
| 4,972,431 | 11/1990 | Keegan | 380/4 |
| 4,993,067 | 2/1991 | Leopold | 380/21 |
| 5,045,861 | 9/1991 | Duffet-Smith | 342/457 |
| 5,115,467 | 5/1992 | Esserman et al. | 380/44 |
| 5,191,613 | 3/1993 | Graziano et al. | 380/25 |
| 5,221,925 | 6/1993 | Cross . | |
| 5,237,612 | 8/1993 | Raith | 380/23 |
| 5,243,652 | 9/1993 | Teare et al. | 380/25 |
| 5,247,575 | 9/1993 | Sprague et al. | 380/9 |
| 5,276,735 | 1/1994 | Boebert et al. | 380/25 |
| 5,321,753 | 6/1994 | Gritton | 380/42 |
| 5,323,322 | 6/1994 | Mueller et al. | 364/449 |
| 5,343,529 | 8/1994 | Goldfine | 380/24 |
| 5,347,580 | 9/1994 | Molva et al. | 380/25 |
| 5,349,459 | 9/1994 | Reed . | |
| 5,363,448 | 11/1994 | Koopman et al. | 380/25 |
| 5,379,224 | 1/1995 | Brown et al. | 364/449 |
| 5,382,957 | 1/1995 | Blume | 342/43 |
| 5,384,846 | 1/1995 | Berson et al. | 380/23 |
| 5,388,158 | 2/1995 | Berson et al. | 380/23 |
| 5,535,278 | 7/1996 | Cahn et al. | 380/49 |

OTHER PUBLICATIONS

B. Hoffman-Wellenhof et al. *Global Positioning System*, Springer Verlag, 1994, pp. 20, 77–79, 86–87.

GPS Interface Control Document ICD–GPS–200, Rockwell International Corp., Satellite Systems Division, Revision B–PR, Jul. 3, 1991.

Tom Logsdon, *The NAVSTAR Global Positioning System*, Van Nostrand Reinhold, New York, 1992, pp. 1–90.

*Loran–C User Handbook*, Department of transportation, U.S. Coast Guard, Commandant Publication P16562.5, Nov. 18, 1992 (ISBN 0–16–041594–2).

*Primary Examiner*—Salvatore Cangialosi
*Attorney, Agent, or Firm*—John F. Schipper

[57] ABSTRACT

Methods for authentication or validation of the location of a putative source (ps) of a message, using time varying location determination (LD) signals that are received from J sources (J>1) of LD signals $G(t;j;ps)$ that are spaced apart from the putative source. The putative source forms an augmented data signal that includes the original message, one or more segments $g[t_{k(m)}, t_{k(m+1)}; j; ps] = \{G(t,j;ps)|t_{k(m)} \leq t_r \leq t_{k(m+1)}\}$ of the LD signals for a selected time interval, a putative source asserted location $L(t''_{k(m)};ps)$ for a time $t''_{k(m)}$ in the selected time interval, and other identifying parameters. The augmented data signal is received by a central station that analyzes the LD signal segments and determines whether the asserted location $L(t''_{k(m)};ps)$ is likely to be the true message source location. Part or all of the augmented data signal can be encrypted for transmission. One application is validation of use of licensed software on a computer whose location may be mobile. Another application is validation of votes cast from a plurality of remote voting sites.

42 Claims, 31 Drawing Sheets

AUTHENTICATION OF A MESSAGE SOURCE

This application is a continuation of application Ser. No. 08/521,661, filed Aug. 31, 1995, now abandoned.

FIELD OF THE INVENTION

This invention relates to authentication or validation of the source or source location and time of transmission of an electronically transmitted message by examination of attributes associated with the location.

BACKGROUND OF THE INVENTION

The parallel development of telecommunications and of computers over the last 25 years has allowed an awesome increase in data throughput and data analysis. Much of the business information that was once hand delivered by a known and trusted intermediary is now delivered electronically. For example, the Internal Revenue Service now encourages electronic filing of tax returns and related information and provides facilities for no-cost data transmission in some instances. Financial transactions, such as funds transfer and payment of invoices, are now routinely handled by electronic messaging. Electronic offices, both mobile and stationary, are now commonplace, along with cellular telephones, mobile facsimile machines and other accoutrements of this new age.

Unfortunately, this rise in computer power and data transmission power has brought an increase in the possibility of electronic mischief, unintentional and intentional, benign and injurious. A transmitter of an encrypted message is usually concerned with (1) delivery of the message only to its intended recipient(s) and (2) encryption of the message so that a message received by an unintended recipient cannot be decrypted to become privy to the intelligence contained in the message. However, the recipient of this message has somewhat different concerns, including a means of verifying that the message received was, in fact, transmitted by the putative sender. The message transmitter is concerned with secrecy and selectivity of the message recipients. The intended recipient is concerned with receiving and taking appropriate action only on messages for which the putative message source is the true or authentic source. If the putative source is not the actual source, the message may contain selective disinformation, intended to mislead the recipient or to cause the recipient to take action that the recipient would not otherwise take. For example, the Time magazine issue for 26 Jun. 1995, on page 65, reports some of the problems faced by Internet participants who are receiving fake e-mail messages, transmitted by someone other than the asserted sender of such messages.

Relatively few workers in electronic communications have seriously considered approaches for authenticating the putative source of a message that is delivered electronically or by some means other than a trusted intermediary. Encryption using destination addresses using a TDMA satellite communications system is disclosed in U.S. Pat. No. 4,418,415, issued to Fennel et al. A common encryption/decryption key is held by all authorized users of a network. This key is EXclusively ORed with the specified destination address, and the output (digital) signal is passed through an encryption engine, on the satellite and at the intended ground-based receiver, using the same key or another key. The encryption engine output signal is then combined with the channel data to be transmitted in another EXclusive OR circuit and transmitted to the network users. Each of the receivers receives the message and reverses the encryption process, using its own destination address as part of the decryption key. However, only the (single) intended receiver produces a cleartext message that is comprehensible.

Hanas et al. in U.S. Pat. No. 4,709,266, disclose use of a satellite scrambling network to provide messages that are scrambled or encrypted differently for different geographical regions. This is useful for distributing scrambled video, voice and data subscriber messages. A master uplink message (ground-to-satellite) is used to control the scrambling or encryption commands that determine the scrambling applied to each geographical area and/or to groups of individual subscribers.

In U.S. Pat. No. 4,860,352, Laurance et al disclose a satellite communication system that provides authentication of a data transmission based upon the location of the data transmitter, as determined by the satellite communication system itself. The message sender transmits a message and the sender's location to a satellite, which retransmits the message and sender location to a ground-based receiver that compares the sender's stated location with the known location for the putative source of the message. Optionally, the message and/or the sender location are encrypted. If the two sets of transmitter location information agree, the message and its source are accepted as valid or authenticated. If the the two sets of such information do not agree, the receiver discards the remainder of this message as originating from an invalid sender. The message originator may be stationary or mobile. In one embodiment, a mobile message originator sends its present location and its location at the time the preceding message was sent, in encrypted text. A receiver receives the preceding location information and compares this with the known preceding location to verify or refute the preceding location of the putative source. In a second embodiment, three spaced apart satellites receive the same message and, based upon differences in time of receipt, determine the present location of the message originator. The message and this present location information are transmitted to a ground-based receiver, which compares the originator's present location with the known preceding location of the message originator, to verify or refute (within certain geographical limits) that the message originator is the putative source of the message. Some of the embodiments appear to require foreknowledge of the location, as a function of time, of the authentic message originator.

The inventors in the Laurance et al patent distinguish between (1) an "active attack," whereby an unauthorized person or the (faulty) transmission channel itself receives and alters the message and subsequently causes the message to be delivered to the recipient, and (2) a "passive attack," whereby an unauthorized person receives but does not alter the message that is delivered to the recipient. A third type of attack may be characterized as origination of a fraudulent message by a non-legitimate source, where the putative message source is not the actual message source. Active and passive attacks have traditionally been combated by message encryption. Once the encryption method is broken and available for use by an unauthorized person, that encryption scheme is less than useless. Successfully combating an active attack and/or fraudulent origination requires more than message encryption: the message source must be authenticated and/or the received message must be verified as unaltered after its transmission by the putative source.

Horne, in U.S. Pat. No. 4,887,296, discloses a three-key cryptographic system for a direct broadcast satellite system, to be used in video broadcasting to a plurality of ground-based receivers, each having a unique address number. A signature key, which is an encryption using the address number for that receiver, is stored in the receiver at the time of manufacturing. At the transmitter, a common key is encrypted, using the unique signature key for a receiver that is targeted for a portion of the message to be transmitted. The data stream contains message portions intended for all receivers and message portions intended for, and decryptable only by, individual receivers. A target receiver decrypts its messages, using the common key and signature key used by the transmitter to encrypt the receiver's portions of the message.

U.S. Pat. No. 4,916,737, issued to Chomet et al, discloses an anti-piracy television program scrambling/descrambling system that allows the encryption/decryption code to be changed periodically (e.g., once per month) by communication from the head end or central station. The receiver's decryption unit has an unalterable ROM portion, containing its unique serial or address number, and an EPROM portion, containing an alterable ROM portion with a look-up table that can be changed by receipt of special signals from the head end.

U.S. Pat. No. 4,993,067, issued to Leopold, discloses a secure satellite-ground communication system that provides over-the-air encryption rekeying. A message transmitted from a proper ground station to the satellite must contain the ground station location. If the location of the ground station is not included in the message, or if this location is included but is not on an approved list maintained by the satellite, the received message is discarded. If the ground station location is acceptable, the satellite accepts the message and rekeys itself according to the rekeying information contained in the remainder of the message. This approach appears to require that the ground stations on the approved list be stationary.

Signal encryption apparatus that uses a common data key component and a specialized data key component, for a plurality of communicating sites, is disclosed in U.S. Pat. No. 5,115,467, issued to Esserman et al. The specialized data include distinct parameter values that are associated with only one communicating site. The encryption generating key depends upon the common data key component and upon the specialized data key component so that the encryption key used for each site may be distinguishable. The invention is useful in receipt and processing of television signals generated at a plurality of fixed sites.

Graziano et al, in U.S. Pat. No. 5,191,613, disclose a knowledge-based system for the electronic equivalent of signature authentication of a document, such as an agreement, transmitted from a sender to a recipient.

The document, in electronic form, is temporarily locked into a computer memory so that no modifications can be made to the document or its format. Each of the document signatories then applies its own tests and comparisons to verify electronically that the document is authentic and unaltered. After this authentication process, each signatory affixes its electronically-based signature to the document to activate the terms of the agreement.

In U.S. Pat. No. 5,221,925, Cross discloses a location interrogation system in which a mobile unit, upon receipt of an interrogation signal, transmits its present location in a conventionally encoded format to a central station that has issued the interrogation signal, to assist in tracking the mobile unit.

A verification procedure for mobile stations in a cellular network is disclosed by Raith in U.S. Pat. No. 5,237,612. In response to receipt of a random challenge signal or interrogation, the mobile station transmits to the central station a first response signal, depending only upon an unchanging, commonly-held encryption key, and a second response signal, dependent upon a changeable encryption key. The first and second response signals are analyzed by an authentication algorithm to authenticate, or deny authentication to, the putative mobile station.

U.S. Pat. No. 5,243,652, issued to Teare et al, discloses a communication system for control of access to a location-sensitive remote database. A central station stores and transmits encrypted television material whose encryption key is available only for a viewers in a specified geographical area, as determined by a GPS or Loran location determination system. A secure version of the location history of the mobile user is transmitted to a central facility and compared with the known location history of this user. If the two histories agree, the identity of the user is confirmed, and a decryption key associated with this location history is transmitted to the user, for use in decrypting the encrypted television transmission.

Transmission of encrypted information packages from a central site to a remote site, in response to receipt of a request for specified information from that site, is disclosed in U.S. Pat. No. 5,247,575, issued to Sprague et al. The encryption key is changed periodically (e.g., weekly), but does not depend upon any past information.

A secure communication system for static information is disclosed in U.S. Pat. No. 5,321,753, issued to Gritton. The message transmitted includes a 10-bit static first data field and a 54-bit second data field that changes from one transmission to the next. The 64-bit first and second data fields are encrypted and transmitted to a remote message reader that receives, decrypts and reads the transmitted message.

Goldfine et al disclose a financial or telephone service transaction authentication system, in U.S. Pat. No. 5,343,529, in which any attempt to gain access to a protected system is thereafter answered and controlled by a centralized authentication agency. In response, the agency issues an identification request, requesting information that is unique to that request; a subsequent attempt by that person to gain access would require submission of different information. If the information supplied by the access seeker matches the information on file, the access seeker identity is authenticated and access is granted.

In U.S. Pat. No. 5,347,580, Molva et al disclose an authentication method using a smartcard to encrypt the presently displayed time with a cryptographically strong key. A public work station receives the encrypted time message, generates one or more values from this message, and further encrypts and/or transmits these values to a server station. The server station uses the received values to authenticate the holder of the smartcard and to accept or reject a message-or command from the holder.

A remote control transmitter-receiver pair that cooperatively implement a code transmission sequence that minimizes energy use and protects the communication channel from unauthorized access is disclosed in U.S. Pat. No. 5,349,459, issued to Reed. The transmitter issues a specified sequence of start/stop pulses of different lengths, similar to pulse code modulation, which are received by the receiver and compared with a copy of this sequence. If the sequences agree, the receiver authenticates the transmitter and opens the secured channel to receive the remainder of the message.

Generation of two pseudorandom numbers, each generated by an independently chosen number of iterations, is the basis for a cryptographic authentication system disclosed by Koopman et al in U.S. Pat. No. 5,363,448. The two pseudorandom numbers are concatenated and encrypted into a single word. This word is transmitted by or on behalf of a person seeking access to a protected system, and the word is decrypted and deconcatenated to produce the two pseudorandom numbers, for comparison and authentication purposes. Immediately after the concatenated and encrypted word is received, the receiving system locks out receipt of any additional signals for a selected time interval, such as 0.5 sec. Thus, breach of the protected system by rapid, exhaustive, numerical trials is made difficult or impossible.

Blume discloses a system to allow a space platform to distinguish between a friendly object and an unfriendly object in U.S. Pat. No. 5,382,957. The platform, which includes a GPS receiver/processor and antenna, transmits an encrypted interrogation signal to the object, which can be positioned tens or hundreds of kilometers from the platform, requesting certain information including the location coordinates of the object.

Simultaneously, the platform uses high directivity radar and line of sight measurements to estimate the object range and the object location coordinates, using the platform's GPS-based knowledge of its own location. A friendly object will reply to the encrypted interrogation signal with an authenticating reply, including the GPS-determined location coordinates of the object. A receiver on the platform receives the object location coordinates from the object and compares these coordinates with its own estimate of the object location coordinates. If the object-supplied object location is within a determinable distance of the platform-supplied object location and all other authenticating replies from the object are appropriate, the platform authenticates the object as a "friendly" object.

In U.S. Pat. Nos. 5,384,846 and 5,388,158, Berson et al disclose methods for authentication of an identification card and the holder thereof.

Several physical or other characteristics of the bona fide holder of the card are encrypted and recorded on a magnetic strip on the card, using a public key encryption scheme in which the key is changed from time to time. When the card is presented, the magnetic strip information is reproduced and compared with the corresponding characteristics of the card holder, to verify or refute the putative identity of the card holder. In another embodiment, the contents of a document are compressed, encrypted, encoded and placed on a two-dimensional bar code label for the document, for subsequent decryption and authentication of the document by reversing the process for the information on the label.

A GPS tracking system for a mobile station with physical sensors, relying upon receipt of unprocessed GPS signals that are initially received by the mobile station, is disclosed in U.S. Pat. No. 5,379,224, issued to Brown et al. Segments of the GPS signals received and time stamps are interleaved with sensor measurements of physical data and are transmitted to and processed by a central processing station, for estimation of the location of the mobile station at the time value given by the time stamp, and for examination of the physical sensor data. The GPS signals received from the mobile station are used for location determination, not for authentication of the asserted location of the central station.

These inventions usually rely upon some unchanging characteristic or combination of characteristics of an entity that seeks access to a protected system or a protected communication channel. The protection offered by these approaches might easily be circumvented for a communication channel that is continually or periodically transmitting information. What is needed is an approach that relies in part on the constantly changing information associated with signals produced by a location determination system, to authenticate or verify the location or identity of one or more of the entities that is transmitting this information. Preferably, the information relied upon for authentication should be accurately available only if this entity occupies the spatial location that would be occupied by a bona fide entity that transmits this information. Preferably, the approach should accept and work with confidential/encrypted signals and/or with signals that are available for use by any user with an appropriate receiver.

SUMMARY OF THE INVENTION

These needs are met by the invention, which provides several approaches for authenticating the source of a message received from a location determination (LD) station or containing LD signal-determined location or velocity or time information. The LD station may be a satellite-based Satellite Positioning System (SATPS) station that receives and processes LD signals, such as a Global Positioning System (GPS) station or a Global Orbiting Navigational Satellite System (GLONASS) station or a Geosynchronous Orbiting Environmental Satellites (GOES) station. Alternatively, the LD station may be a ground-based station that receives and processes LD signals, such as Loran signals, Tacan signals, Decca signals, Omega signals, JTIDS Relnav signals, Personal Location Reporting System (PLRS signals), FM subcarrier signals or other similar LD signals.

A putative source ("ps") of a digital data signal or message $d(t)$, or the putative source location, is to be authenticated or validated. The data signal $d(t)$ is defined at a sequence of times $t=t'_1, t'_2, \ldots, t'_r, t'_{r+1}, \ldots, t'_f$ and is to be sent by the putative source to a data receiving station that is spaced apart from the putative source. The putative source receives a stream of location determination signals $Y(t_r;j)$ or $W(t_r;j)$ or $P(t_r;j)$ or $C(t_r;j)$ from a plurality of LD signal sources, numbered $j=1, 2, \ldots, J$ ($J \geq 1$, preferably $J \geq 3$), at a sequence of times $t=t_1, t_2, \ldots, t_r, t_{r+1}$, and determines an asserted location $L(t''_{k(m)};ps)$ of the putative source, represented by a triple of coordinates $(x(t''_{k(m)};ps), y(t''_{k(m)};ps), z(t''_{k(m)};ps))$, at a location assertion time $t=t''_{k(m)}$ that lies in the range $t_{k(m)} \leq t''_{k(m)} \leq t_{k(m+1)}$. The times $t=t_{k(m)}$ and $t=t_{k(m+1)}$ are two selected, spaced apart times in a selected subsequence of times $\{t_{k(m)}\}_m$ that are part of the time sequence $\{t_r\}_r$ for $m=1, 2, \ldots$.

The putative source forms an augmented data signal $D(d[t'_0, t'_f]; g[t_{k(m)}, t_{k(m+1)}; j=1; ps]; j=1; g[t_{k(m)}, t_{k(m+1)}; j=2; ps]; j=2; \ldots; g[t_{k(m)}, t_{k(m+1)}; j=J; ps]; j=J; t_{k(m)}, t_{k(m+1)}; L(t''_{k(m)}; ps); t''_{k(m)})$ that includes a segment of, or preferably all of, the original data signal values $d(t'_r)$ for the sequence of times $t'_r$ contained in a selected time interval $t'_0 \leq t'_r \leq t'_f$. The augmented data signal also includes segments $g[t_{k(m)}, t_{k(m+1)}; j; ps]$ of unprocessed LD signal values $Y(t_r;j)$ or $W(t_r;j)$ or $P(t_r;j)$ or $C(t_r;j)$, corresponding to the Y-code, the W-code, the P-code or the C/A-code (if the LD signals are GPS or GLONASS signals), for one or more selected time intervals $t_{k(m)} \leq t_r \leq t_{k(m+1)}$ ($m=1, 2, \ldots$), the corresponding LD signal source number $j$, and the times $t=t_{k(m)}$ and $t=t_{k(m+1)}$. The augmented data signal also includes the asserted location $L(t''_{k(m)};ps)$ of the putative source (optional) and the time $t=t''_{k(m)}$ (optional) for which this location is asserted. Here, the location assertion time $t=t''_{k(m)}$ must satisfy $t_{k(m)} \leq t''_{k(m)} \leq t_{k(m+1)}$. The data signal segment $d[t'_0, t'_f]$ may be deleted here if the only goal is authentication of the putative source or its location.

A data receiving station, which is spaced apart from the putative source, also receives the LD signal sequences $\{Y(t_r;j)\}_r$ (or $\{W(t_r;j)\}_r$ or $\{P(t_r;j)\}_r$ or $\{C(t_r;j)\}_r$) from the LD signal sources $j=1, 2, \ldots, J$, but at a sequence of times that may be displaced relative to the times of receipt of the signals $Y(t_r;j)$ at the putative source. The data receiving station receives the augmented data signal from the putative source and compares the LD signal segments $g[t_{k(m)}, t_{k(m)+1}; j; ps]$ ($g=y, w, p$ or $c$, corresponding to the code sequences $Y(t_r;j)$ or $W(t_r;j)$ or $P(t_r;j)$ or $C(t_r;j)$), received from the putative source, with its own estimates $g'[t_{k(m)}, t_{k(m)+1}; j; ps]$ of the corresponding LD signal segments that should have been received at the putative source's asserted location in the time interval $t_{k(m)} \leq t \leq t_{k(m)+1}$. If the LD signal segments $g'[t_{k(m)}, t_{k(m+1)}; j; ps]$ and $g[t_{k(m)}, t_{k(m+1)}; j; ps]$ substantially agree, within an acceptable uncertainty, the putative source of its asserted location $L(t''_{k(m)}; ps)$ of the putative source is authenticated or validated.

Otherwise, validation of putative source, or of its asserted location, is withheld. The augmented data signal may be transmitted as cleartext, or portions of or all of the augmented data signal may be transmitted by the putative source in encrypted form and be decrypted at the data receiving station. If the LD signal sources are GPS (or GLONASS) satellites that transmit GPS (or GLONASS) signals, the LD signals may be (1) encrypted Y-code signals, (2) confidential W-code signals that are combined with unencrypted P-code signals to produce the Y-code signals, (3) P-code signals or (4) C/A-code signals that are transmitted in unencrypted form for civilian use.

Alternatively, the data receiving station can estimate a location $L'(t''_{k(m)}; ps)$ of the putative source, based on the received LD signal segments $g[t_{k(m)}, t_{k(m)+1}; j; ps]$ and its own corresponding LD signal segments $g'[t_{k(m)}, t_{k(m)+1}; j; ps]$, compare the asserted location $L(t''_{k(m)}; ps)$ with its own estimated location $L'(t''_{k(m)}; ps)$, and determine whether to authenticate, or to withhold authentication of, the asserted location $L(t''_{k(m)}; ps)$ of the putative source at the time $t=t'_{k(m)}$.

Alternatively, the data receiving station can estimate a location $L'(t''_{k(m)}; ps)$ of the putative source, based on the received LD signal segments $g[t_{k(m)}, t_{k(m)+1}; j; ps]$, its own corresponding LD signal segments $g'[t_{k(m)}, t_{k(m)+1}; j; ps]$, and its own knowledge of the time varying locations of the LD signal sources (e.g., satellite ephemerides data). This alternative is preferably used with confidential code LD signals, such as Y-code signals or W-code signals, received from non-geosynchronous satellites.

If the LD signal sources are GPS or GLONASS satellites or Loran radiowave towers, the LD signals received by the putative source and by the data receiving station may be the uncorrected LD signals transmitted by those sources. Alternatively, the data receiving station or another reference station whose location is known with high accuracy can receive the uncorrected LD signals, compare these uncorrected LD signals with the uncorrected LD signals that should be received at a particular time at the reference station site, and compute and transmit corrections $\Delta LD(t_r;j)$ for the uncorrected LD signals. These corrections are optionally received and used by the putative source to compute corrections $\Delta LD(t_r;j)$ to the LD signals received at the putative source site. The segments of uncorrected LD signals $LD(t_r;j)$ are then replaced by corrected LD signal segments $g[t_{k(m)}, t_{k(m)+1}; j; ps]_{cor}$ in the augmented data signal that is formed and transmitted by the putative source to the data receiving station. The corrected LD signal segments $g[t_{k(m)}, t_{k(m)+1}; j; ps]_{cor}$ are compared with the corresponding corrected LD signal segments $g'[t_{k(m)}, t_{k(m)+1}; j; ps]_{cor}$ estimated at the data receiving station, in authenticating, or withholding authentication of, the putative source or of its location. Generation and use of LD differential corrections for GPS signals is discussed in U.S. Pat. No. 5,323,322, issued to Mueller et al. Generation and use of LD signal corrections for Loran signals and Decca signals is discussed in U.S. Pat. No. 5,045,861, issued to Duffet-Smith.

Alternatively, the data receiving station can estimate a corrected location $L'(t''_{k(m)}; ps)_{cor}$ of the putative source, based on the received, corrected LD signal segments $g[t_{k(m)}, t_{k(m)+1}; j; ps]_{cor}$ and its own corresponding estimated, corrected LD signal segments $g'[t_{k(m)}, t_{k(m)+1}; j; ps]_{cor}$, compare the asserted location $L(t''_{k(m)}; ps)$ with its own estimated location $L'(t''_{k(m)}; ps)_{cor}$, and determine whether to authenticate, or to withhold authentication of, the asserted location $L(t''_{k(m)}; ps)$ of the putative source at the time $t=t''_{k(m)}$.

In a second approach, the putative source receives uncorrected LD signals $L(t;j;ps)$ from J LD signal sources numbered $j=1, 2, \ldots, J$ ($J \geq 1$, preferably $J \geq 3$) that preferably vary with time t. The putative source forms and transmits an augmented data signal $D(d[t'_0, t'_f]; g[t_{k(m)}, t_{k(m)+1}; j=1; ps]; j=1; g[t_{k(m)}, t_{k(m)+1}; j=2; ps]; j=2; \ldots; g[t_{k(m)}, t_{k(m)+1}; j=J; ps]; j=J; t_{k(m)}; t_{k(m)+1}; L(t''_{k(m)}; ps); t''_{k(m)}; E(\Theta))$ that includes a data signal segment $d[t'_0, t'_f]$, uncorrected or corrected LD signal segments $g[t_{k(m)}; k_{(m+1)}; j; ps]$ ($1 \leq j \leq J$), identifying numbers j for the LD signal sources used, the times $t=t_{k(m)}$ and $t=t_{k(m+1)}$, the asserted location or location coordinates $L(t''_{k(m)}; ps)$, and the location assertion time $t=t''_{k(m)}$ for the putative source, as in the first approach. Part or all of the augmented data signal is encrypted, using an encryption algorithm $E(\Theta)$ that depends upon a p-tuple $\Theta=(\Theta 1, \Theta 2, \ldots, \Theta p)$ of parameters $\theta q=\Delta LD(t_r; q; rcv)$ ($q=1, 2, \ldots, p; p \leq J$), defined by differential correction values computed for the LD signals received at the data receiving station and transmitted to nearby mobile LD stations. The augmented data signal is received by the data receiving station and decrypted; the uncorrected or corrected LD signal segments $g[t_{k(m)}; k_{(m+1)}; j; ps]$, the asserted location coordinates $L(t''_{k(m)}; ps)$ and location assertion time $t=t''_{k(m)}$ for the putative source are recovered by the data receiving station. The data receiving station computes the offset location coordinates, between the known location of the data receiving station the asserted location of the putative source, and recovers the uncorrected or corrected LD signal segments $g[t_{k(m)}; k_{(m+1)}; j; ps]$ transmitted by the putative source. The data receiving station then estimates the uncorrected LD signals $LD'(t_r;j;ps)$ that should have been received at the asserted location of the putative source and compares these estimated values with the LD signal measurements $LD(t_r;j;ps)$ asserted by the putative source. The asserted location of the putative source is authenticated, and the transmitted data signal sequence $d[t'_0, t'_f]$ is validated, if and only if these estimated and asserted LD signal values agree within a selected margin of uncertainty. If the asserted location of the putative source is not authenticated, the data receiving station may choose to reject the information contained in the data signal sequence $d[t'_0, t'_f]$ and/or reject the asserted location or validity of the putative source.

In a third approach, use of licensed intellectual property or network equipment at designated sites on a computer network, for which a use charge is assessed, is monitored for location of use and for time interval(s) of use. If the location of a computer using the intellectual property is not at or near one of the approved sites for such use, this exception is noted and/or use of that intellectual property at that unapproved site may be automatically shut down. Monitoring use of an assembly of network devices at different times allows the network path followed by a message to be determined. This approach is also useful for determining the number of information units (packets, frames, etc.) that pass through a given network node or device in a specified time interval.

DESCRIPTION OF BEST MODES OF THE INVENTION

Figure 1:
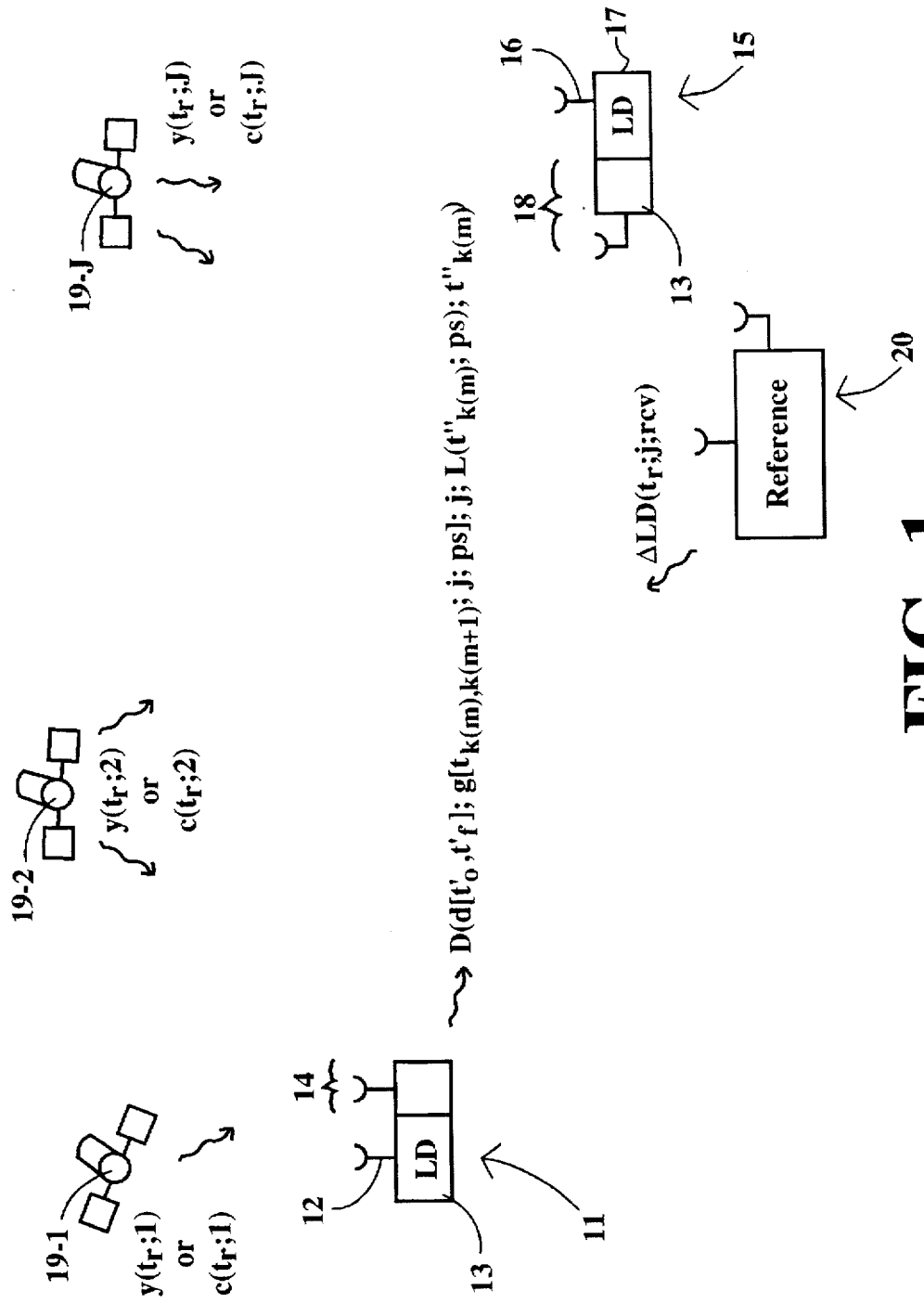
FIGS. 1, and 16 show environments in which the invention can be used.

FIG. 1 illustrates an environment in which the invention can be used. A mobile data signal station (also referred to as a putative source) 11 with location determination (LD) capability includes an LD signal antenna 12, LD receiver/processor 13 and antenna/transceiver 14. The putative source 11 may be part of a Global Positioning System (GPS), Global Orbiting Navigational Satellite System (GLONASS), ORBCOM, Loran, Tacan, Decca, Omega, Geosynchronous Orbiting Environmental Satellites (GOES), JTIDS Relnav, Personal Location Reporting Service (PLRS), FM subcarrier system or other similar LD system. The putative source 11 wishes to transmit a selected data signal sequence $\{d(t'_r)\}_r$ at a sequence of times $t=t'_r (r=1, 2, \ldots)$. The putative source 11 combines part or all of the data sequence $\{d(t'_r)\}_r$ with certain location-related information and transmits this combined information to one or more data receiving stations that are part of the system. A data receiving or processing station 15, including an LD signal antenna 16, LD receiver/.processor 17 and transceiver/antenna 18, receives this transmitted information and wishes to verify that this information has originated from a true or bona fide data signal station and not from some illegitimate source that is posing as the data signal station or putative source 11. Several source authentication methods are available here.

In a first embodiment, a putative source (denoted as "ps") 11 initially receives Y-code signals $Y(t_r;j)$ or equivalent signals from Y-code signal sources 19-j, numbered j=1, 2, ..., J (J≧1; preferably, J≧3), at a sequence of times $t=t_1, t_2, \ldots, t_r, \ldots$, with $t_r < t_{r+1}$. Satellites in the GPS or GLONASS can transmit encrypted (Y-code) signals. A Y-code signal $Y(t_r;j)$ transmitted by satellite number j is an encrypted digital signal that is generated at its source by Boolean manipulation, such as formation of a Boolean sum or modulo-2 sum, of the P-code signal and a digital encryption signal $W(t_r;j)$, called the W-code, for that satellite. If the Y-code signal source is a GPS satellite, a Y-code is formed as logical sums and/or products (e.g., Boolean sum, Boolean product, EXclusive OR product, EXclusive NOR product, etc.) of the GPS P-code signal and the W-code signal, where the signal $W(t_r;j)$ can change values at a selected fraction (e.g., one-half) of the frequency of the C/A-code signal. A Y-code signal is believed to be unique and to distinguish signals from two different satellites within any seven-day period.

The Y-code and W-code are discussed, or speculated upon, briefly by B. Hofmann-Wellenhof et al in *Global Positioning System*, Springer Verlag, 1994, pp. 20, 77–79, 86–87. The frequency of the W-code is believed to be f(C/A)/2=511.5 kHz, where f(C/A)=1.023 MHz is the frequency of the C/A code (one-tenth of the frequency of the P-code). The Y-code is believed to be a simple modulo-2 sum of the W-code and the P-code (whose frequency of change is 20 times the frequency of change of the W-code). Although the P-code is not classified, when the anti-spoofing mode is activated so that the P-code is replaced by the Y-code, access to the P-code is possible only if the user knows and applies the W-code to the received signal $Y(t_r;j)$. The anti-spoofing Y-code was first tested on or around 1 Aug. 1992 and was permanently implemented on or around 31 Jan. 1994.

The putative source 11 receives a sequence $\{Y(t_r;j)\}_r$ of Y-code signal values $Y(t_r;j)$ for a sequence of times $t=t_1, t_2, \ldots, t_r, t_{r+1}, \ldots$ for each Y-code signal source, numbered j=1, 2, ..., J (J≧1; preferably, J≦3). The Y-code signal values change at a frequency of f0=10.23 MHz and are bit-by-bit modulo-2 sum signals $$Y(t_r;j) = W(t_r;j) \oplus P(t_r;j) \quad (1)$$

of the W-code for that satellite with the P-code for that satellite (j). The P-code signals from any satellite j are non-confidential and are presently transmitted at a frequency of 10.23 MHz. One approach to generating the GPS P-code signals is disclosed by Farmer et al in U.S. Pat. No. 5,202,694. The W-code signal frequency is believed to be about five percent of the P-code signal frequency so that a W-code value will stay constant for about 20 consecutive values of the P-code for a given satellite.

The putative source 11 determines its present location, using the Y-code signals or signals from some other location determination system (GPS, GLONASS, Loran, etc.). The putative source 11 receives, samples and temporarily stores a segment $\{Y(t_r;j;ps)\}_r$ of Y-code signal values $Y(t_r;j;ps)$, as received at the putative source 11, given by $$Y[t_{k(m)}, t_{k(m+1)}; j; ps] = \{Y(t_r;j;ps) | t_{k(m)} \leq t_r \leq t_{k(m+1)}\}(t_{k(m)} < t_{k(m+1)}), \quad (2)$$

for one or more selected time intervals $\Delta t_{k(m)} = \{t | t_{k(m)} \leq t \leq t_{k(m+1)}\}$ for m=1, 2, ..., at a sample rate at least equal to the Nyquist frequency 2 f0=20.46 MHz for the P-code. Here $\{k(m)\}_m$ is a monotonically strictly increasing subsequence of positive integers r=1, 2, ..... The selected time interval length $t_{k(m+1)-k(m)}$ may be any suitable value, such as 0.01–1,000 msec, but is preferably in the range 0.01–1 msec. A GPS satellite transmits a P-code signal at a frequency f0=10.23 MHz and transmits a C/A-code signal for civilian use at a frequency f(C/A)=1.023 MHz. The frequencies f0 and f(C/A) are independently chosen and could have other values in the invention. The C/A-code signals are intended for civilian use and are unencrypted. The P-code signals are intended for special uses, are transmitted as part of the encrypted Y-code signals, and have smaller associated inaccuracies than do the C/A-code signals for location determination.

In a first alternative, the putative source 11 receives and despreads the Y-code signals $Y(t;j)$ by forming a modulo-2 sum signal $$W(t_r;j;ps) = Y(t_r;j;ps) \oplus P(t_r;j;ps) \quad (3)$$

which has an associated frequency of change of f0/20=511.5 kHz and requires sampling at or above the Nyquist frequency of f(C/A)=1.023 MHz for the W-code. W-code bit stream segments $$w[t_{k(m)}, t_{k(m+1)}; j; ps] = \{W(t_r; j; ps) | t_{k(m)} \leq t_r \leq t_{k(m+1)}\} \quad (4)$$

are formed and used in place of the Y-code segments $Y[t_{k(m)}, t_{k(m+1)}; j; ps]$.

In a second alternative, the putative source receives the P-code signals P(t;j;ps), if and when Y-code encryption is not imposed on the P-code, or extracts the P-code signals from the Y-code signals using $$P(t_r; j; ps) = Y(t_r; j; ps) + W(t_r; j; ps), \quad (5)$$

and forms P-code segments $$p[t_{k(m)}, t_{k(m+1)}; j; ps] = \{P(t_r; j; ps) | t_{k(m)} \leq t_r \leq t_{k(m+1)}\}, \quad (6)$$

for j=1, 2, ..., J, and uses the P-code segments in place of the Y-code segments $y[t_{k(m)}, t_{k(m+1)}; j; ps]$ in the message source authentication procedures discussed here.

In a third alternative, the putative source 11 receives the C/A-code signals C(t;j) from each of the C/A-code signal sources (j=1, 2, ... J), forms C/A-code segments $$c[t_{k(m)}, t_{k(m+1)}; j; ps] = \{C(t_r; j) | t_{k(m)} \leq t_r \leq t_{k(m+1)}\}, \quad (7)$$

and uses the C/A-code segments in place of the Y-code segments $y[t_{k(m)}, t_{k(m+1)}; j; ps]$. Where any of the Y-code segments, the W-code segments, the P-code segments or the C/A-code segments can be used in the following, the LD signal segments will sometimes be written simply as $g[t_{k(m)}, t_{k(m+1)}; j; ps]$, where "g" stands for y, for w, for p or for c according to the context and corresponds to the "G-code" (G=Y, W, P or C/A, respectively).

If the Y-code (or C/A-code) is used by the putative source 11: (1) storage or provision of the P-code at the putative source is not necessary; (2) the Y-code (or the C/A-code) is sampled at a frequency of at least 2 f0 (at least 2 f(C/A)) and is not despread; (3) a bit stream segment $y[t_{k(m)}, t_{k(m+1)}; j; ps]$ (or $c[t_{k(m)}, t_{k(m+1)}; j; ps]$) is received and stored in a first buffer arm of a multiple buffer, while a second buffer arm processes another bit stream segment $y[t_{k(m')}, t_{k(m'+1)}; j; ps]$ (or $c[t_{k(m')}, t_{k(m'+1)}; j; ps]$, (m'≦m-1) already received; and (4) each one consecutive msec of such segment includes about 20,480 samples of the Y-code signal bit stream (or 2,048 samples of the C/A-code signal bit stream).

If the W-code is used by the putative source 11: (1) the P-code for each channel is stored at, or otherwise made available to, the putative source; (2) the Y-code is sampled at a frequency of at least f(C/A) and is despread as in Eq. (3); and (3) a bit stream segment $w[t_{k(m)}, t_{k(m+1)}; j; ps] = \{W(t_r; j; ps) | t_{k(m)} \leq t_r \leq t_{k(m+1)}\}$ is received and stored in a first buffer arm of a multiple buffer, while a second buffer arm processes another bit stream segment $w[t_{k(m')}, t_{k(m'+1)}; j; ps]$ (m'≦m-1) already received; and (4) each one consecutive msec of such segment includes about 1,024 samples of the W-code signal bit stream.

If the P-code is used by the putative source 11: (1) the W-code for each channel is stored at, or otherwise made available to, the putative source; (2) the Y-code is sampled at a frequency of at least 2 f0 and is despread as in Eq. (5); and (3) a bit stream segment $p[t_{k(m)}, t_{k(m+1)}; j; ps] = \{P(t; j; ps) | t_{k(m)} \leq t \leq t_{k(m+1)}\}$ is received and stored in a first buffer arm of a multiple buffer; a second buffer arm processes another bit stream segment $p[t_{k(m')}, t_{k(m'+1)}; j; ps]$ (m'≦m-1) already received; and (4) each one consecutive msec of such segment includes about 20,480 samples of the P-code signal bit stream.

If the putative source 11 does not use satellite-based LD signal sources to determine its asserted present location, the putative source need not include an LD signal receiver/processor to receive and process the incoming LD signals for this purpose. For example, the putative source may assert that it is located adjacent to, and has the same location coordinates as, a survey monument whose location coordinates are well known. However, the putative source 11 determines its asserted present location $L(t''_{k(m)}; ps)$ ($t_{k(m)} \leq t'_{k(m)} \leq t_{k(m+1)}$) by some means and transmits the asserted location coordinates $(x(t''_{k(m)}; ps), y(t''_{k(m)}; ps), z(t''_{k(m)}; ps))$ and location assertion time $t = t''_{k(m)}$ for the putative source to the data receiving station 15.

The data receiving station 15 is to receive a digital signal d(t) from a presently-unvalidated source, and the identity or location of the source of this signal (putatively, the station 11) is to be authenticated at the data receiving station. The data signal d(t) is augmented to include a bit stream sequence containing the Y-code segment $y[t_{k(m)}, t_{k(m+1)}; j; ps]$ (or the W-code segment $w[t_{k(m')}, t_{k(m'+1)}; j; ps]$ or the P-code segment $P[t_{k(m')}, t_{k(m'+1)}; j; ps]$ or the C/A-code segment $c[t_{k(m)}, t_{k(m+1)}; j; ps]$) for one or more selected time intervals given by $\Delta t_{k(m)} = \{t_r | t_{k(m)} \leq t_r \leq t_{k(m+1)}\}$, plus a time stamp that specifies the interval-defining times $t_{k(m)}$ and $t_{k(m+1)}$. The Y-code segment $y[t_{k(m)}, t_{k(m+1)}; j; ps]$ can have as few as 1,024–10,240 consecutive Y-code values, if the length of $\Delta t_{k(m)}$ is $t_{k(m+1)} - t_{k(m)} = 0.1-1$ msec. The W-code segment $w[t_{k(m')}, t_{k(m'+1)}; j; ps]$ can have as few as 51–511 consecutive Y-code values, if the length of $\Delta t_{k(m)}$ is 0.1–1 msec. The P-code segment $p[t_{k(m)}, t_{k(m+1)}; j; ps]$ can have as few as 1,024–10,240 consecutive P-code values, if the length of $\Delta t_{k(m)}$ is $t_{k(m+1)} - t_{k(m)} = 0.1-1$ msec. The C/A-code segment $c[t_{k(m)}, t_{k(m+1)}; j; ps]$ can have as few as 102–1,024 consecutive C/A-code values, if the length of $\Delta t_{k(m)}$ is 0.1–1 msec.

Two code segments $g[t_{k(m)}, t_{k(m+1)}; j; ps]$ and $g[t_{k(m+u-1)}, t_{k(m+u)}; j; ps]$ (u≧2; g=y, w, p or c) can be stored in first and second data buffers in a multiple buffering arrangement that receives and temporarily stores one code segment $g[t_{k(m+u-1)}, t_{k(m+u)}; j; ps]$ in a first buffer while another earlier-received code segment $g[t_{k(m)}, t_{k(m+1)}; j; ps]$ is being used to form part of and to transmit an augmented data signal $D(d[t'_0, t'_f]; g[t_{k(m)}, t_{k(m+1)}; j=1; ps]; j=1; g[t_{k(m)}, t_{k(m+1)}; j=2; ps]; j=2; ...; g[t_{k(m)}, t_{k(m+1)}; j=J; ps]; j=J; t_{k(m)}; t_{k(m+1)}; L(t''_{k(m)}; ps); t''_{k(m)})$ in a second buffer. The Y-code (or W-code or P-code or C/A-code) segment $g[t_{k(m)}, t_{k(m+1)}; j; ps]$ is not processed at the putative source 11 but is incorporated "raw" into the augmented data signal and is transmitted to the data receiving station 15; the segments $g[t_{k(m)}, t_{k(m+1)}; j; ps]$ are recovered by the data receiving station and processed to determine whether the putative source is the true source and/or whether the asserted location of the putative source is correct, within some uncertainty in location. Optionally, the time difference $t_{k(m+u)} - t_{k(m)}$ or $t_{k(m+u+1)} - t_{k(m+1)}$ (u=1, 2, 3, ... ) for two consecutive code segments $g[t_k, t_{k+1}; j; ps]$ and $g[t_{k(m+u-1)}, t_{k(m+u)}; j; ps]$ used for signal augmentation can be chosen to be ≧Δt(min), where Δt(min) is a convenient number, such as 1–12 sec. The choice Δt(min)=6 sec is often suitable.

The data receiving station 15 makes available two or more receiving channels (preferably, as many as eight) at the appropriate Nyquist frequency (2 f0≈20.46 MHz, 2 f(C/A)=2.046 MHz or f(C/A)=1.023 MHz), receives the augmented data signal with its G-code segment (G=Y, W, P or C/A) from the putative source 11, using at least one buffering channel (preferably as many as four buffering channels) operating at the appropriate Nyquist frequency, extracts the G-code signal segments $g[t_k, t_{k+1}; j; ps]$, and matches these G-code signal segments against G-code signals already received by, or stored at, the data receiving station 15. This matching is required in order to determine or confirm the asserted satellite number (j) and the time shift required to align the Y-code signal already received or stored at the data receiving station with the G-code segment received as part of the augmented data signal.

If the putative source 11 uses the Y-code, the augmented data signal $D(d[t'_0,t'_f]; y[t_{k(m)},t_{k(m+1)}; j=1; ps]; j=1; y[t_{k(m)}, t_{k(m+1)}; j=2; ps]; j=2; \ldots ; Y[t_{k(m)},t_{k(m+1)}; j=J; ps]; j=J; t_{k(m)}; t_{k(m+1)}; L(t''_{k(m)}; ps); t''_{k(m)})$ is transmitted to the data receiving station 15, preferably with a carrier signal frequency that is not close to any of the Y-code, P-code, W-code or C/A-code frequencies. This augmented data signal includes the original data signal sequence $d[t'_0,t'_f]$, the Y-code segments $y[t_{k(m)},t_{k(m+1)}; j; ps]$ for $j=1, 2, \ldots, J$, the LD signal source numbers $j=1, 2, \ldots, J$, the corresponding time stamps $t_{k(m)}$ and $t_{k(m+1)}$, and the asserted location or location coordinates $L(t''_{k(m)}; ps)$ of the putative source 11 at a selected time $t=t''_{k(m)}$, and the location assertion time $t=t''_{k(m)}$, which satisfies the constraint $t_{k(m)} \leq t''_{k(m)} \leq t_{k(m+1)}$. The asserted location coordinates $L(t''_{k(m)}; ps)$ and/or location assertion time $t=t''_{k(m)}$ may be sent intermittently, rather than with every augmented data signal, if desired, because these values will often change relatively slowly with the passage of time. This is true, no matter which LD signals are used by the putative source 11.

If the putative source 11 uses the W-code, the augmented data signal $D(d[t'_0,t'_f]; w[t_{k(m)},t_{k(m+1)}; j=1; ps]; j=1; w[t_{k(m)},t_{k(m+1)}; j=2; ps]; j=2; \ldots ; w[t_{k(m)},t_{k(m+1)}; j=J; ps]; j=J; t_{k(m)}; t_{k(m+1)}; L(t''_{k(m)}; ps); t''_{k(m)})$ is transmitted to the data receiving station 15, preferably with a carrier signal frequency that is not close to any of the Y-code, P-code, W-code or C/A-code frequencies. This augmented data signal includes a segment $d[t'_0,t'_f]$, or preferably all of, the original data signal, stream $d(t_r)$, the W-code bit stream sequence $w[t_{k(m)},t_{k(m)}+1; j;ps]$, the corresponding time stamps $t_k$ and $t_{k+1}$, the LD signal source numbers $j=1, 2, \ldots, J$ corresponding to the original W-code bit stream sequence (optional), and, the asserted location $L(t''_{k(m)}; ps)$ of the putative source 11 at a selected time $t=t''_{k(m)}$ that is preferably within or close to the bit stream time interval $t_{k(m)} \leq t \leq t_{k(m+1)}$. The data receiving station 15 makes available as many as eight receiving channels at the W-code Nyquist frequency (0.1 fO ≈1.023 MHz), receives the augmented data signal with its W-code segment from the putative source 11, using as many as eight buffering channels operating at 1.023 MHz, extracts the W-code signal segments $w[t_{k(m)},t_{k(m)}+1; j;ps]$, and matches these W-code signal segments against W-code signal segments already received and extracted by, or stored at, the data receiving station 15. This matching determines or confirms the asserted satellite number (j) and the time shift required to align the W-code signal already received or stored at the data receiving station with the W-code segment received as part of the augmented data signal.

If the putative source 11 uses the P-code, transmission details are similar to the transmission details of the Y-code, except that the P-code segments $p[t_{k(m)},t_{k(m+1)}; j; ps]$ replace the Y-code segments $y[t_{k(m)},t_{k(m+1)}; j; ps]$.

If the putative source 11 uses the C/A-code, the augmented data signal $D(d[t'_0,t'_f]; c[t_{k(m)},t_{k(m+1)}; j=1; ps]; j=1; c[t_{k(m)},t_{k(m+1)}; j=2; ps]; j=2; \ldots ; c[t_{k(m)},t_{k(m+1)}; j=J; ps]; j=J; t_{k(m)}; t_{k(m+1)}; L(t''_{k(m)}; ps); t''_{k(m)})$ is transmitted to the data receiving station 15, preferably with a carrier signal frequency that is not close to any of the Y-code, P-code, W-code or C/A-code frequencies. This augmented data signal includes a segment of, or all of, the original data signal $d(t_r)$, the C/A-code bit stream sequence $c[t_{k(m)},t_{k(m)}+1; j;ps]$, the corresponding time stamps $t_{k(m)}$ and $t_{k(m)+1}$, the LD signal source numbers $j=1, 2, \ldots, J$ corresponding to the original C/A-code bit stream sequence (optional), and the asserted location $L(t''_{k(m)}; ps)$ of the putative source 11 at a selected time $t=t''_{k(m)}$, which satisfies the constraint $t_{k(m)} \leq t''_{k(m)} \leq t_{k(m+1)}$. The data receiving station 15 makes available as many as eight receiving channels at the C/A-code Nyquist frequency (2 f(C/A)≈2.046 MHz), receives the augmented data signal with its C/A-code segment from the putative source 11, using as many as eight buffering channels operating at 2.046 MHz, extracts the C/A-code signal segments $c[t_{k(m)},t_{k(m)+1}; j;ps]$, and matches these C/A-code signal segments against C/A-code signal segments already received and extracted by, or stored at, the data receiving station 15.

This matching determines or confirms the asserted satellite number (j) and the time shift required to align the C/A-code signal already received or stored at the data receiving station with the C/A-code segment received as part of the augmented data signal.

Optionally, the G-code segment $g[t_{k(m)},t_{k(m)+1}; j]$ and/or the defining times $t_{k(m)}$ and $t_{k(m+1)}$ and/or the location coordinates $L(t''_{k(m)})$ and/or the entire augmented data segment $D(d[t'_0,t'_f]; g[t_{k(m)},t_{k(m+1)}; j=1; ps]; j=1; g[t_{k(m)},t_{k(m+1)}; j=2; ps]; j=2; \ldots ; g[t_{k(m)},t_{k(m+1)}; j=J; ps]; j=J; t_{k(m)}; t_{k(m+1)}; L(t''_{k(m)}; ps); t''_{k(m)})$ can be encrypted for transmission. Optionally, a different satellite number j can be chosen for each time interval $t_{k(m)} \leq t \leq t_{k(m+1)}$, according to a confidential choice sequence, in a manner analogous to frequency hopping in spread spectrum communication.

This augmented data signal $D(d[t'_0,t'_f]; g[t_{k(m)},t_{k(m+1)}; j=1; ps]; j=1; g[t_{k(m)},t_{k(m+1)}; j=2; ps]; j=2; \ldots ; g[t_{k(m)},t_{k(m+1)}; j=J; ps]; j=J; t_{k(m)}; t_{k(m+1)}; L(t''_{k(m)}; ps); t''_{k(m)})$ is received by the data receiving station 15, which first recovers the G-code segment $g[t_{k(m)},t_{k(m)+1}; j; ps]$, the LD signal source numbers j and the time stamps $t_{k(m)}$ and $t_{k(m+1)}$ and attempts to find a correspondence between this asserted G-code segment $g[t_{k(m)},t_{k(m)+1}; j; ps]$ and a known corresponding segment of the G-code, stored or received directly from LD signal source number j by the data receiving station 15, during an earlier-occurring transmission time interval $t'''_{k(m),j} \leq t \leq t'''_{k(m+1),j}$ at the data receiving station. Each of the time differences $\delta t_{k(m),j} = t_{k(m)} - t'''_{k(m),j}$ and $\delta t_{k(m+1),j} = t_{k(m+1)} - t'''_{k(m+1),j}$ arises in part from the difference in G-code signal propagation times (G=Y, W, P or C/A) from LD signal source number j to the putative source 11 and to the data receiving station 15. It is assumed here that the perturbations in time delays due to signal propagation through the ionosphere and through the troposphere and due to multipath signal propagation have been modeled or measured and have been largely removed from the time differences $\delta t_{k(m),j}$ and $\delta t_{k(m+1),j}$. The remainder of each of the time differences $\delta t_{k,j}$ and $\delta t_{k+1,j}$ is assumed to be due primarily to the differences in time required for normal signal propagation that would occur in a vacuum or in a homogeneous ambient medium.

If a G-code segment $g'[t_{k(m)},t_{k(m)+1}; j; rcv]$, transmitted by LD signal source number j and received at the data receiving station 15 (referred to as "rcv"), cannot be found that substantially agrees with the received G-code segment $g[t_{k(m)},t_{k(m)+1}; j; ps]$, the location of the LD signal antenna that is asserted by the putative source 11, or the putative source itself, cannot be authenticated. In this second embodiment, the asserted location $L(t''_{k(m)}; ps)$ and location assertion time $t=t''_{k(m)}$ for the putative source are not even examined, because the G-code segment $g[t_{k(m)}, t_{k(m)+1}; j; ps]$ does not agree with any known G-code segment $g'[t_{k(m)}, t_{k(m)+1}; j; rcv]$ received at the data receiving station from LD signal source number j. This embodiment is preferably used with one of the confidential code segments $y[t_{k(m)}, t_{k(m)+1}; j; ps]$ or $w[t_{k(m)}, t_{k(m)+1}; j; ps]$ but can also be used with the non-confidential code segments $p[t_{k(m)}, t_{k(m)+1}; j; ps]$ or $c[t_{k(m)}, t_{k(m)+1}; j; ps]$.

The time differences $\delta t_{k(m)};j$ and $\delta t_{k(m+1)};j$ are analyzed at the data receiving station 15 for signals received from the LD signal sources, numbered $j=1, 2, \ldots, J$, to determine a representative distance $$S(t_{k,j}) = [(X_{ps} - x_j(t''_{k(m)}))^2 + (y_{ps} - y_j(t''_{k(m)}))^2 + (z_{ps} - z_j(t''_{k(m)}))^2]^{1/2} = c' \delta t_{k(m),j}, \quad (8)$$

from the known location of LD signal source number j with known location coordinates $(x_j(t''_{k(m)}), y_j(t''_{k(m)}), z_j(t''_{k(m)}))$ to the unknown putative source location with location coordinates $(x_{ps}, y_{ps}, z_{ps})$, where c' is the velocity of light in the ambient medium. Estimated location coordinates $(x''_{ps}, y''_{ps}, z''_{ps}) = (x(t''_{k(m)})_{ps}, y(t''_{k(m)})_{ps}, z(t''_{k(m)})_{ps})$ for the putative source 11 at the time $t = t''_{k(m)}$ can be estimated by iteration, by optimization or by other techniques, using Eq. (8) for the different LD signal sources.

These estimated location coordinates $(x''_{ps}, y''_{ps}, z''_{ps})$ can be compared with the location coordinates $(x_{ps}, y_{ps}, z_{ps})$ asserted for the location of the LD signal antenna by the putative source 11 at the time $t = t''_{k(m)}$. In a first alternative, if the Euclidean distance $$S_2[x''_{ps}, y''_{ps}, z''_{ps}; x_{ps}, y_{ps}, z_{ps}; t''_{k(m)}] = [(x''_{ps} - x_{ps})^2 + (y''_{ps} - y_{ps})^2 + (z''_{ps} - z_{ps})^2]^{1/2} \quad (9)$$

between the estimated and asserted locations for the putative source LD signal antenna at the time $t = t''_{k(m)}$ is no greater than a selected positive threshold $S_{2,thr}$, viz., $$S_2 \leq S_{2,thr}, \quad (10)$$

the location of the putative source 11 is authenticated or, alternatively, the putative source 11 is itself authenticated. In a second alternative, an sth power distance function $$S_s[x''_{ps}, y''_{ps}, z''_{ps}; x_{ps}, y_{ps}, z_{ps}; t''_{k(m)}] = [a|x''_{ps} - x_{ps}|^s + b|y''_{ps} - y_{ps}|^s + c|z''_{ps} - z_{ps}|^s]^{1/s} \quad (11)$$

is formed, where s is a selected positive parameter, where a, b and c are non-negative constants and at least one constant a, b and c is positive. If $$S_s \leq S_{s,thr}, \quad (12)$$

the location of the putative source 11 is authenticated or, alternatively, the putative source 11 is authenticated. If $S_2 > S_{2,thr}$ (or, alternatively, $S_s > S_{s,thr}$), the asserted location of the putative source 11 is not authenticated at the time $t = t''_{k(m)}$. The preceding procedure may be applied to analyze velocity coordinates, rather than location coordinates, of the putative source 11. Implementation of this first embodiment is illustrated in a flow chart in FIG. 2.

Figure 2A:
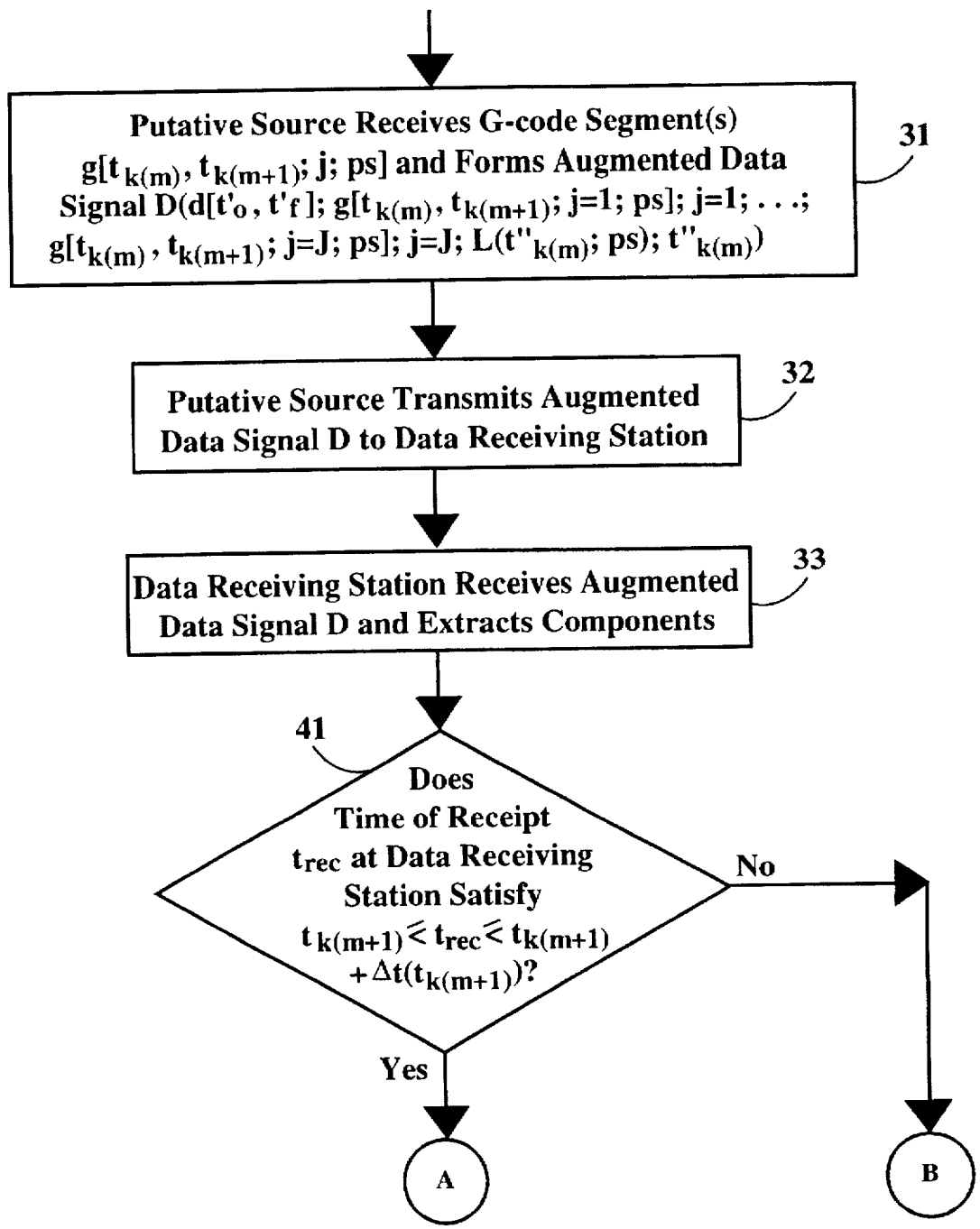
FIGS. 2–12 are flow charts illustrating several processes for authentication of a message source according to the invention.
Figure 2B:
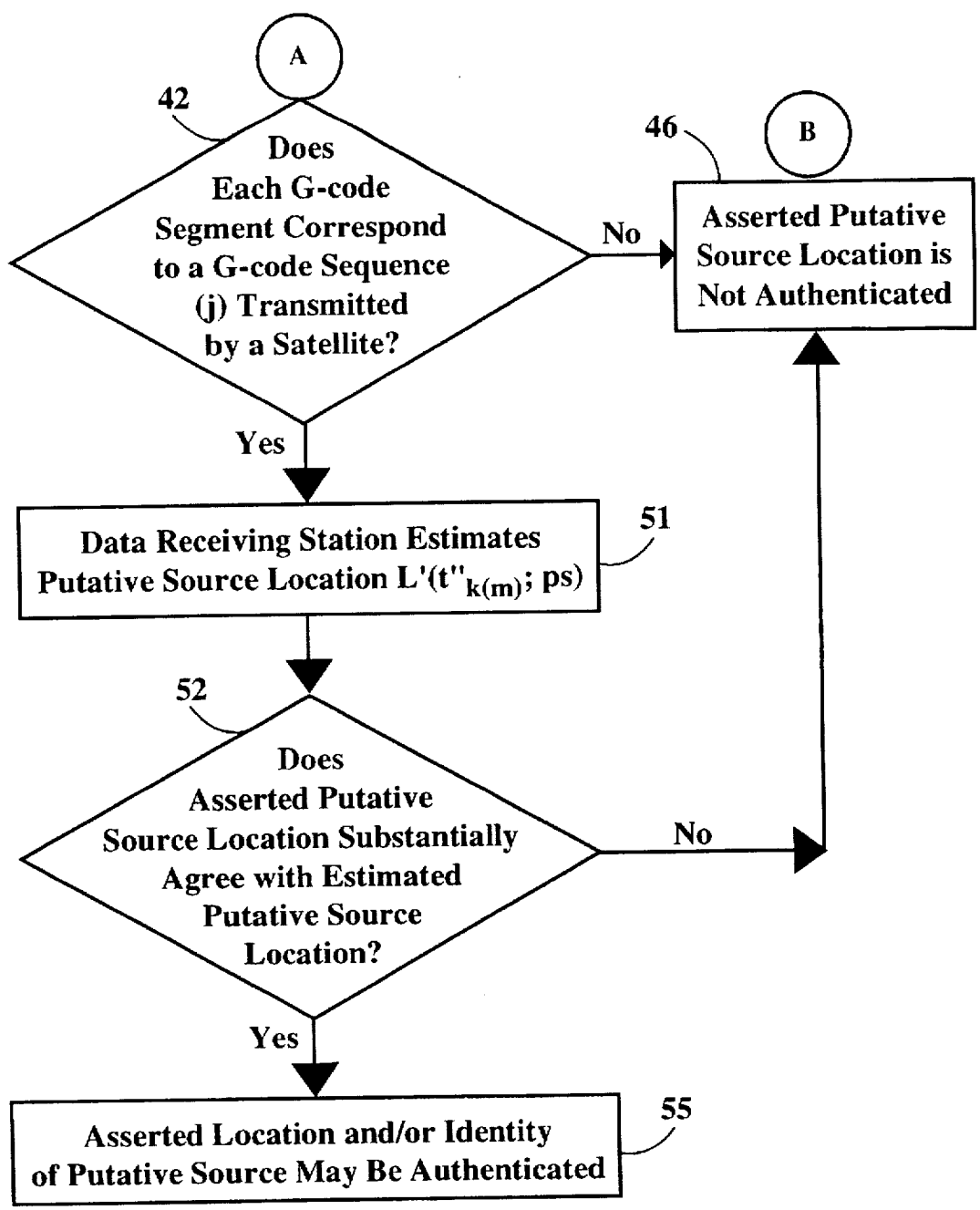

In FIG. 2, a putative source 11 receives G-code signals $G(t, j; ps)$ and forms G-code segments $g[t_{k(m)}, t_{k(m+1)}; j; ps]$ in step 31, plus the data signal $d(t'_r)$, if any, and forms an augmented data signal $D(d[t'_0, t'_r]; g[t_{k(m)}, t_{k(m+1)}; j=1; ps];$ $j=1; g[t_{k(m)}, t_{k(m+1)}; j=2; ps]; j=2; \ldots; g[t_{k(m)}, t_{k(m+1)}; j=J; ps]; j=J; t_{k(m)}, t_{k(m+1)}; L(t''_{k(m)}; ps); t''_{k(m)})$. In step 32, the putative source transmits the augmented data signal to a data receiving station 15. In step 33, the data receiving station receives the augmented data signal from the putative source and extracts the components of this signal.

In decision step 41, the data receiving station 15 determines the time of receipt, $t_{rec}$, of (the initial part of) the augmented data signal and determines whether this time of receipt satisfies the constraint $$t_{k(m+1)} \leq t_{rec} \leq t_{k(m+1)} + \Delta t(t_{k(m+1)}), \quad (13)$$

where $\Delta t(t_{k(m+1)})$ is a selected positive time value. This test of $t_{rec}$ against the constraint in Eq. (13) is optionally applied to any of the embodiments discussed here. If the time of receipt $t_{rec}$ does not satisfy the constraint in Eq. (13), the asserted location or identity of the putative source is not authenticated, as indicated in step 46.

If the time of receipt $t_{rec}$ does satisfy the constraint in Eq. (13), the data receiving station determines whether each of the G-code segments $g[t_{k(m)}, t_{k(m+1)}; j; ps]$ $j=1, \ldots, J)$ received in the augmented data signal corresponds to a G-code segment for that LD signal source (j) that is stored at, or otherwise obtained by, the data receiving station, in decision step 42. If the answer to the question in decision step 42 is no, the asserted location or identity of the putative source is not authenticated, as indicated in step 46.

If the answer to the question in decision step 42 is yes, the data receiving station estimates the putative source location, $L'(t''_{k(m)}; ps)$, from information contained in the augmented data signal and from the data receiving station's knowledge of its own location, in step 51. In decision step 52, the data receiving station determines whether the asserted putative station location $L(t''_{k(m)}; ps)$ substantially agrees with the estimated putative source location $L'(t''_{k(m)}; ps)$, in the sense that Eqs. (9)–(10) or Eqs. (11)–(12) are satisfied. If the answer to the question in decision step 52 is no, the asserted location or identity of the putative source is not authenticated, as indicated in step 46. If the answer to the question in decision step 52 is yes, the asserted location or identity of the putative source may be authenticated, as indicated in step 55.

Decision step 42 or decision step 52 is optional. In the first embodiment, step 42 (but not step 52) is deleted. In a second embodiment, step 52 (but not step 42) is deleted.

Implementation of the second embodiment, in which the G-code segments $g[t_{k(m)}, t_{k(m+1)}; j; ps]$ received from the putative source 11 are compared with the corresponding G-code segments $g'[t_{k(m)}, t_{k(m+1)}; j; rcv]$ received directly by the data receiving station, without comparison of the asserted location $L(t''_{k(m)}; ps)$ with the corresponding location $L'(t''_{k(m)}; ps)$ estimated by the data receiving station, is also illustrated in FIG. 2.

The procedure of the first embodiment or of the second embodiment is useful for confirming or refuting the validity or authenticity of the asserted location coordinates $(x_{ps}, y_{ps}, z_{ps})$ of the putative source 11 at or around the time $t = t''_{k(m)}$. This procedure is also useful for authenticating, or denying authentication to, a sequence $\{(x(t''_n)_{ps}, y(t''_n)_{ps}, z(t''_n)_{ps}, t''_n)\}_n$ of asserted location coordinates and corresponding times of observation for a mobile putative source 11 that may move from place to place as time progresses.

Y-code signals $Y(t, j)$, W-code signals, P-code signals or C/A-code signals can be received from the LD signal sources (j), if these LD signals repeat only over a long time period, preferably at least seven days. The P-code, and thus the Y-code, has a repetition period of about 266 days. Preferably, but not mandatorily, the LD signals should be confidential and should be difficult for an observer to determine. The confidentiality of the Y-code signal Y(t;j), or of the W-code signal W(t,;j), is useful in confirming that the putative source 11 was, or was not, at the asserted location with coordinates $(x(t''_{k(m)})_{ps}, y(t''_{k(m)})_{ps}, z(t''_{k(m)})_{ps})$ at the time $t=t''_{k(m)}$. Because the W-code signal W(t,;j) is confidential, the Y-code signal Y(t,;j) and the W-code signal W(t,;j) cannot be easily duplicated and substituted for the corresponding signal actually received at the actual location of the putative source 11 at the time $t=t''_{k(m)}$. Thus, the asserted location coordinates $(x(t''_{k(m)})_{ps}, y(t''_{k(m)})_{ps}, z(t''_{k(m)})_{ps})$ of the putative source 11 at the time $t=t''_{k(m)}$ can be authenticated and accepted if $S_2 \leq S_{2,thr}$ or, alternatively, if $S_{s} \leq S_{s,thr}$.

In a third embodiment, the mobile putative source 11 receives a G-code signal G(t,;j) or similar signal from each of J G-code signal sources, numbered j=1, ..., J ($J \geq 1$, preferably $J \geq 3$), and forms and transmits an augmented data signal $D(d[t'_0, t'_f]; g[t_{k(m)}, t_{k(m+1)}; j=1; ps]; j=1; g[t_{k(m)}, t_{k(m+1)}; j=2; ps]; j=2; ...; g[t_{k(m)}, t_{k(m+1)}; j=J; ps]; j=J; t_{k(m)}; t_{k(m+1)}; L(t''_{k(m)};ps); t''_{k(m)})$ to the data receiving station 15, for authentication of the putative source 11 or of the present location of this signal. The augmented data signal must be received by the data receiving station 15 within a selected reporting time interval $t_{k(m+1)} \leq t \leq t_{k(m+1)} + \Delta t(t_{k(m)})$ after the end of the time interval $\Delta t_{k(m)} = \{t | t_{k(m)} \leq t \leq t_{k(m+1)}\}$, in order for the putative source of this augmented data signal, or the location of the putative source, to be authenticated. If the augmented data signal $D(d[t'_0, t'_f]; g[t_{k(m)}, t_{k(m+1)}; j=1; ps]; j=1; g[t_{k(m)}, t_{k(m+1)}; j=2; ps]; j=2; ...; g[t_{k(m)}, t_{k(m+1)}; j=J; ps]; j=J; t_{k(m)}; t_{k(m+1)}; L(t''_{k(m)};ps); t'_{k(m)})$ is not received at the data receiving station 15 at a time $t=t_{rec}$ within a selected elapsed time $\Delta t(t_{k(m)})$ after the end of the time interval $\Delta t_{k(m)}$ (step 41 in FIG. 2), authentication of the asserted location coordinates $(x(t''_{k(m)})_{ps}, y(t''_{k(m)})_{ps}, z(t''_{k(m)})_{ps})$ of the putative source 11 at the time $t=t''_{k(m)}$ is withheld. The length $\Delta t(t_{k(m)})$ of this selected reporting time interval may be as small as one second and may be as large as several minutes, to account for the time delays in formation and propagation of the augmented data signal. A suitable time increment is $\Delta t(t_{k(m)}) = 1-6$ sec. Implementation of this third embodiment is illustrated in the flow chart in FIG. 2. In this embodiment, steps 42 and 52 are both included.

It is desirable, but not mandatory, that the LD signal (Y(t,;j;ps) or W(t,;j;ps) or P(t,;j;ps) or C/A(t,;j;ps) above), received and retransmitted as part of an augmented data signal by the putative source 11, be confidential and be difficult to determine and to counterfeit. In a fourth embodiment, a mobile LD station or putative source 11 initially receives uncorrected or "raw" LD signals $G(t;j;ps)_{unc}$ (which need not be confidential and may be well known) from one or more LD signal sources 19-j (j=1, 2, 3, ..., J; $J \geq 3$), where each such source is a suitable satellite-based source or a suitable ground-based source. The LD station or putative source 11 may use the uncorrected LD signals $G(t;j;ps)_{unc}$ or some other location determination means, such as inertial navigation or dead reckoning or adjacency to a survey monument with known location coordinates, to determine its asserted present location coordinates, denoted $L(t;ps)_{unc}$ or $(x(t)_{ps}, y(t)_{ps}, z(t)_{ps})_{unc}$, at a sequence of times $t=t_1, ..., t_r, t_{r+1}, ...$, with $t_r < t_{r+1}$. The LD signal measurements received by the putative source 11 may be pseudorange measurements, as used in GPS, GLONASS, Loran or Decca, or may be other measurements that indicate more directly the location coordinates and/or velocity coordinates of the putative source 11. The data receiving station 15, or an adjacent LD reference station 20 (which may be part of the data receiving station) whose location coordinates are known with high accuracy, receives and stores the uncorrected LD signals $G(t;j;rcv)_{unc}$ and determines differential correction signals $\Delta G(t;j;rcv)$ for its own location for times $t \geq t_0$. The data receiving station 15 preferably knows the accurate location coordinates $(x_{rcv}, y_{rcv}, z_{rcv})$ for its own location, which is preferably but not necessarily stationary.

Assume that the mobile putative source 11 is to transmit a data signal d(t) at a sequence of times $t=t'_0, t'_1, ..., t'_r, t'_{r+1}, ..., t'_f$ with $t'_r < t'_{r+1}$ to the data receiving station 15 and that the putative source 11 or putative source location $L(t''_{k(m)};ps)$ of this signal is to be authenticated at one or more times $t=t''_{k(m)}$, as in the preceding discussion. For times $t=t_r$ satisfying $t_{k(m)} \leq t_r \leq t_{k(m+1)}$, the putative source 11 receives and measures the uncorrected LD signals $G(t,;j;ps)_{unc}$ for j=1, 2, ..., J ($J \geq 1$; preferably $J \geq 3$), temporarily stores these measurement values, and forms and transmits an augmented data signal $D(d[t'_0, t'_f]; g[t_{k(m)}, t_{k(m+1)}; j=1; ps]_{unc}; j=1; g[t_{k(m)}, t_{k(m+1)}; j=2; ps]_{unc}; j=2; ...; g[t_{k(m)}, t_{k(m+1)}; j=J; ps]_{unc}; j=J; t_{k(m)}; t_{k(m+1)}; L(t''_{k(m)};ps)_{unc}; t''_{k(m)})$ to the data receiving station 15. The data receiving station 15 receives this augmented data signal from the putative source 11 and recovers the uncorrected code segments $g[t_{k(m)}, t_{k(m+1)}; j; ps]_{unc}$ (g=y, w or c) and the corresponding LD signal source numbers j=1, 2, ..., J, the time stamps $t=t_{k(m)}$ and $t=t_{k(m+1)}$, the uncorrected asserted location $L(t''_{k(m)};ps)_{unc}$ of the putative source 11, and the location assertion time $t=t''_{k(m)}$. The uncorrected code segments g have the correct bit stream order, but one or both of the corresponding time stamps $t=t_{k(m)}$ and $t=t_{k(m+1)}$ and/or the times at which the values G(t,j;ps) change may be incorrect. The data receiving station 15 computes the corrected code segments $$g[t_{k(m)}, t_{k(m+1)}; j=J; ps]_{cor} = \{G(t,;j;ps)_{cor} = G(t,;j;ps)_{unc} + \Delta G(t,;j;rcv) | t_{k(m)} \leq t_r \leq t_{k(m)+1}\} \quad (14)$$

(j=1, 2, ..., J; g=y, w, p or c) and estimates a corrected location $L'(t''_{k(m)};ps)_{cor}$ for the putative source 11 based upon corrected code segments $g[t_{k(m)}, t_{k(m+1)}; j; ps]_{cor}$.

Figure 3A:
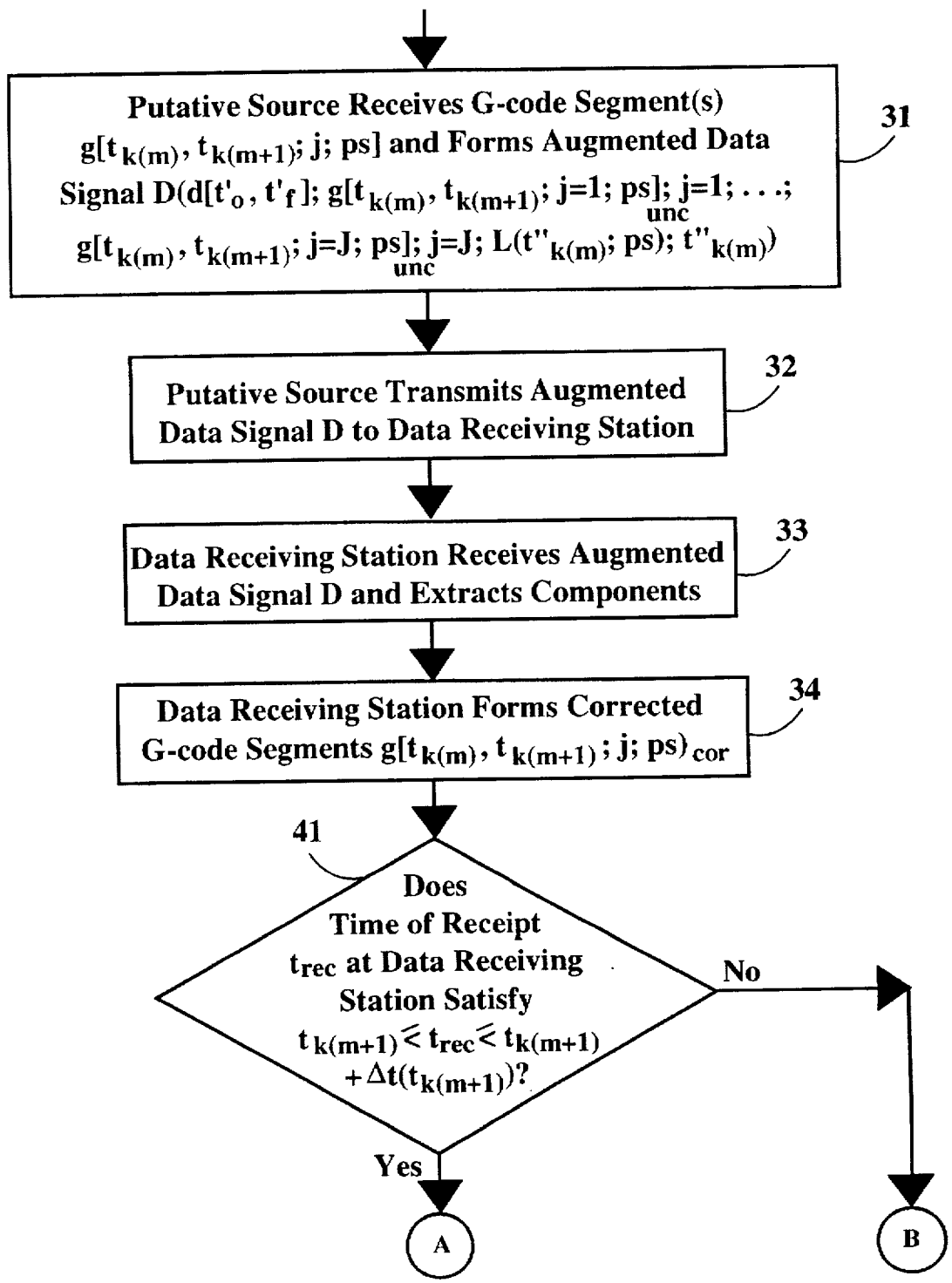
Figure 3B:
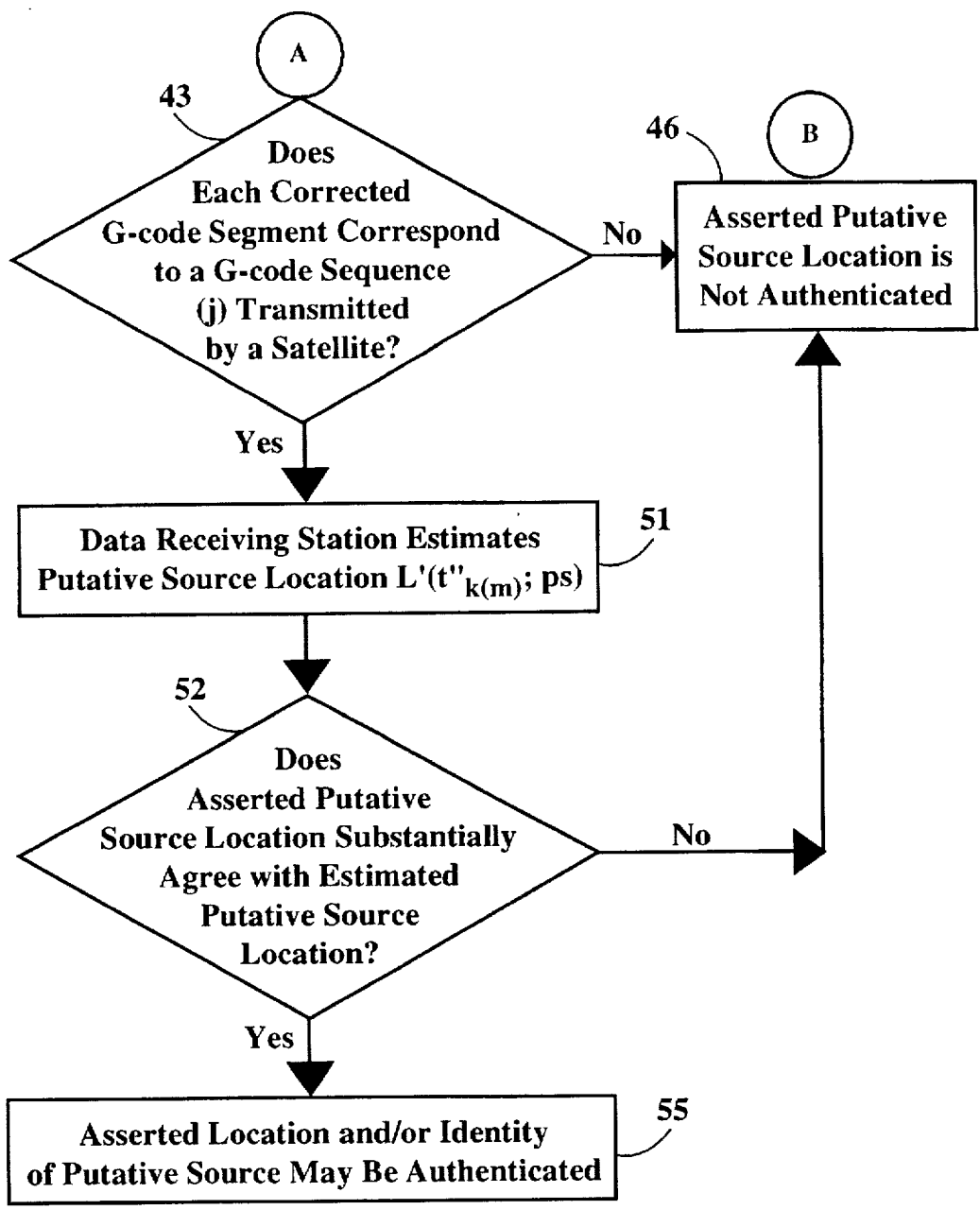

If the putative source 11 asserts that its location, without requiring correction, is $L(t''_{k(m)};ps)$, this asserted location is compared with the corrected location $L'(t''^{k(m)};ps)_{cor}$ estimated by the data receiving station 15, using the analysis set forth in connection with Eqs. (9)–(12), as illustrated in FIG. 3 for the fourth embodiment. FIG. 3 is similar to FIG. 2, except that: (1) an additional step 34 is added in which the data receiving station forms corrected G-code segments $g[t_{k(m)}, t_{k(m+1)}; j; ps]_{cor}$; and (2) decision step 42 is replaced by decision step 43, in which the data receiving station determines whether the corrected G-code segments for the putative source for each of the LD signal sources (j) correspond to G-code segments received at, or otherwise obtained by, the data receiving station.

Figure 4A:
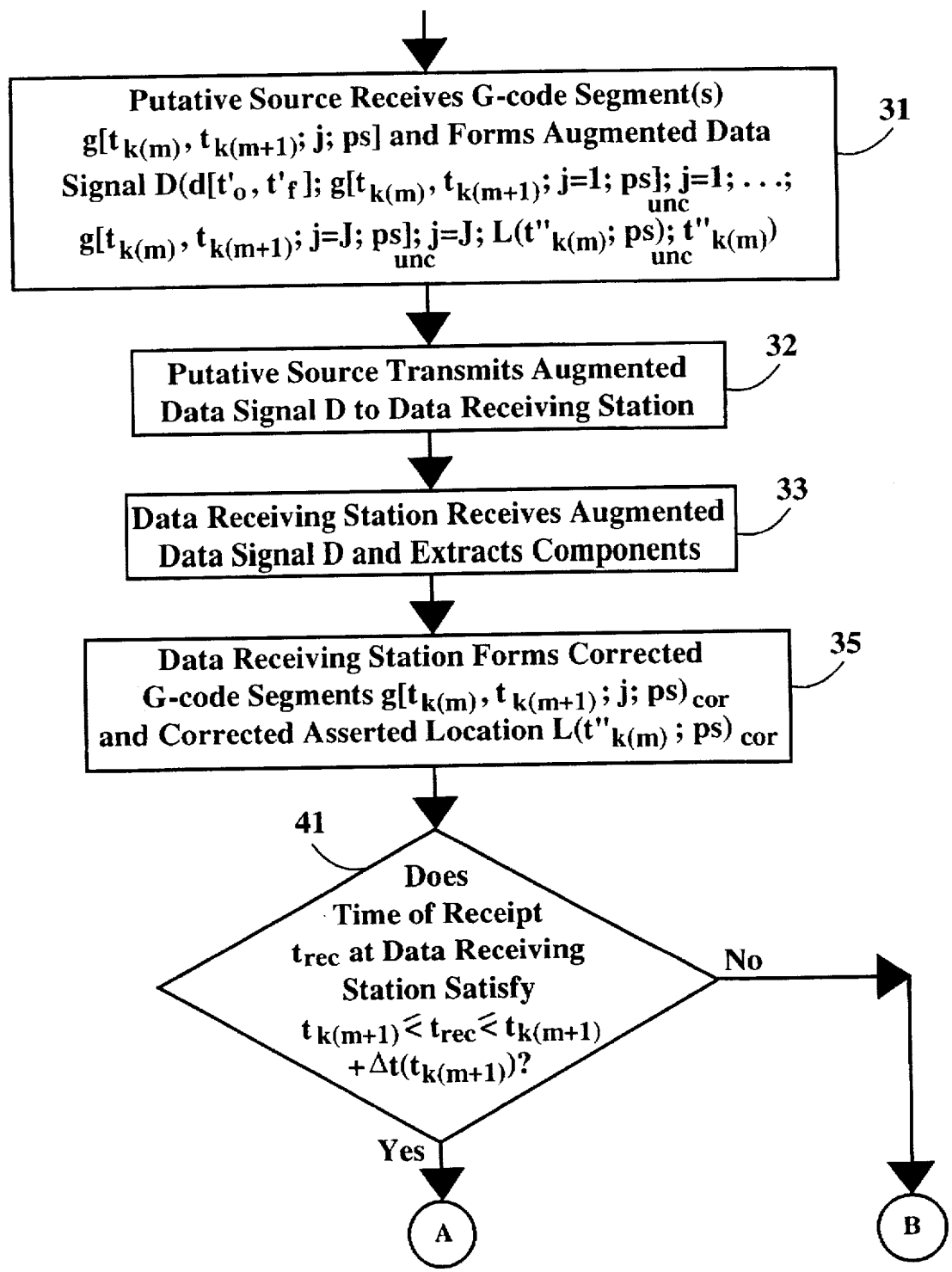
Figure 4B:
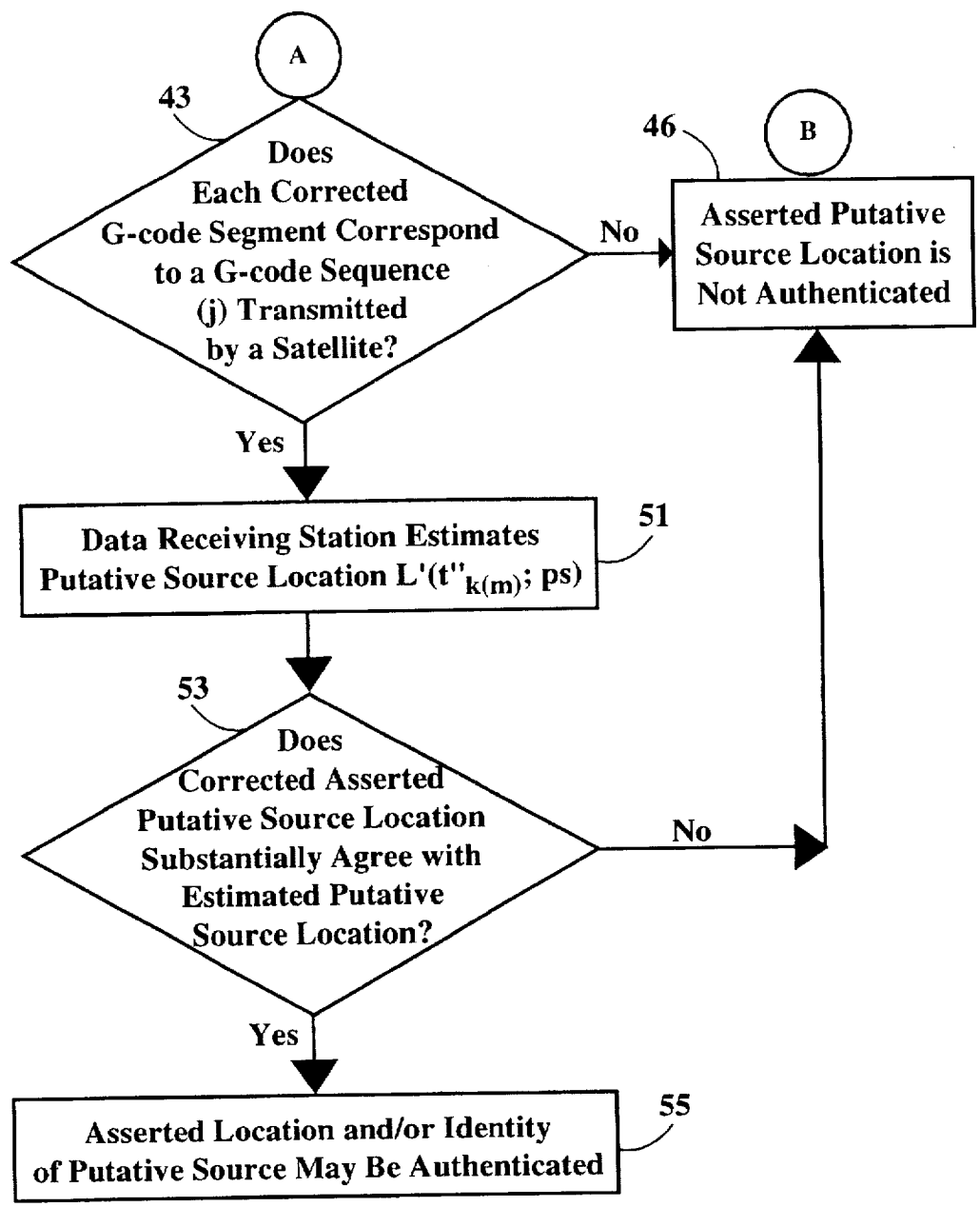

If the putative source 11 asserts that its uncorrected location is $L(t''_{k(m)};ps)_{unc}$, this asserted location is first corrected, using the differential correction signals $\Delta G(t;j;rcv)$ in Eq. (14), and the corrected asserted location $L(t''_{k(m)};ps)_{cor}$ is then compared with the corrected location $L'(t''^{k(m)};ps)_{cor}$ estimated by the data receiving station 15, using the analysis set forth in connection with Eqs. (9)–(12), as illustrated in FIG. 4. FIG. 4 is similar to FIG. 2, except that: (1) an additional step 35 is added in which the data receiving station forms corrected G-code segments $g[t_{k(m)},$ $t_{k(m+1)}$; j; ps]$_{cor}$ and determines a corrected asserted location $L(t''_{k(m)};ps)_{cor}$ for the putative source; (2) decision step 42 is replaced by decision step 43, in which the data receiving station determines whether the corrected G-code segments for the putative source for each of the LD signal sources (0) correspond to G-code segments received at, or otherwise obtained by, the data receiving station; and (3) decision step 52 is replaced by decision step 53, in which the data receiving station determines whether the corrected asserted putative source location $L(t''^{k(m)};ps)_{cor}$ substantially agrees with the estimated putative source location $L'(t''_{k(m)};ps)_{cor}$.

Based upon the results of the comparisons in Eqs. (9)–(12) (used in step 52 or in step 53), the asserted location or identity of the putative source 11 is authenticated or authentication is withheld.

Non-zero differential correction values $\Delta G(t;j;rcv)$ can arise from at least three sources of error: (1) inaccurately estimated signal propagation times through the ionosphere and/or troposphere; (2) significant multipath contributions to the signals received at an LD signal data receiving station, such as the putative source 11 or the data receiving station 15; and (3) receipt of LD signals during a period when selective availability (SA) is activated for the LD signal sources. Where GPS signals are received, the U.S. Defense Department may, from time to time, activate SA and cause dithering of the LD signals transmitted by each of the LD signal sources. This dithering can cause the computed location of an LD signal receiving station that is stationary to appear to move with time in a Lissajous or periodic pattern of diameter as much as 100 meters over a time period of 120–180 sec. Presence of these errors can be partly or fully compensated for by use of the differential correction values, computed with reference to an LD signal receiving station whose location coordinates are known with high accuracy.

When SA is activated, dithering of the LD signals transmitted begins at an unpredictable SA initiation time $t=t_{SA,0}$ and may be implemented by transmitting an SA-affected LD signal from LD signal source number j of the form $$LD(t; j)_{SA} = LD(t+\psi(t-t_{SA,0};j)_{SA}; j), \quad (15)$$

where $\psi(t; j)_{SA}$ is a determinable, approximately periodic function of time. The dithering in any particular time interval, such as $t_{k(m)} \leq t \leq t_{k(m+1)}$, is not predictable, even where the temporal development $\psi(t; j)_{SA}$ of the dithering pattern is known, unless the time point $t=t_{SA,0}$ of initial SA activation is also known. This adds an additional level of location authentication or, alternatively, an additional difficulty for a would-be spoofer who seeks to simulate a false location as the site from which the data signal d(t) is presently being transmitted.

In a fifth embodiment, the data receiving station 15 may receive the augmented data signal $D(d[t'_0,t'_r]; g[t_{k(m)},t_{k(m+1)}; j=1; ps]_{unc}; j=1; g[t_{k(m)},t_{k(m+1)}; j=2; ps]_{unc}; j=2; \ldots; g[t_{k(m)},t_{k(m+1)}; j=J; ps]_{unc}; j=J; t_{k(m)}; t_{k(m+1)}; L(t''_{k(m)};ps)_{unc}; t''_{k(m)})$, extract the uncorrected code segments $g[t_{k(m)},t_{k(m+1)}; j; ps]_{unc}(j=1, 2, \ldots, J)$ and the time interval limits $t_{k(m)} \leq t \leq t_{k(m+1)}$, and use the differential correction signals $\Delta LD(t; j; rcv)$ and the asserted location $L(t''_{k(m)};ps)$ to compute the corrected code segments $g[t_{k(m)},t_{k(m+1)}; j; ps]_{cor}$ and "known" code segments $$g[t_{k(m)},t_{k(m+1)}; j; ps]_{known} = \{G(t_r;j;ps)_{known} | t_{k(m)} \leq t_r \leq t_{k(m+1)}\} \quad (16)$$

that should have been received at the putative source 11 if the asserted putative source location is correct. Differences between the "known" and corrected code segments at the putative source.

$$\Delta(t_{k(m)}, t_{k(m+1)}; j; ps) = F[|G(t_r;j;ps)_{known} - G(t_r;j;ps)_{cor}|t_{k(m)}, t_{k(m+1)}] \quad (17)$$

are then formed for each of the LD signal sources numbered $j=1, 2, \ldots, J$, or for a chosen subset of the LD signal sources (j), for the time interval $t_{k(m)} \leq t \leq t_{k(m+1)}$. Here, F is a non-negative functional, defined on a sequence of time varying values $|v(t_r)|$ over a specified sequence of times $t_{k(m)} \leq t_r \leq t_{k(m+1)}$, that maps the sequence $\{|v(t_r)|\}_r$ of values into a non-negative number, and this number is equal to zero only if the time varying values $|v(t_r)|$ are all zero ($t_{k(m)} \leq t_r \leq t_{k(m+1)}$). One well known example of such a functional F is an sth power sum, viz.

$$F[|v(t_r)|; t_{k(m)}, t_{k(m+1)}] = \left\{ \sum_{r=k(m)}^{k(m+1)} |v(t_r)|^s \right\}^{1/s}, \quad (18)$$

over the sequence of time interval values $t_{k(m)} \leq t_r \leq t_{k(m+1)}$, applied to the magnitudes of the differences of the two G-code segments on the right in Eq. (17). Here, s is a selected positive number.

In a first alternative, if the magnitudes of the differences $\Delta(j;t_{k(m)}, t_{k(m+1)};ps)$ are less than selected threshold values, $$|\Delta(t_{k(m)}, t_{k(m+1)}; j; ps)| \leq \Delta(t_{k(m)}, t_{k(m+1)}; j)_{thr} \quad (19)$$

for all numbers $j=1, 2, \ldots, J$, or for at least a subset of J1 of the numbers j, where J1 is a positive integer satisfying $J1 \leq J$, the asserted location or identity of the putative source may be authenticated. Otherwise, the asserted location or identity of the putative source is not authenticated.

In a second alternative, a qth power sum $$\epsilon_q(t_{k(m)}, t_{k(m+1)}; j; ps) = \left[ \sum_{j=1}^{J} a_j |\Delta(t_{k(m)}, t_{k(m+1)}; j; ps)|^q \right]^{1/q}, \quad (20)$$

is formed, where the coefficients $a_j$ are non-negative and not all zero and q is a selected positive number. If the computed number $\epsilon_q$ is no greater than a selected threshold value $$\epsilon_{q,thr}(t_{k(m)}, t_{k(m+1)}), \text{ i.e., } \epsilon_q(t_{k(m)}, t_{k(m+1)};ps) \leq \epsilon_{q,thr}(t_{k(m)}, t_{k(m+1)}), \quad (21)$$

the asserted location or identity of the putative source may be authenticated. Otherwise, the asserted location or identity of the putative source is not authenticated. Implementation of the alternatives in this fifth embodiment are illustrated in the flow charts in FIGS. 5 and 6.

Figure 5A:
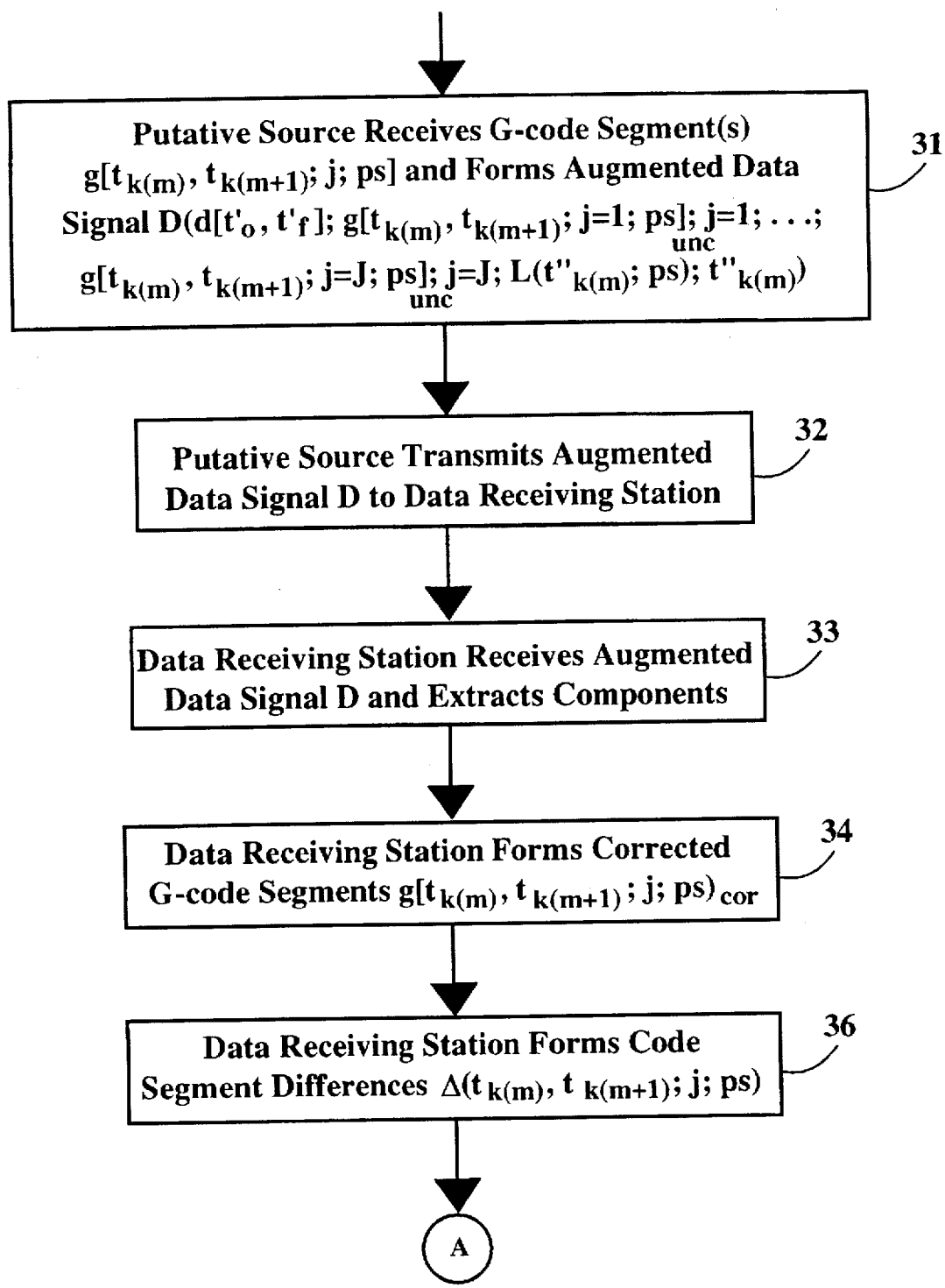
Figure 5B:
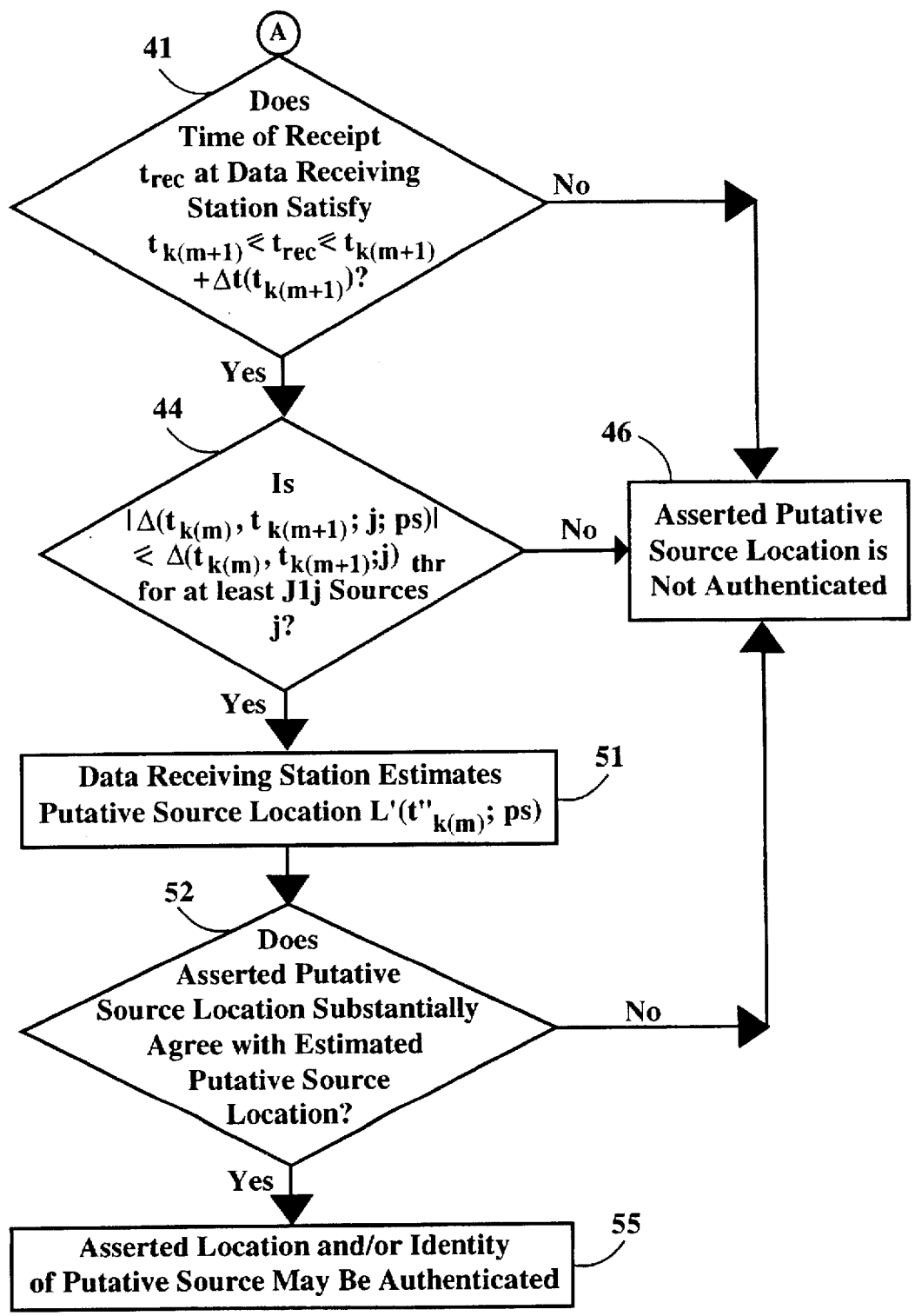

FIG. 5 is similar to FIG. 3, except that decision step 43 is replaced by decision step 44, in which the data receiving station determines whether Eq. (19) is satisfied. If the answer in step 44 is no, the asserted location or identity of the putative source is not authenticated. If the answer in step 44 is yes, the asserted location or identity of the putative source may be authenticated.

Figure 6A:
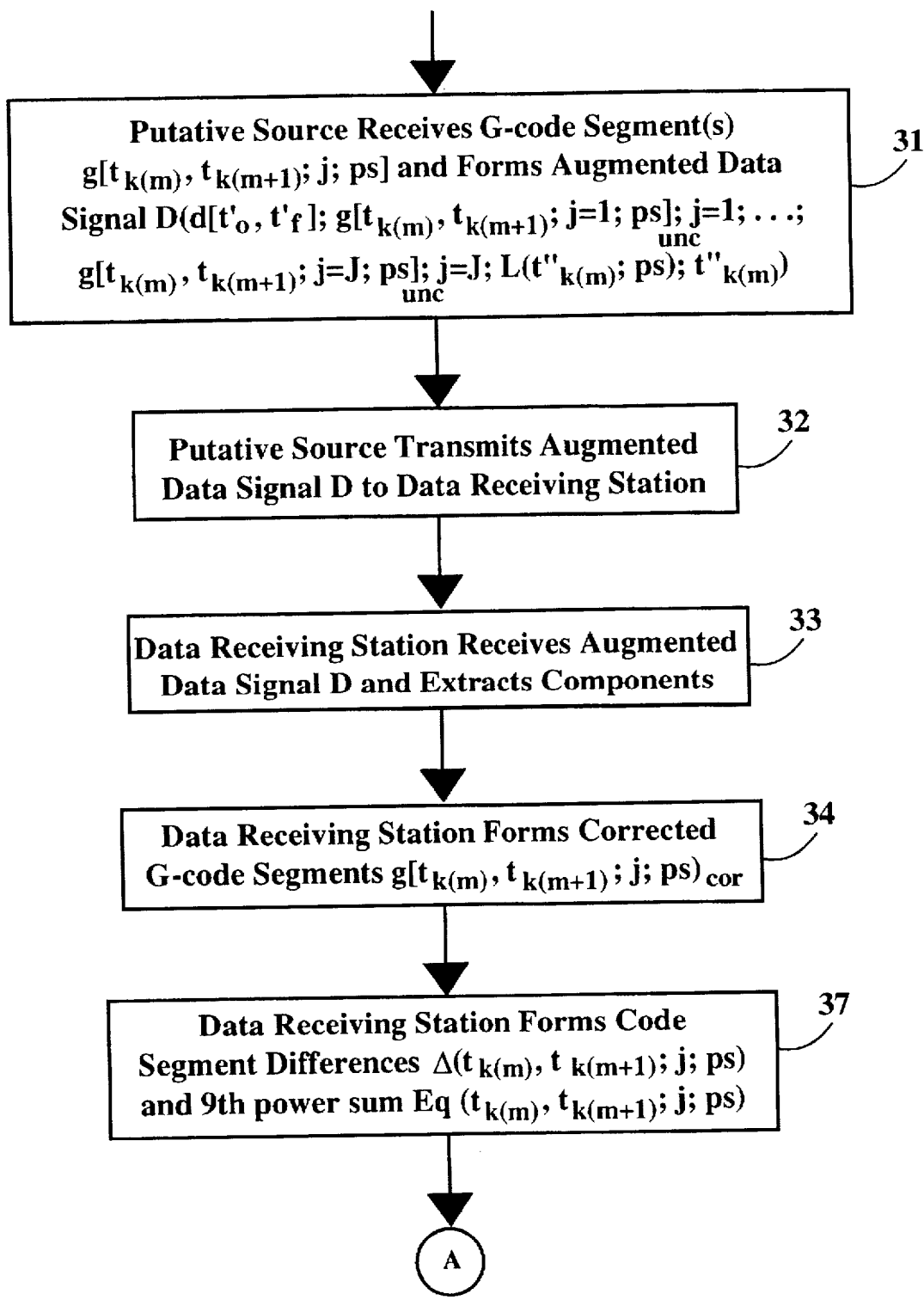
Figure 6B:
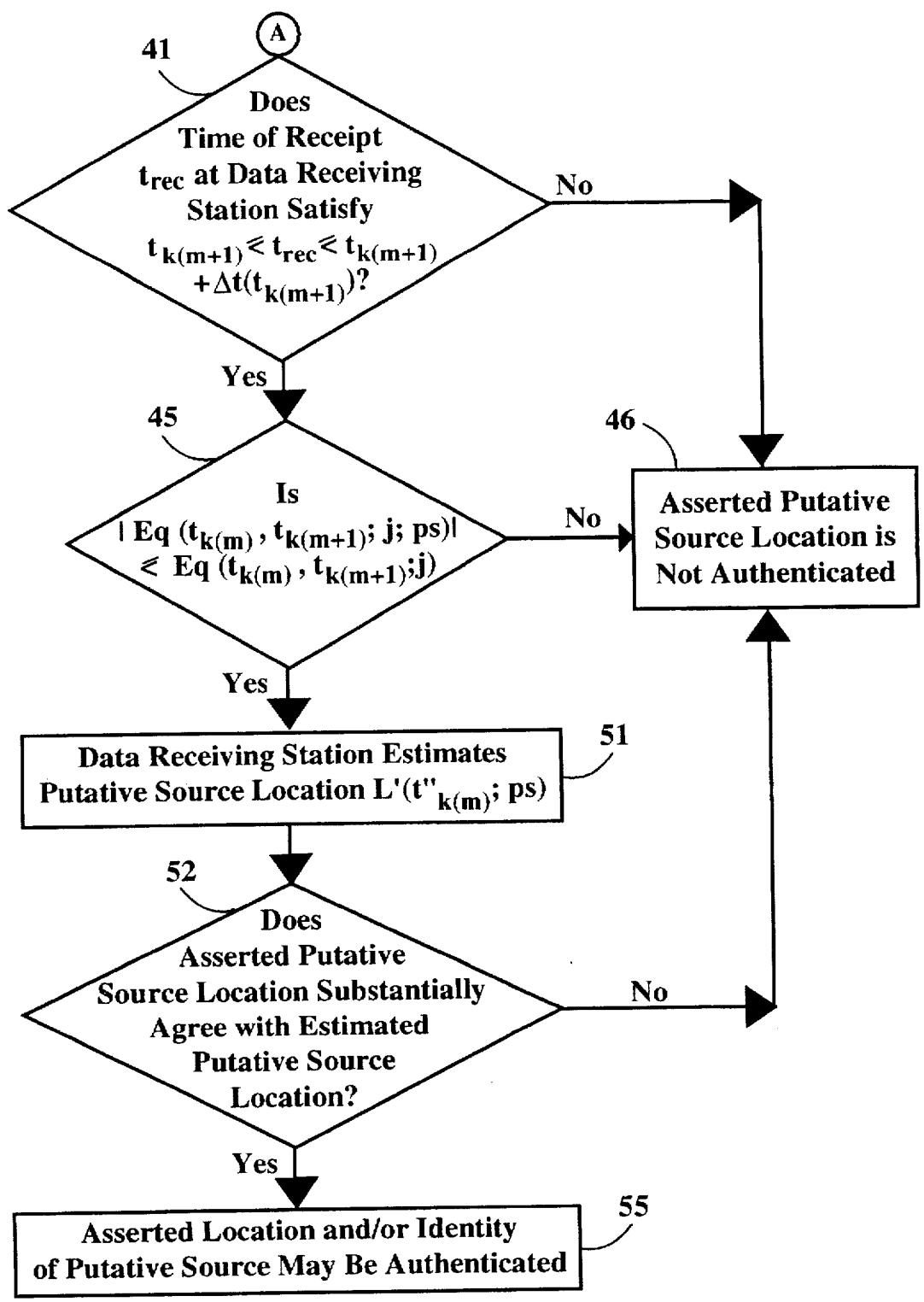

FIG. 6 is similar to FIG. 3, except that decision step 43 is replaced by decision step 45, in which the data receiving station determines whether Eq. (21) is satisfied. If the answer in step 45 is no, the asserted location or identity of the putative source is not authenticated. If the answer in step 45 is yes, the asserted location or identity of the putative source may be authenticated.

One suitable approach for estimating the LD signals $LD(t_r;j;ps)$ that should have been received at the putative source 11 at a time $t=t_r$ uses a polynomial approximation for a vector r(t) representing a satellite location as a function of time t, over a small time interval $t0 \leq t \leq t2$. One suitable polynomial here is $$r(t) = r_0 + v_0(t-t0) + a_0(t-t0)^2/2 + b_0(t-t0)^3/6, \quad (t0 \leq t \leq t2), \quad (22)$$

where $r_0$, $v_0$ and $a_0$ and $b_0$ are interpretable as the location, velocity, acceleration and boost vectors, respectively, of the satellite orbit, relative to a selected origin, at the initial time $t=t0$. If the satellite is known to be at the locations $r=r_0$, $r=r_1$ and $r=r_2$ at the respective times $t=t0$, $t=t1$ and $t=t2$ ($t0 < t1 < t2$) and if the boost vector parameter $b_0$ is ignored, the vector parameters $v_0$ and $a_0$ are chosen to satisfy $$v_0 = [(t2-t0)^2(r_1-r_0) - (t1-t0)^2(r_2-r_0)]/\Delta(t0,t1,t2), \quad (23)$$

$$a_0 = 2[-(t2-t0)(r_1-r_0) + (t1-t0)(r_2-r_0)]/\Delta(t0,t1,t2), \quad (24)$$

$$\Delta(t0,t1,t2) = (t2-t0)(t2-t1)(t1-t0). \quad (25)$$

If the putative source 11 asserts that its location vector is L at a time $t=t_r$, the square of the distance D(t) from the satellite to this asserted location is $$|r(t)-L|^2 = (r_0-L)^2 + 2(r_0-L) \cdot v_0(t-t0) + [v_0^2 + (r_0-L) \cdot a_0](t-t0)^2 + v_0 \cdot a_0(t-t0)^3 + a_0^2/4(t-t0)^4. \quad (26)$$

The distance D(t) itself is approximated by $$D(t) = |r_0-L|\{1 + n_0 \cdot nv_0(t-t0) + (\tfrac{1}{2})[nv_0^2 + n_0 \cdot na_0 - (n0 - nv0)^2](t-t0)^2 + O((t-t0)^3), \quad (27)$$

$$n_0 = (r_0-L)/|r_0-L|, \quad (28)$$

$$nv_0 = v_0/|r_0-L|, \quad (29)$$

$$na_0 = a_0/|r_0-L|, \quad (30)$$

where D0, D1 and D2 are determinable constants in the time interval $t0 \leq t \leq t2$. The distance D(t) is preferably monotonically increasing or monotonically decreasing with t in the interval $t0 \leq t \leq t2$. If an LD signal S(t-t0) is transmitted by the satellite in the time interval $t0 \leq t \leq t2$, this signal will arrive at the vector location L asserted by the putative source 11 in a later time interval $t0+\Delta(t0) < t \leq t0+\Delta(t2)$, and will have the approximate form $$S = S(t-d(t)/c') = S\{-D0 + (c'-D1)(t-t0) - D2(t-t0)^2\}/c'\} \quad (31)$$

within that time interval. Equation (24) can be used to construct an estimate of the LD signals that should have been received at the asserted location of the putative source 11 in a chosen time interval.

In a sixth embodiment, the original (unencrypted) augmented data signal $D(d[t'_0,t'_f]; g[t_{k(m)},t_{k(m+1)}; j=1; ps]_{unc}; j=1; g[t_{k(m)},t_{k(m+1)}; j=2; ps]_{unc}, j=2; \ldots ; g[t_{k(m)},t_{k(m+1)}; j=J; ps]_{unc}; j=J; t_{k(m)}; t_{k(m+1)}; L(t''_{k(m)};ps)_{unc}; t''_{k(m)})$ with $t_r \approx t'_r$ is replaced by an encrypted augmented data signal, denoted $D(d[t'_0,t'_f]; g[t_{k(m)},t_{k(m+1)}; j=1; ps]_{unc}; j=1; g[t_{k(m)},t_{k(m+1)}; j=2; ps]_{unc}; j=2; \ldots ; g[t_{k(m)},t_{k(m+1)}; j=J; ps]_{unc}; j=J; t_{k(m)}; t_{k(m+1)}; L(t''_{k(m)};ps)_{unc}; t''_{k(m)}; E(\Theta))$, which is formed and transmitted by the putative source 11 to the data receiving station 15. The putative source 11 uses an encryption algorithm $E(\Theta)$, where $\Theta$ is a p-tuple ($1 \leq p \leq J$) of parameters that determine the particular key used to perform this encryption. The encryption algorithm $E(\Theta)$ may depend upon a prese-lected key $\Theta$ that is known by the putative source 11 and by the data receiving station 15.

Figure 7A:
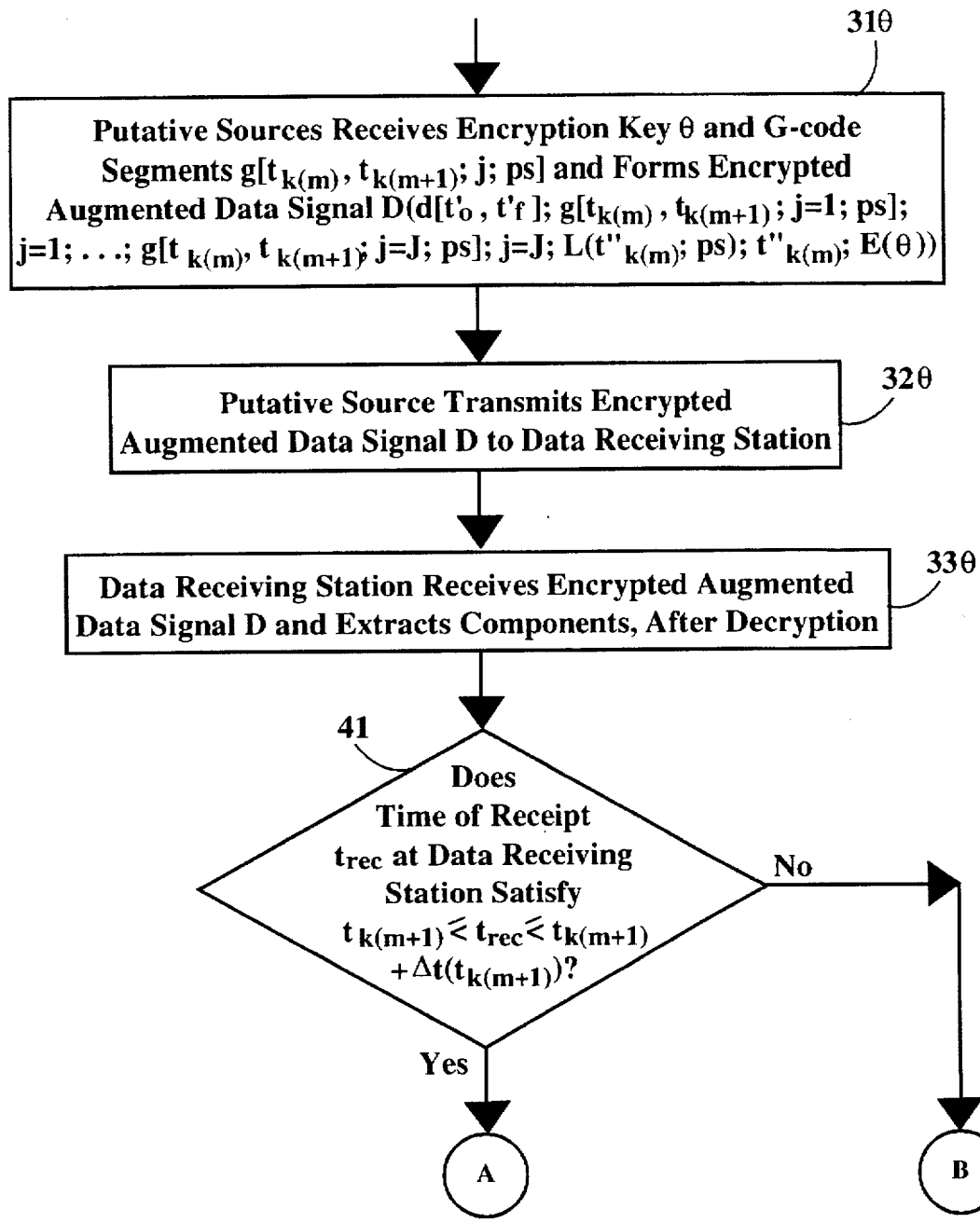
Figure 7B:
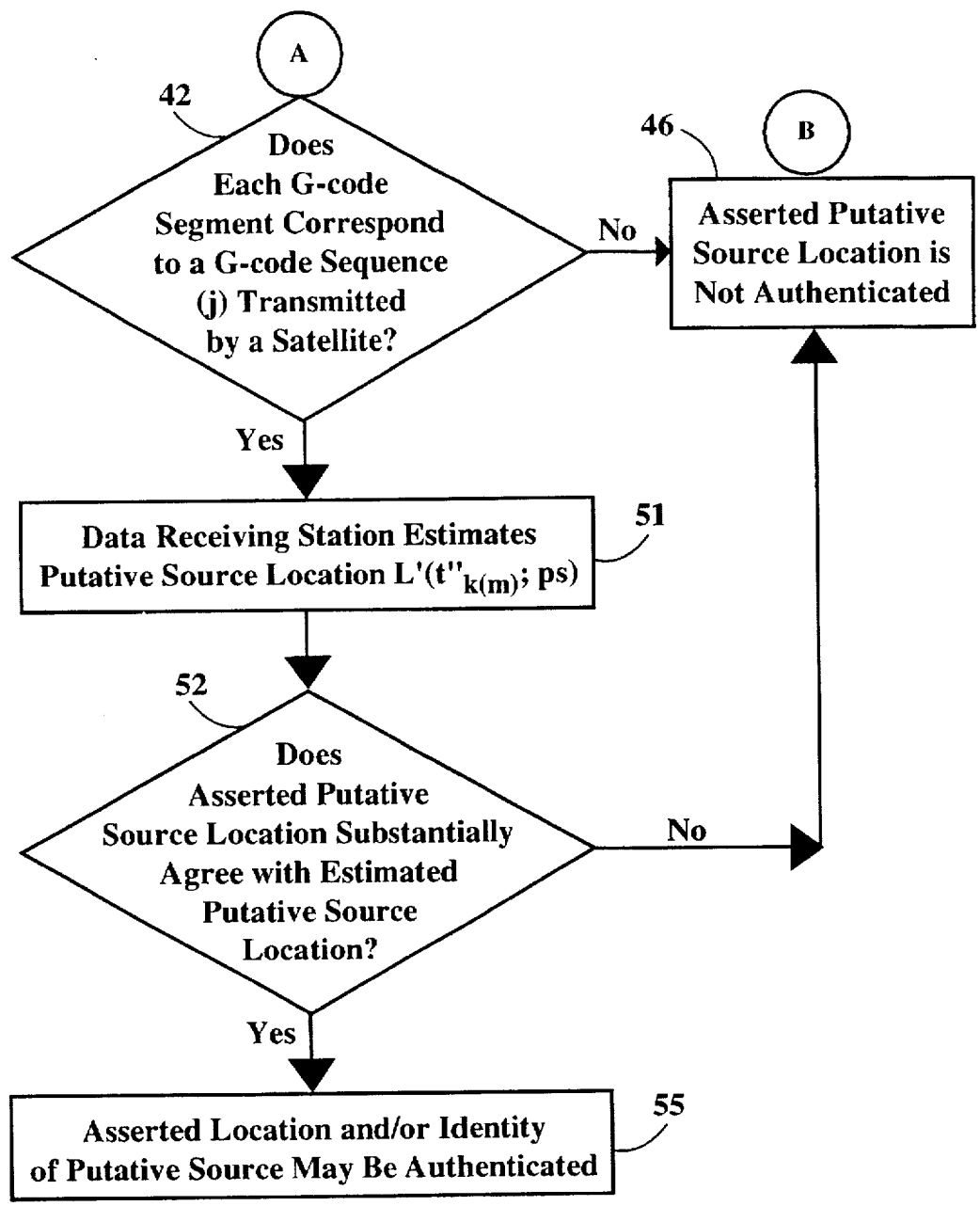

Alternatively, the encryption key $\Theta$ may depend upon some time varying value or p-tuple of values that in turn depend upon the present location of the putative source and/or the location of the putative source relative to each of the LD signal sources. In one approach, the putative source 11 receives time varying LD differential correction signals $\Delta G(t;j;rcv)$, determined for the location of the data receiving station 15 at a selected time $t=t_\Theta$ that lies in the time interval $t_{k(m)} \leq t_r \leq t_{k(m)+1}$. The data receiving station 15 is assumed to be within a moderate distance, such as 100–200 km from the putative source, and uses these signals to determine the encryption key $E(\Theta)$. If the sequence of data signal values $d(t'_r)$ would be transmitted in a time interval $t'_0 < t'_r \leq t'_f$, the parameter p-tuple $\Theta$ is determined by p of the LD differential correction signal values $\Delta G(t_r;j;rcv)$ ($t_r \leq t_{k(m)-1}$), expressed as $$\Theta = (\Theta 1, \Theta 2, \ldots, \Theta p) \quad (1 \leq p \leq J), \quad (32)$$

$$\Theta j = \Theta j(\Delta G(t_r,j;rcv)) \quad (j=1, 2, \ldots, J), \quad (33)$$

where j refers to the number of one of the LD signal sources $j=1, 2, \ldots, J$) for which the differential correction signals $\Delta G(t;j;rcv)$ are available. If the putative source 11 is not within some moderate distance from the data receiving station 15 or from the reference station 20, the putative source cannot receive and accurately apply the transmitted LD differential correction signals and cannot use these LD differential correction signals to determine the encryption algorithm $E(\Theta)$. FIG. 7 is a flow chart illustrating this sixth embodiment.

FIG. 7 is similar to FIG. 2, except that: (1) step 31 is replaced by step 31$\Theta$, wherein the original augmented data signal is replaced by an encrypted augmented data signal $D(d[t'_0,t'_f]; g[t_{k(m)},t_{k(m+1)}; j=1; ps]_{unc}; j=1; g[t_{k(m)},t_{k(m+1)}; j=2; ps]_{unc}; j=2; \ldots ; g[t_{k(m)},t_{k(m+1)}; j=J; ps]_{unc}; j=J; t_{k(m)}; t_{k(m+1)}; L(t''_{k(m)};ps)_{unc}; t''_{k(m)}; E(\Theta))$; (2) step 32 is replaced by step 32$\Theta$, in which the putative source transmits the encrypted augmented data signal to the data receiving station; and (3) step 33 is replaced by step 33$\Theta$, in which the data receiving station receives the encrypted augmented data signal from the putative source, decrypts this signal, and extracts the components of this signal.

A data signal $d(t''_r)$ to be sent from the putative source 11 to the data receiving station 15 normally consists of one or more packets (or frames), with each packet having three information "phrases", namely a header, the data itself, and a trailer. In this fourth embodiment, the individual components of the original augmented data signal $D(d[t'_0,t_f]; g[t_{k(m)},t_{k(m+1)}; j=1; ps]; j=1; g[t_{k(m)},t_{k(m+1)}; j=2; ps]; j=2; \ldots ; g[t_{k(m)},t_{k(m+1)}; j=J; ps]; j=J; t_{k(m)}; t_{k(m+1)}; L(t''_{k(m)};ps); t''_{k(m)})$, namely, the data signal $d[t'_0,t'_f]$, the code segments $g[t_{k(m)}, t_{k(m+1)}; j; ps]_{unc}$, the corresponding LD signal source numbers j, the time interval limits $t_{k(m)}$ and $t_{k(m+1)}$, the asserted location $L(t''_{k(m)};ps)$ and/or the location assertion time $t=t''_{k(m)}$ for the putative source 11 can be encrypted separately or left unencrypted and transmitted; or the entire original augmented data signal can be encrypted and transmitted. The augmented data signal components would normally be transmitted as part of the data field but can be transmitted as part of the header of the packet or frame, as part of the data field, or as part of the trailer or footer. The resulting encrypted augmented data signal $D(d[t'_0,t'_f]; g[t_{k(m)},t_{k(m+1)}; j=1; ps]; j=1; g[t_{k(m)},t_{k(m+1)}; j=2; ps]; j=2; \ldots ; g[t_{k(m)},t_{k(m+1)}; j=J; ps]; j=J; t_{k(m)}; t_{k(m+1)}; L(t''_{k(m)};ps); t''_{k(m)}; E(\Theta))$ is preferably transmitted to the data receiving station 15 in a time interval following the time interval $\Delta t_{k(m)} = \{t \mid t_{k(m)} < t \leq t_{k(m+1)}\}$. The putative source 11 and the data receiving station 15 are each aware of the functional dependence of the encryption algorithm E(Θ) on the p-tuple of values and of the particular placement of the encrypted augmented data signal components, suitably encrypted or in cleartext, in the modified packet(s) representing the augmented data signal.

The p-tuple Θ includes p-tuple parameter values $\Delta G(t_r, j;rcv)$ that are continually changing with time. For example, a p-tuple value may be a measured pseudorange correction value PRC($t_r$;j;rcv) or pseudorange rate correction value PRRAC($t_r$;j;rcv) (j=j$_1$, ..., j$_p$), measured at or very near to the data receiving station 15, as determined by comparison of uncorrected LD signals from LD signal sources with the LD signals that should have been received from those LD signal sources at a known location. The LD signal sources can be GPS satellites, GLONASS satellites, Loran signal towers, Decca signal towers or other suitable sources. Use of such values for formation of a constantly changing encryption key Θ is discussed in the patent application entitled "Encryption of Location Determination Signals," U.S. Ser. No. 08/367,784, assigned to the assignee of this application.

The data receiving station 15 receives the data packet(s) and recovers and decrypts the components of the original augmented data signal components d[t$_0$,t'$_r$], g[t$_{k(m)}$,t$_{k(m+1)}$; j=1; ps], j=1, g[t$_{k(m)}$,t$_{k(m+1)}$; j=2; ps], j=2, ...; g[t$_{k(m)}$,t$_{k(m+1)}$, j=J, ps]; j=J, t$_{k(m)}$, t$_{k(m+1)}$, L(t"$_{k(m)}$;ps), and t"$_{k(m)}$), using the encryption algorithm E(Θ). The data receiving station 15 proceeds, as in the first, second, third, fourth or fifth embodiment, to estimate what should have been the uncorrected LD signals G(t$_r$;j;ps)$_{unc}$ for the putative source at the time t=t$_r$, and compares segments of estimated uncorrected signals G'(t$_r$;j;ps)$_{unc}$ with segments of the uncorrected LD signals G(t"$_{k(m)}$;j;ps)$_{unc}$ asserted by the putative source at the time t=t"$_{k(m)}$. The remainder of this version of the sixth embodiment proceeds as in the preceding embodiments, for authentication of, or withholding authentication from, the asserted location of the putative source 11.

Figure 8A:
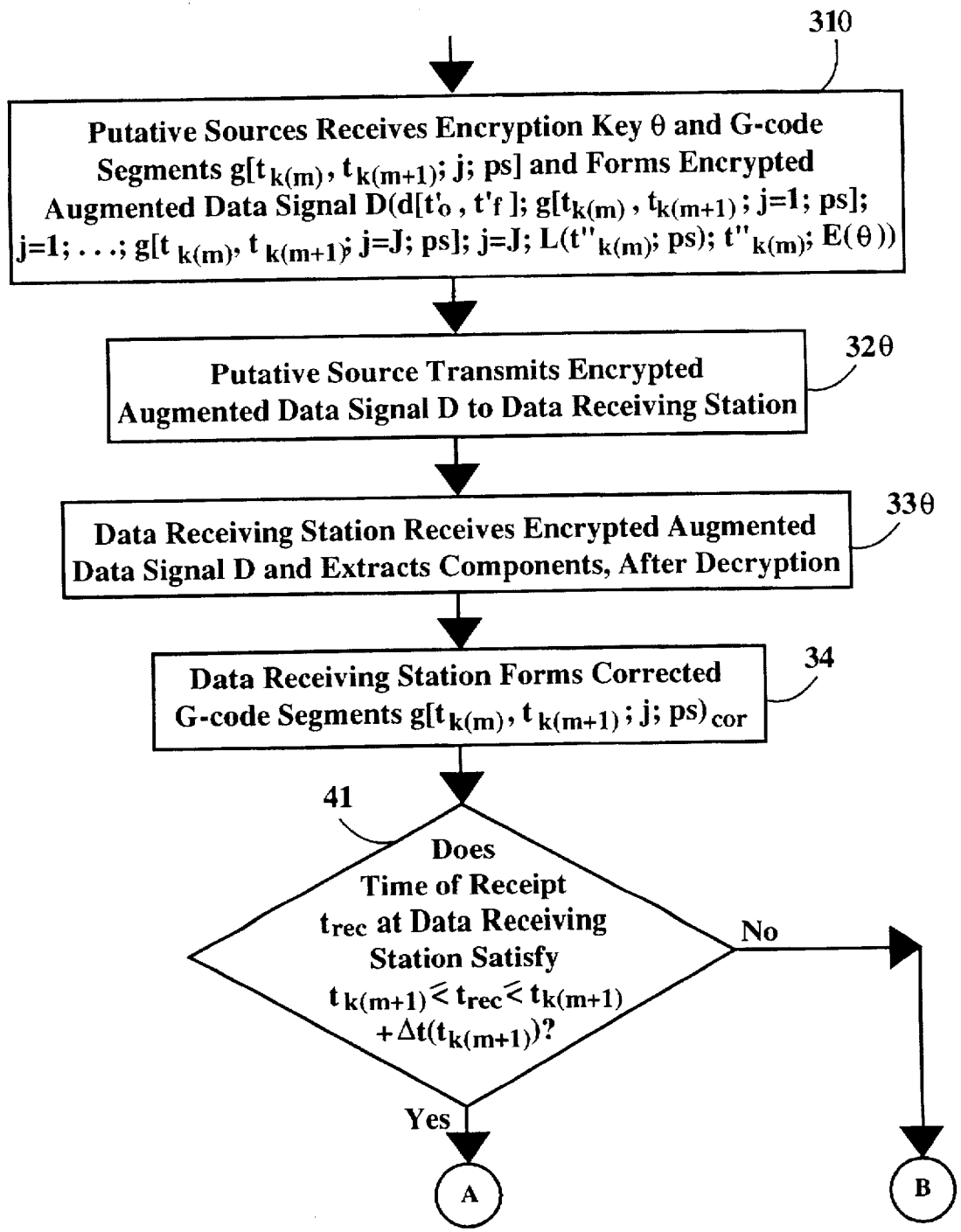
Figure 8B:
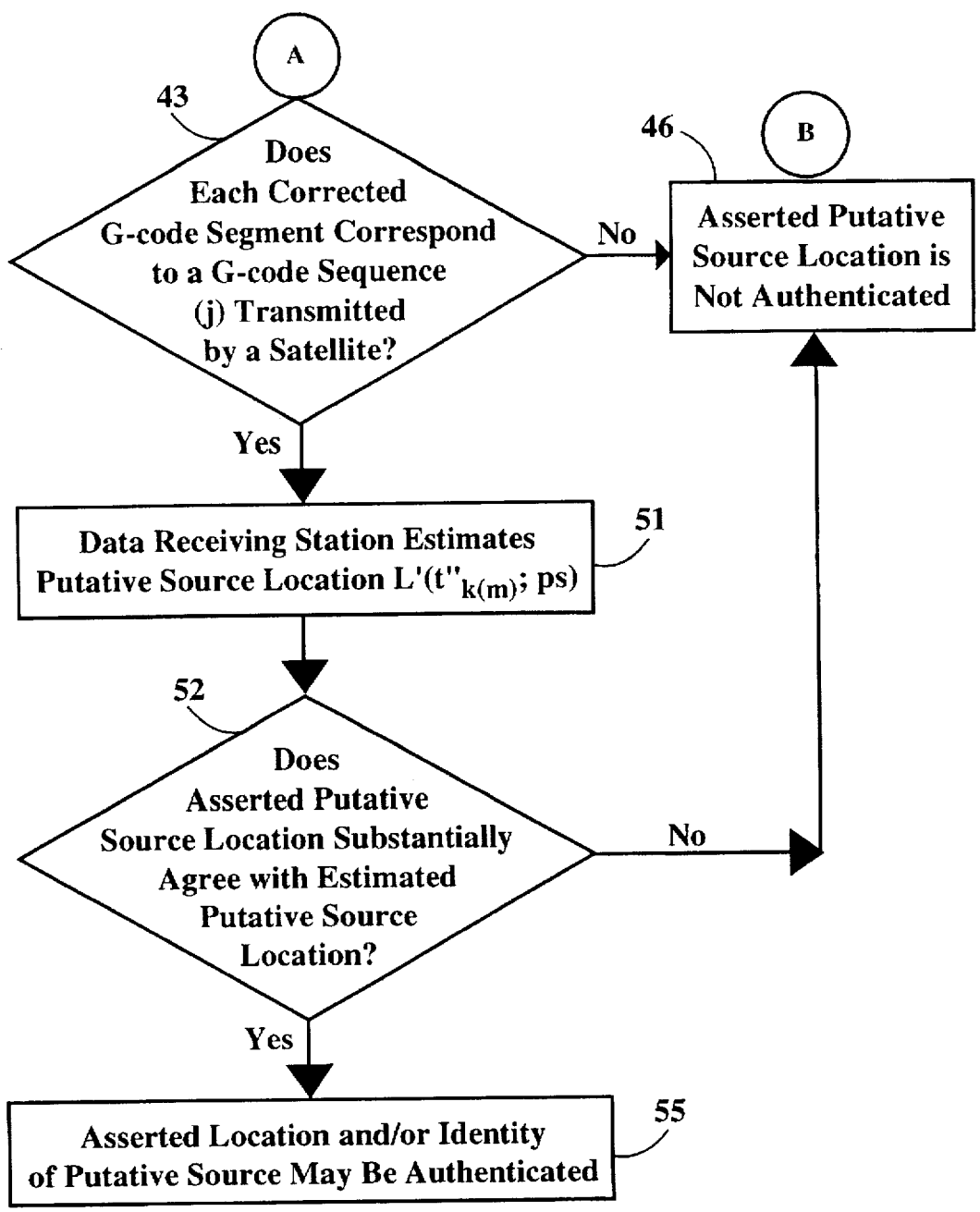

Implementation of this version of the sixth embodiment is illustrated in a flow chart in FIG. 8. FIG. 8 is similar to FIG. 3, except that the steps 31, 32 and 33 are replaced by the respective steps 31Θ, 32Θ and 33Θ.

Figure 9A:
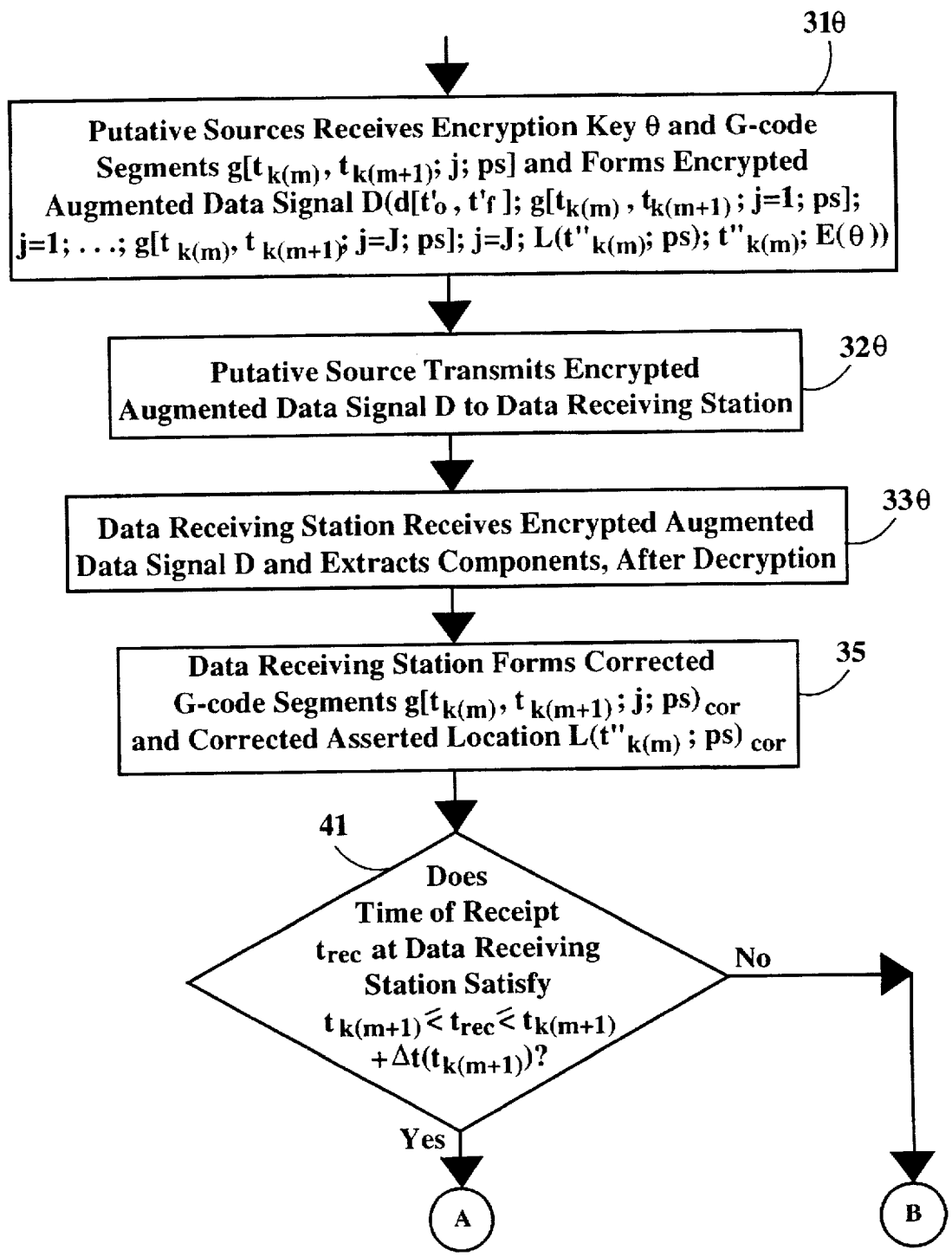
Figure 9B:
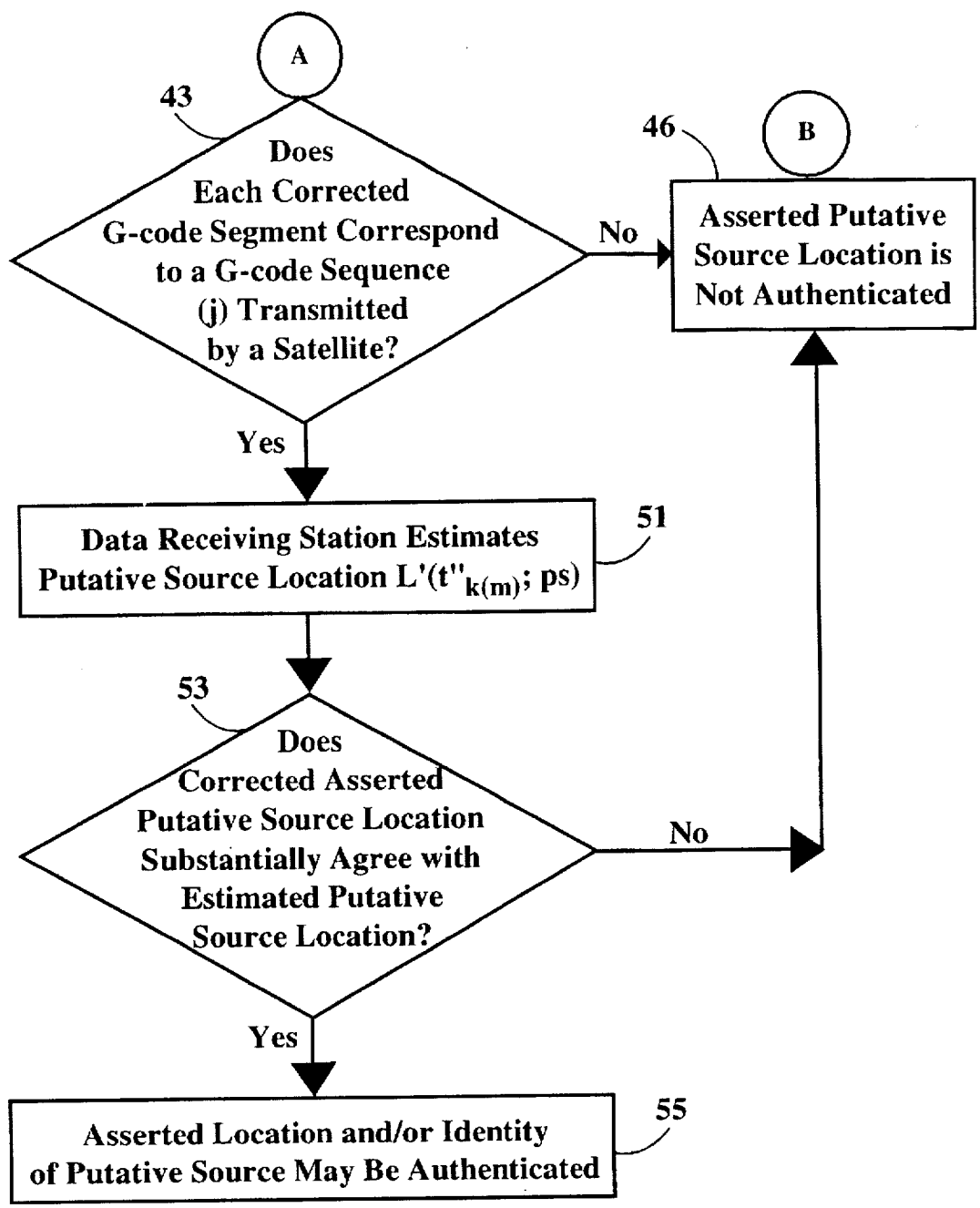
Figure 10A:
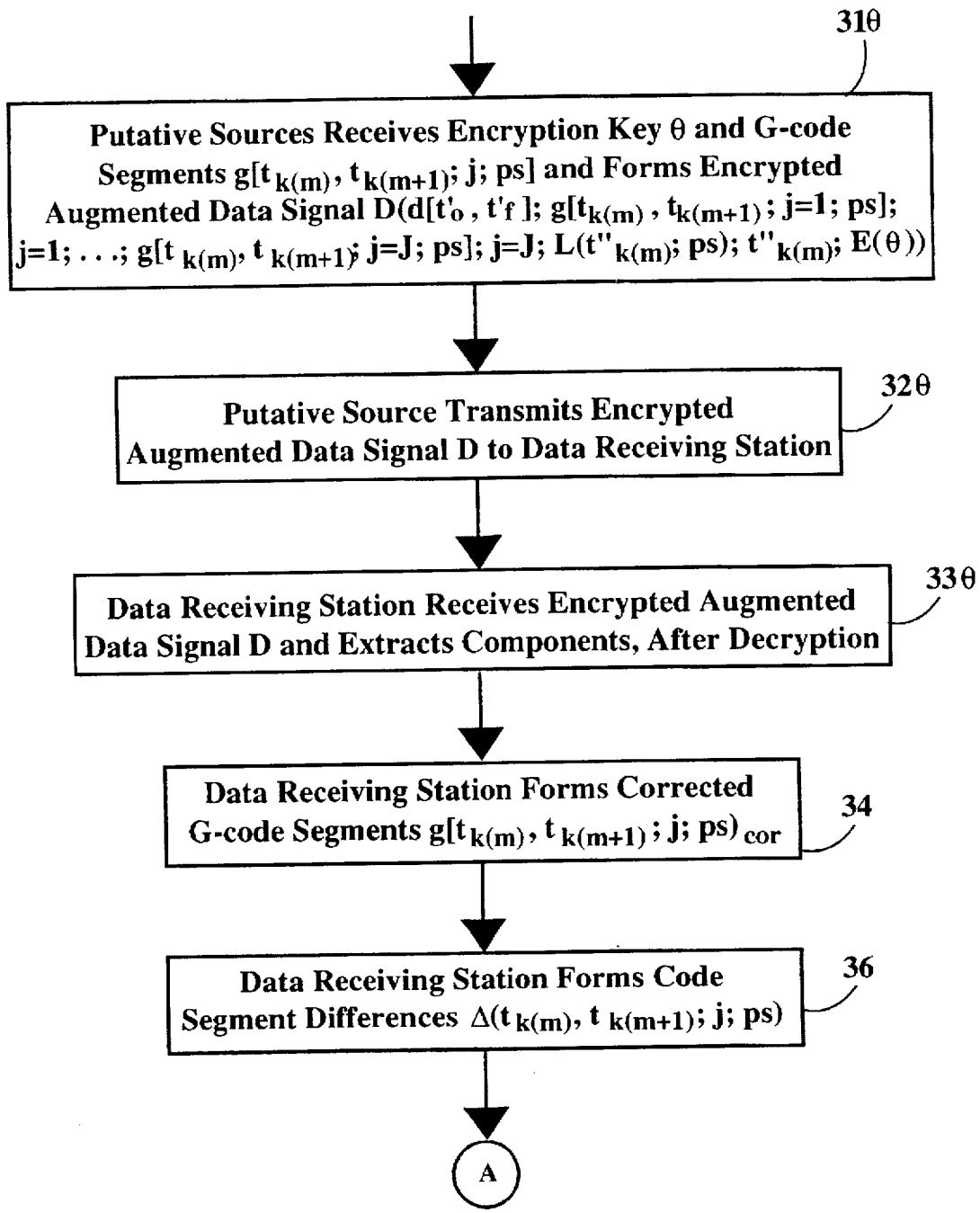
Figure 10B:
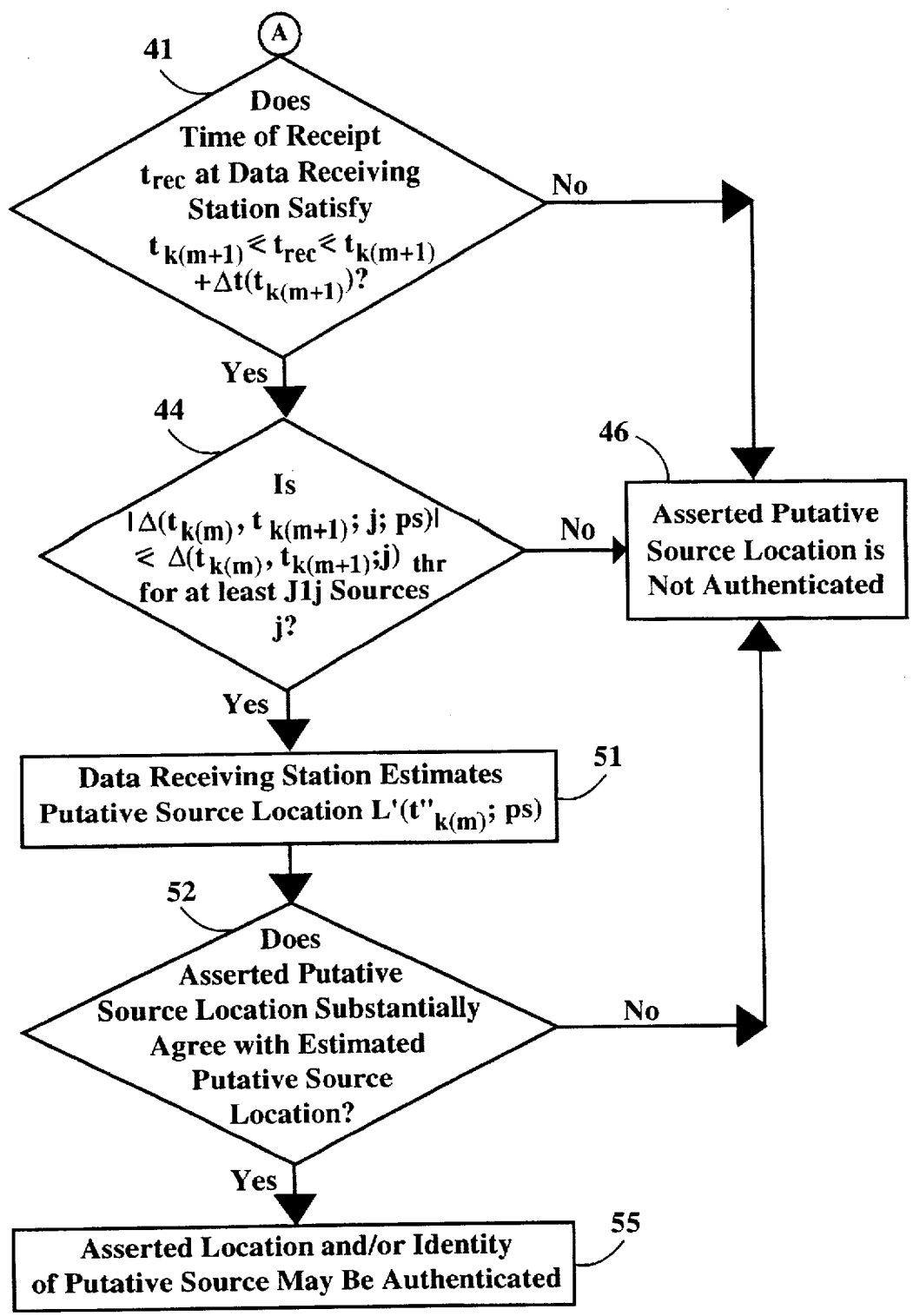
Figure 11A:
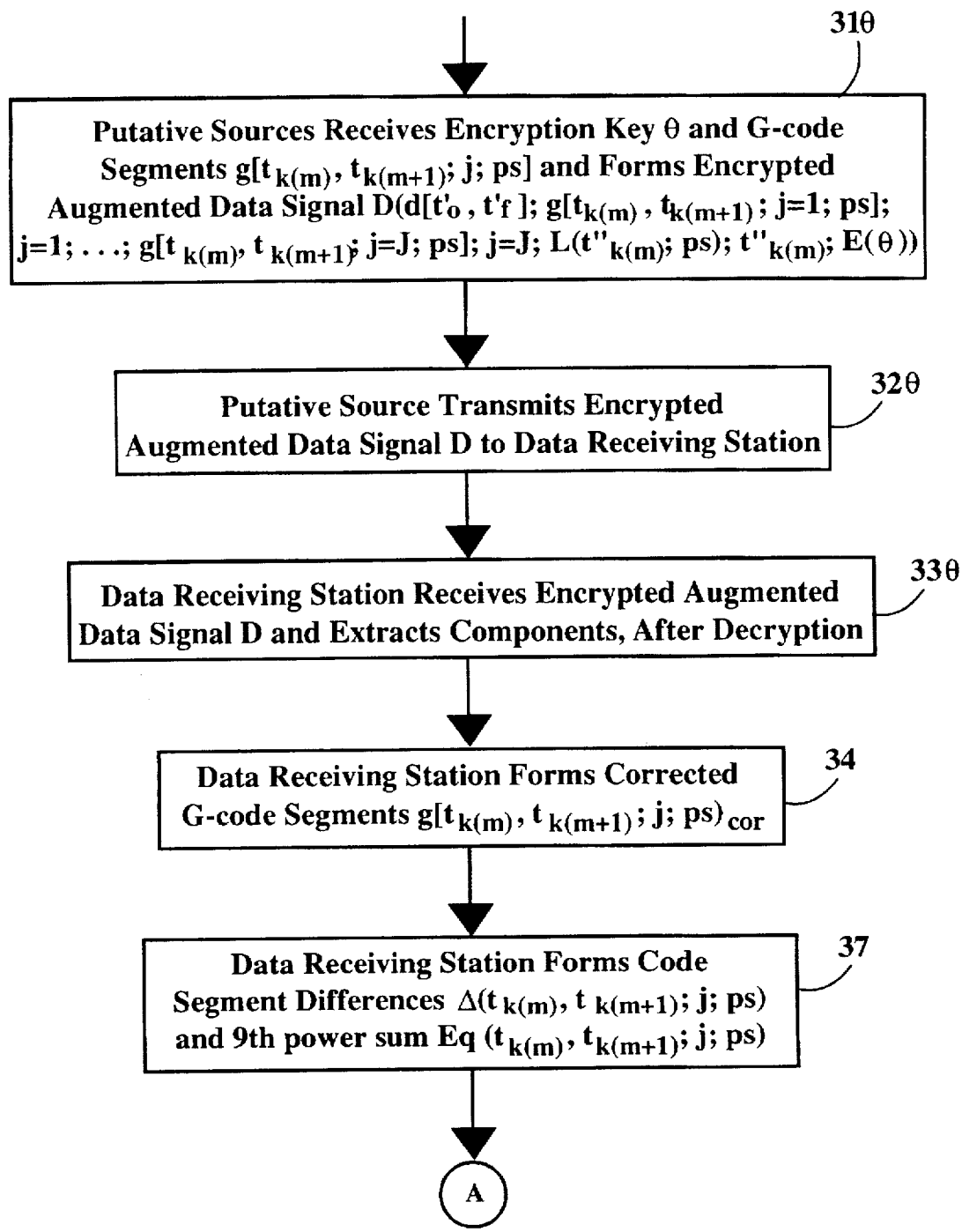
Figure 11B:
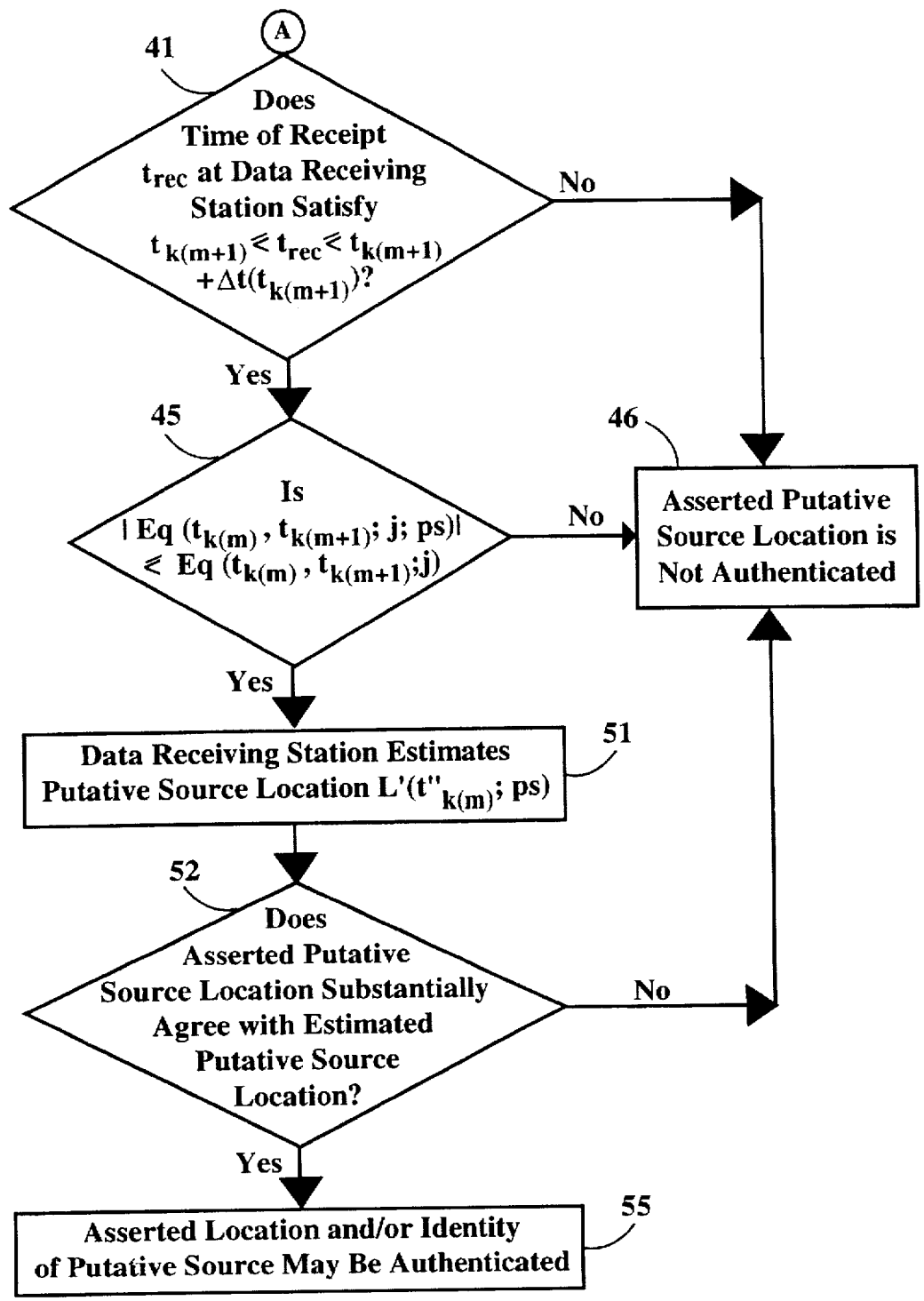

In an alternative version of the sixth embodiment, the augmented data signal D(d[t'$_0$,t'$_r$]; g[t$_{k(m)}$,t$_{k(m+1)}$; j=1; ps]$_{unc}$; j=1; g[t$_{k(m)}$,t$_{k(m+1)}$; j=2; ps]$_{unc}$; j=2; ...; g[t$_{k(m)}$,t$_{k(m+1)}$; j=J; ps]$_{unc}$; j=J; t$_{k(m)}$; t$_{k(m+1)}$; L(t"$_{k(m)}$;ps)$_{unc}$; t"$_{k(m)}$; E(Θ)) must be received by the data receiving station 15 within a selected time interval $t_{k(m+1)} \leq t \leq t_{k(m+1)} + \Delta t(t_{k(m+1)})$ after the end of the time interval $\Delta t_{k(m)} = \{t \mid t_{k(m)} \leq t \leq t_{k(m+1)}\}$, in order for the source of this augmented data signal to be authenticated. If the augmented data signal is not received at the data receiving station 15 within a selected time $\Delta t(t_{k(m+1)})$ after the end of the time interval $\Delta t_{k(m)}$, authentication of the asserted location coordinates (x$_{11}$,y$_{11}$,z$_{11}$) of the putative source 11 at the time t=t"$_{k(m)}$ is withheld. The length $\Delta t(t_{k(m+1)})$ of this selected time interval may be as small as one second and may be as large as several minutes, to account for the time delays in formation, transmission, propagation and receipt of the augmented data signal. If no encryption is incorporated in the data packet(s) containing the augmented data signal, the encryption algorithm E(Θ) is deleted or is replaced by an identity mapping that leaves the original data signal segment d[t'$_0$,t'$_r$], the G-code segments, the time stamps t=t$_{k(m)}$ and t=t$_{k(m+1)}$ the putative source asserted location coordinates L(t'$_r$;ps)$_{unc}$ and the location assertion time t=t"$_{k(m)}$ unchanged. Implementations of this seventh embodiment are illustrated in flow charts in FIGS. 9, 10 and 11. FIGS. 9, 10 and 11 are similar to the respective FIGS. 4, 5 and 6, except that the steps 31, 32 and 33 are replaced by the respective steps 31Θ, 32Θ and 33Θ.

In a seventh embodiment, the coordinates for the asserted location vector r(t$_0$), asserted velocity vector v(t$_0$) and/or asserted acceleration vector a(t$_0$) and/or the asserted boost vector b(t$_0$) for the mobile putative source 11 are received for a previous transmission and authenticated and are used to predict, using Kalman filtering or weighted averaging or "bare" prediction, the next location that the putative source will report, based upon the (unknown) length Δt of time intervening between the preceding report and the next report by the putative source 11. If the next reported location of the putative source is within a predefined region of uncertainty, centered at the predicted location, the putative source 11 is accepted as authentic. In the simplest or bare prediction approach, the location vector L(t) for the putative source 11 at a time t>t$_0$ (but near t$_0$) is estimated to be $$r(t)_{est} = r(t_0) + v(t_0)(t-t_0) + a(t_0)(t-t_0)^2/2. \quad (34)$$

If L(t;ps) is the vector representing the location vector asserted by the putative source 11 at the time t (>t$_0$), this asserted location vector for the putative source 11 is accepted as authentic if and only if $$|r(t;ps) - r(t)_{est}| < d_{thr}, \quad (35)$$

where $d_{thr}$ is a selected positive threshold distance. Implementation of this ninth embodiment is illustrated in a flow chart in FIG. 12.

Figure 12A:
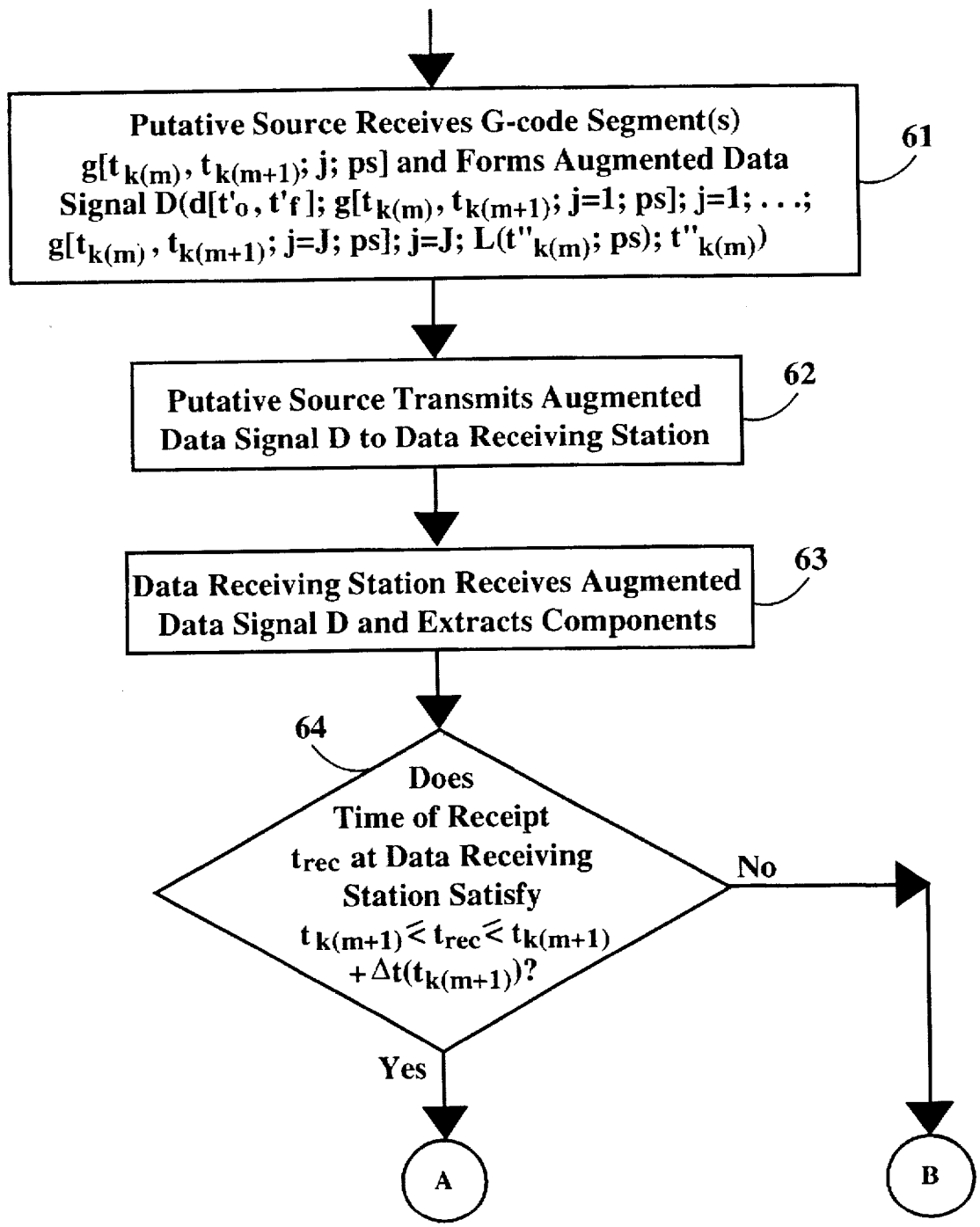
Figure 12B:
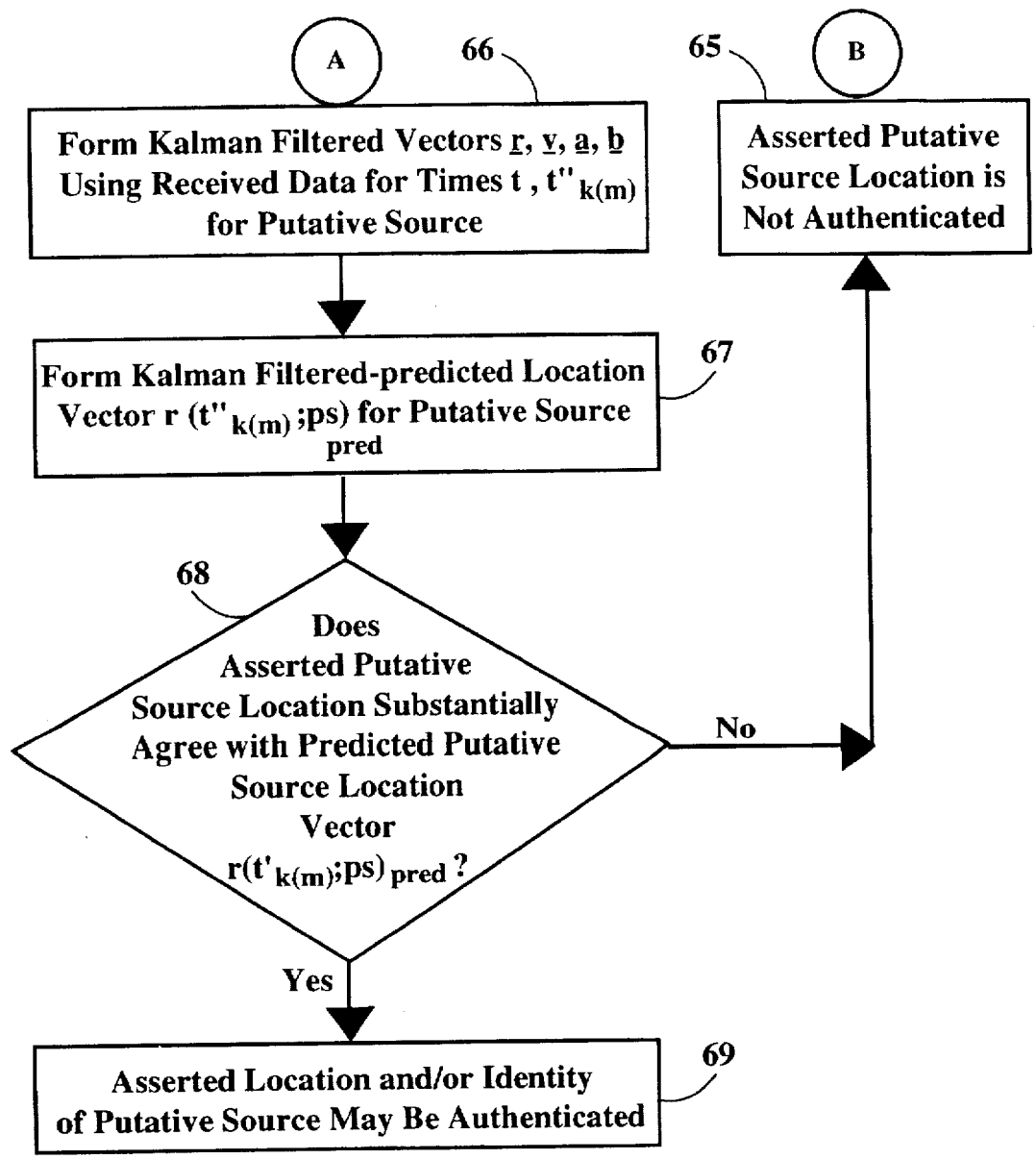

In FIG. 12, a putative source 11 receives G-code signals G(t$_r$;j;ps) and forms G-code segments g[t$_{k(m)}$, t$_{k(m+1)}$; j; ps] in step 61, plus the data signal d(t'$_r$), if any, and forms an augmented data signal D(d[t'$_0$,t'$_r$]; g[t$_{k(m)}$,t$_{k(m+1)}$; j=1; ps]; j=1; g[t$_{k(m)}$,t$_{k(m+1)}$; j=2; ps]; j=2; ...; g[t$_{k(m)}$,t$_{k(m+1)}$; j=J; ps]; j=J; t$_{k(m)}$; t$_{k(m+1)}$; L(t"$^{k(m)}$;ps); t"$_{k(m)}$). In step 62, the putative source transmits the augmented data signal to a data receiving station 15. In step 63, the data receiving station receives the augmented data signal from the putative source and extracts the components of this signal.

In decision step 64, the data receiving station 15 optionally determines the time of receipt, $t_{rec}$, of (the initial part of) the augmented data signal and determines whether this time of receipt satisfies the constraint $$t_{k(m+1)} \leq t_{rec} \leq t_{k(m+1)} + \Delta t(t_{k(m+1)}), \quad (36)$$

where $\Delta t(t_{k(m+1)})$ is a selected positive time value. If the time of receipt $t_{rec}$ does not satisfy the constraint in Eq. (36), the asserted location or identity of the putative source is not authenticated, as indicated in step 65.

If the time of receipt $t_{rec}$ does satisfy the constraint in Eq. (36), the data receiving station forms Kalman-filtered vectors r(t"), v(t"), a(t") and (optionally) b(t") for times t"<t"k (m), using data already received and verified by the data receiving station 15 from the putative source 11, in step 66. In step 67, the data receiving station forms a Kalman filter-predicted location vector r(t"$_{k(m)}$)$_{pred}$ for the putative source for the location assertion time t=t"$_{k(m)}$. In decision step 68, the data receiving station determines whether the Kalman filter-predicted location vector r substantially agrees with the vector corresponding to the asserted location L(t"$_{k(m)}$;ps) for the putative source.

If the answer to the question in step 68 is no, the asserted location or identity of the putative source is not authenticated, as in step 65. If the answer to the question in step 68 is yes, the asserted location or identity of the putative source may be authenticated, as in step 69.

In any of the preceding embodiments, after the data receiving station 15 receives a selected number T (T≥1) of the encrypted augmented data signals $D(d[t'_0,t'_f]$; $g[t_{k(m)},t_{k(m+1)};$ j=1; ps$]_{unc}$; j=1; $g[t_{k(m)},t_{k(m+1)};$ j=2; ps$]_{unc}$; j=2; ... ; $g[t_{k(m)},t_{k(m+1)};$ j=J; ps$]_{unc}$; j=J; $t_{k(m)}$; $t_{k(m+1)}$; $L(t''_{k(m)};ps)_{unc}$; $t''_{k(m)}$; E(Θ)) from a mobile putative source 11 within a time interval of selected length Δt(holdoff) (such as 0.5–5 sec), no further messages from the putative source 11 are accepted within the remainder of the time interval of length Δt(holdoff), to allow the data receiving station 15 time to process and analyze the earlier-received signals. This approach precludes a non-bona fide transmitter from rapidly sending exhaustive signals in an attempt to obtain source authentication by guessing. The remainder of the analysis of the augmented data signal by the data receiving station proceeds as in the first, second, third, fourth, fifth, sixth or seventh embodiments.

In any of the preceding embodiments, "fuzzy logic" is used. A message from a mobile putative source 11 is accepted as authentic if the encryption algorithm E(Θ) (including the identity transformation, which produces cleartext) transmitted by the putative source places this station within a predefined region of uncertainty centered at the location the data receiving station 15 believes is the (exact) location of the true station. Using the language of the first embodiment, if the putative source location L(Θ), as indicated by the inversion of the p-tuple Θ, is within a selected distance p of the asserted location coordinates $(X(t''_{k(m)})_{ps}, y(t''_{k(m)})_{ps}, z(t''_{k(m)})_{ps})$ of the putative source 11, the asserted location or identity of the putative source may be authenticated.

Figure 13A:
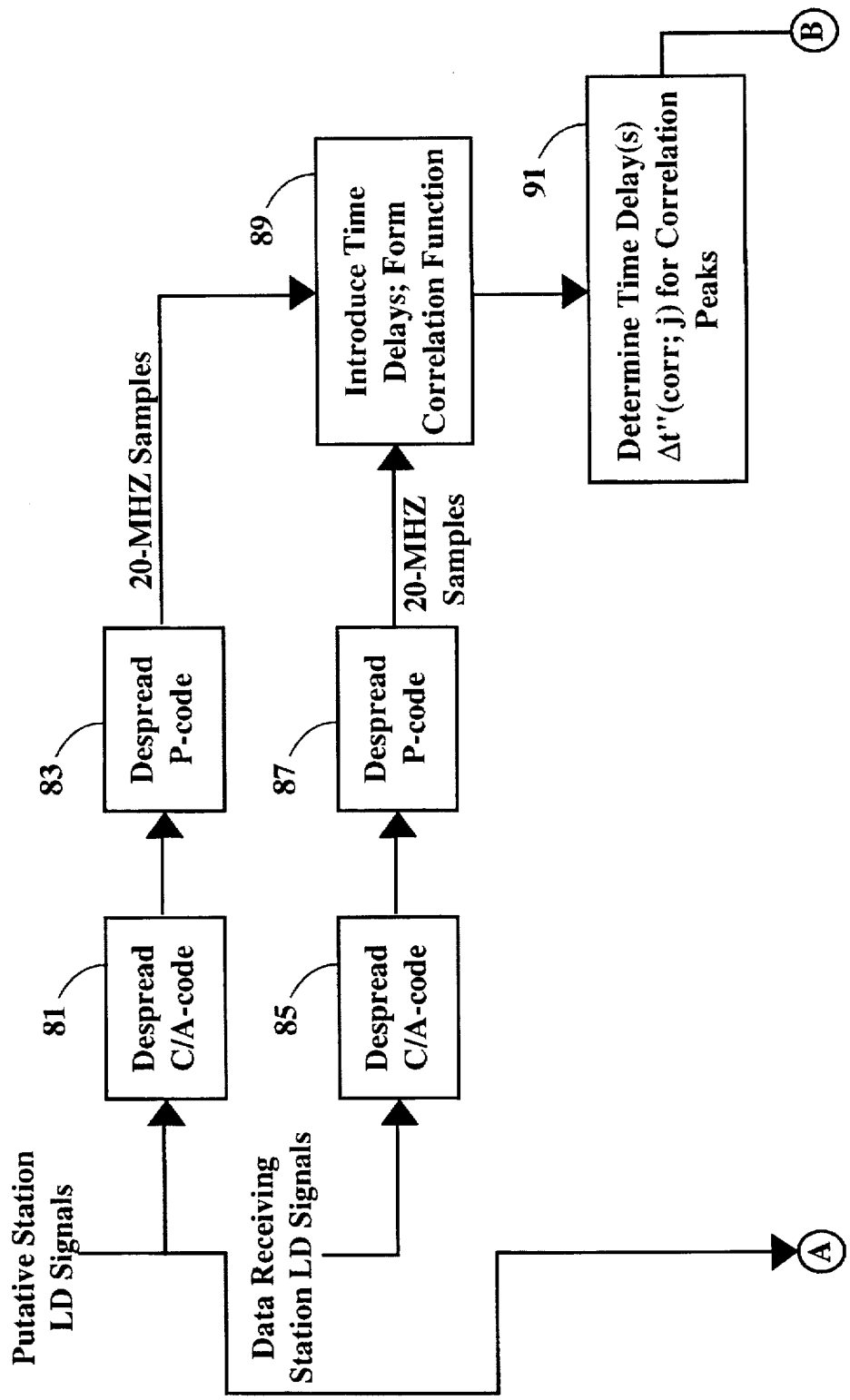
FIGS. 13A, 13B, 14A, 14B, 14C & 14D illustrate apparatus suitable for practice of the invention.
Figure 13B:
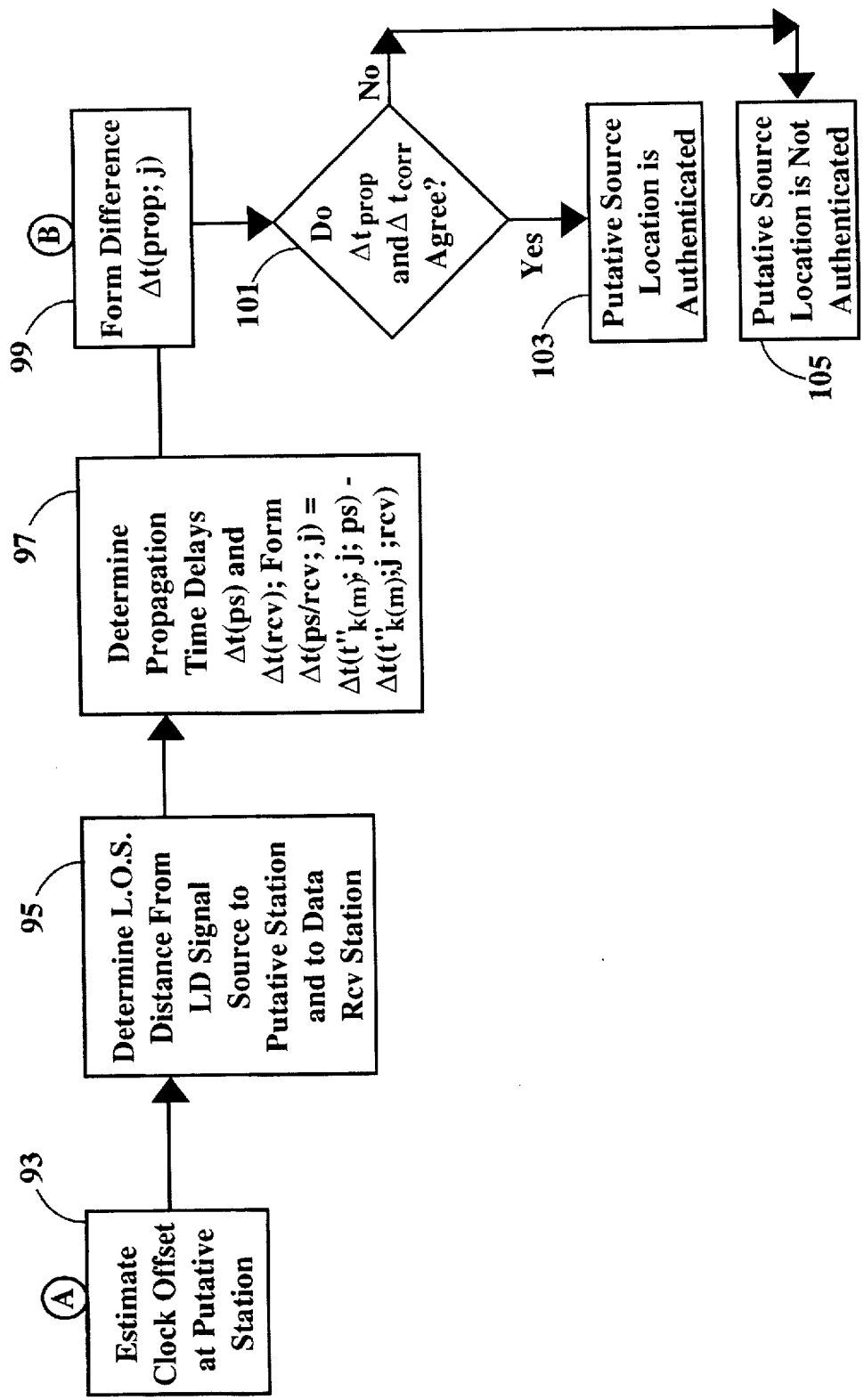

One problem with use of a bit stream, such as the Y-code $\{y(t_n)\}_n$ or the W-code $\{w(t_n)\}_n$, that repeats itself precisely in a repetition time interval of known length, such as Δt=7 days, is that an illegitimate station might successfully simulate its putative location $L(t''_{k(m)};ps$ by using an asserted received signal such as $y(t_n-N\Delta t)$ or $w(t_n-N\Delta t)$, where N is a positive integer. That is, the illegitimate station can assert that the signal it is currently receiving is an LD signal actually received by at the putative location N repetition time intervals ago (N=1, 2, ...). The approaches set forth in the third, fourth, fifth and sixth embodiments above do not suffer from this limitation, because the uncorrected LD signal LD(t,j;ps) received from an LD signal source j at a putative station location can vary unpredictably with time, because of the unpredictable time delays introduced by ionospheric signal propagation, tropospheric signal propagation and multipath. Static or time-independent modeling of signal propagation time delays in the ionosphere and in the troposphere will provide, on average, 30–80 percent of the corresponding measured time delay at any particular time; a substantial fraction of the time delays actually experienced cannot be modeled but must be measured at the time the LD signals are received. The asserted time t=$t''_{k(m)}$ explicitly set forth in the augmented data signal is already verified by comparison of the set of asserted LD signals received,$\{G(t_r,j=1;ps)_{unc}, G(t_r,j=2;ps)_{unc}, ...$ $G(t_r,j=J;ps)_{unc}\}$, with the corresponding estimated set of LD signals, $\{G'(t_r,j=1;ps)_{unc}, G'(t_r,j=2;ps)_{unc}, ...,$ $G'(t_r,j=J;ps)_{unc}\}$, that should have been received at the time t=$t''_{k(m)}$ at the asserted location $L(t''_{k(m)};ps)$. Thus, authentication of the time a putative source has received its asserted LD signals is authenticated as part of the message source authentication process for the first, second, third, fourth, fifth, sixth and seventh embodiments set forth above. FIG. 13 illustrates one approach for obtaining and using the W-code signals to authenticate, or to withhold authentication from, a putative source or its location, based upon comparison of arrival times of corresponding LD signals at the putative source 11 and at the data receiving station 15 in FIG. 1. The data receiving station receives the putative source LD signals G(t;j;ps) (part of the augmented data signal or ADS) and despreads the C/A-code and the P-code portions of these LD signals in steps 81 and 83, respectively. The data receiving station also receives the LD signals G(t;j;rcv) directly from the LD signal sources and despreads the C/A-code and the P-code portions of these LD signals in steps 85 and 87, respectively. The surviving W-code signals W(t;j;ps) and W(t;j;rcv) for the putative source (ADS) and for the data receiving station are time delayed relative to each other, and a correlation function $$\chi(\Delta t; j) = \sum_r W(t_r; j; ps) W(t_r + \Delta t; j; rcv) \qquad (37)$$

is formed, in step 89. In step 91, the time value(s) Δt=Δt" (corr;j) corresponding to one or more local peaks in the quantity χ(Δt) are found.

In step 93, the clock offset error b for the putative source clock is estimated at the data receiving station, based upon the ADS received from the putative source. In step 95, the data receiving station determines the line-of-sight (LOS) distances $d_{LOS}(t''_{k(m)};j;ps)$ and $d_{LOS}(t''_{k(m)};j;rcv)$ of the LD signal source (j) from the putative source and from the data receiving station, respectively, at the location assertion time t=$t''_{k(m)}$. In step 97, the data receiving station determines the signal propagation time delays $$\Delta t(t''_{k(m)};j;ps)=d_{LOS}(t''_{k(m)};j;ps)/c', \qquad (38)$$

$$\Delta t(t''_{k(m)};j;rcv)=d_{LOS}(t''_{k(m)};j;rcv)/c', \qquad (39)$$

and the time difference $$\Delta t(ps/rcv;j)=\Delta t(t''_{k(m)};j;ps)-\Delta t(t''_{k(m)};j;rcv), \qquad (40)$$

where c' is the velocity of electromagnetic signal propagation in the ambient medium. In step 99, the difference $$\Delta t(prop;j)=\Delta t(ps/rcv;j)-\Delta t''(corr;j) \qquad (41)$$

is formed, and in step 101 the data receiving station inquires whether Δt(ps/rcv;j) and Δt"(corr;j) substantially agree with each other. If the answer to this inquiry is yes, the putative source or its asserted location can be authenticated, as in step 103, in one embodiment. If the answer to this inquiry is no, the putative source or its asserted location cannot be authenticated, as in step 105, in one embodiment.

Other approaches can also be used to whether the location assertion time t=$t''_{k(m)}$, and an equivalent time determined by the data receiving station from examination of LD signals received directly from the LD signal sources, are substantially equal to each other.

Figure 14A:
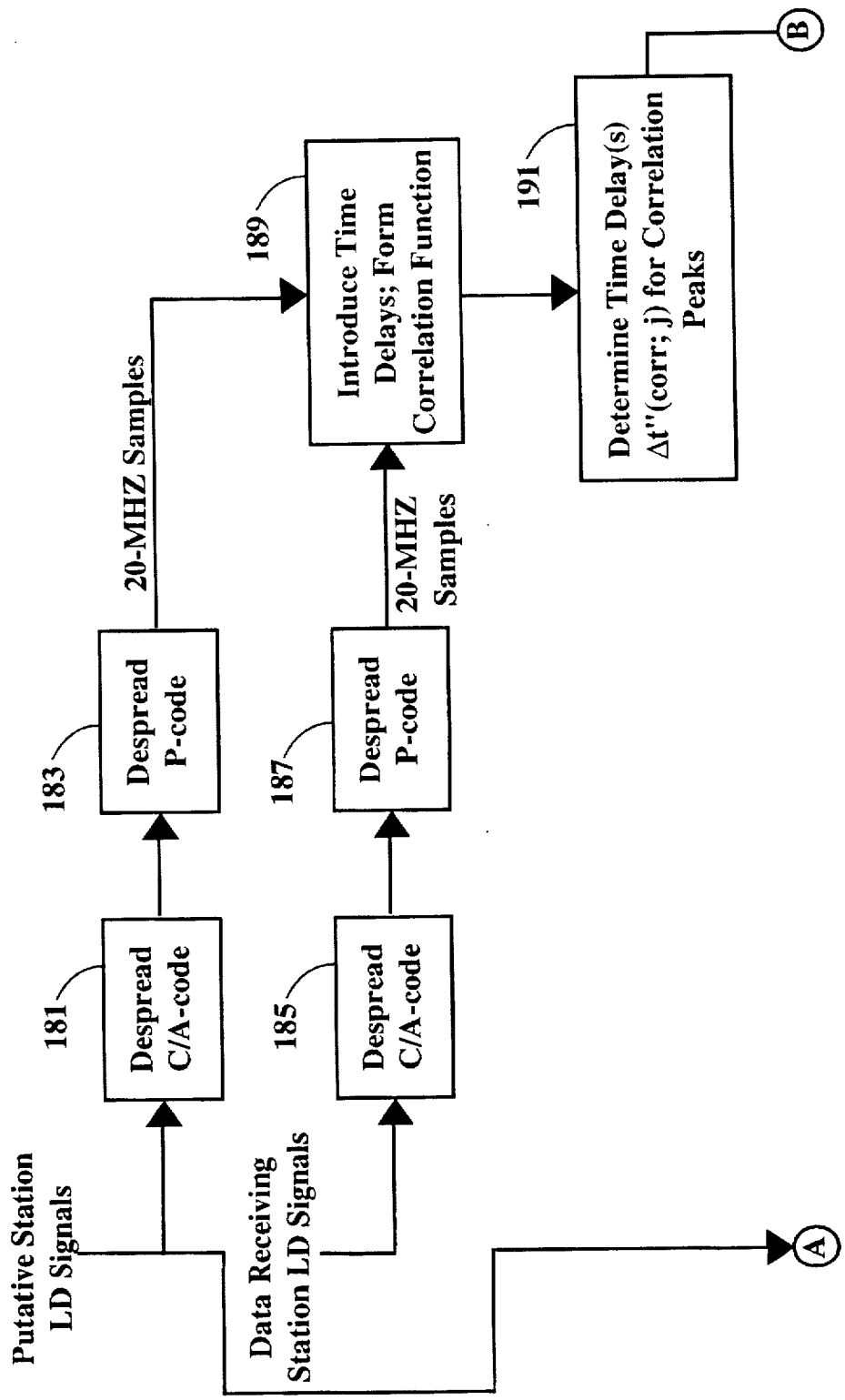
Figure 14B:
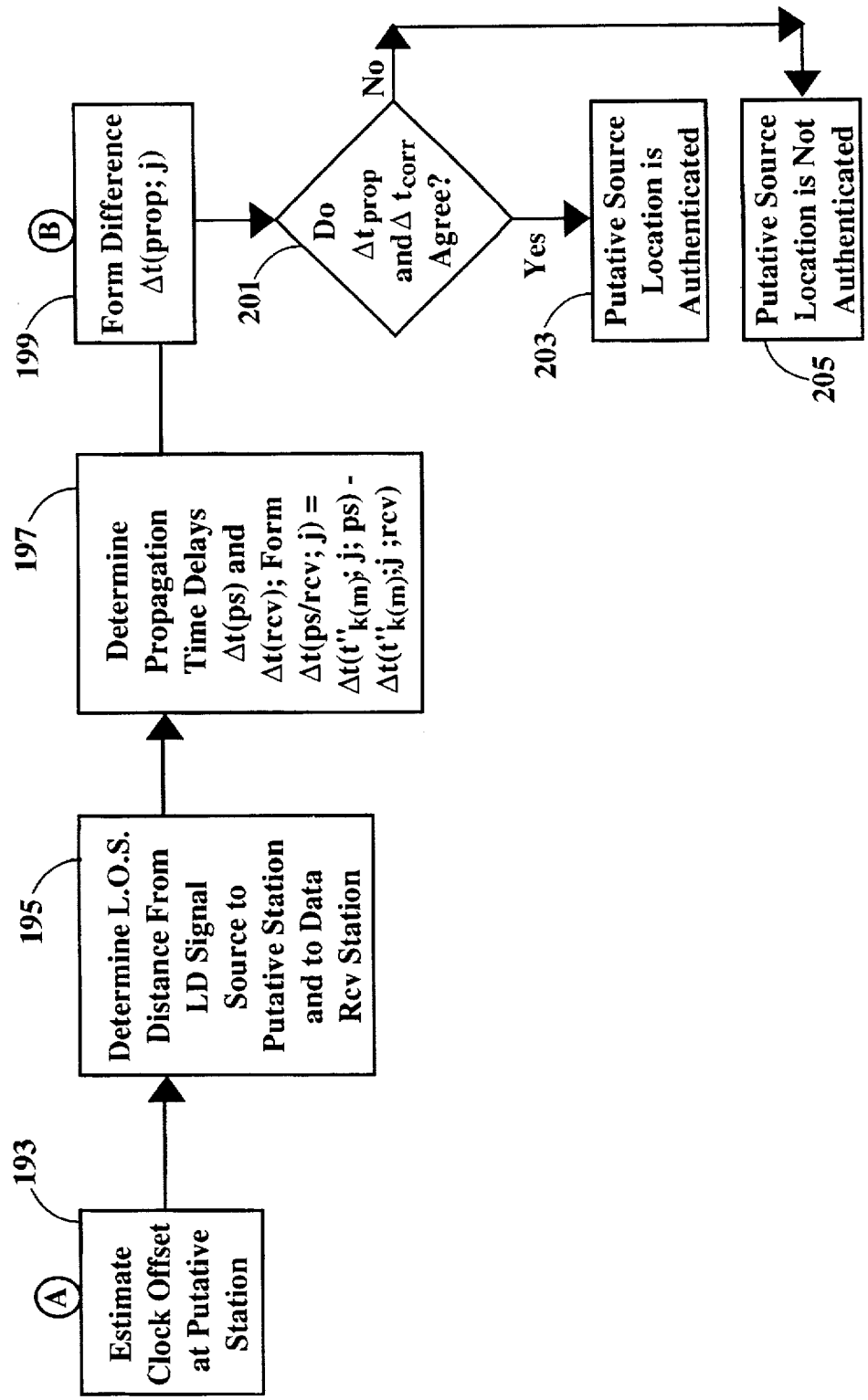
Figure 14C:
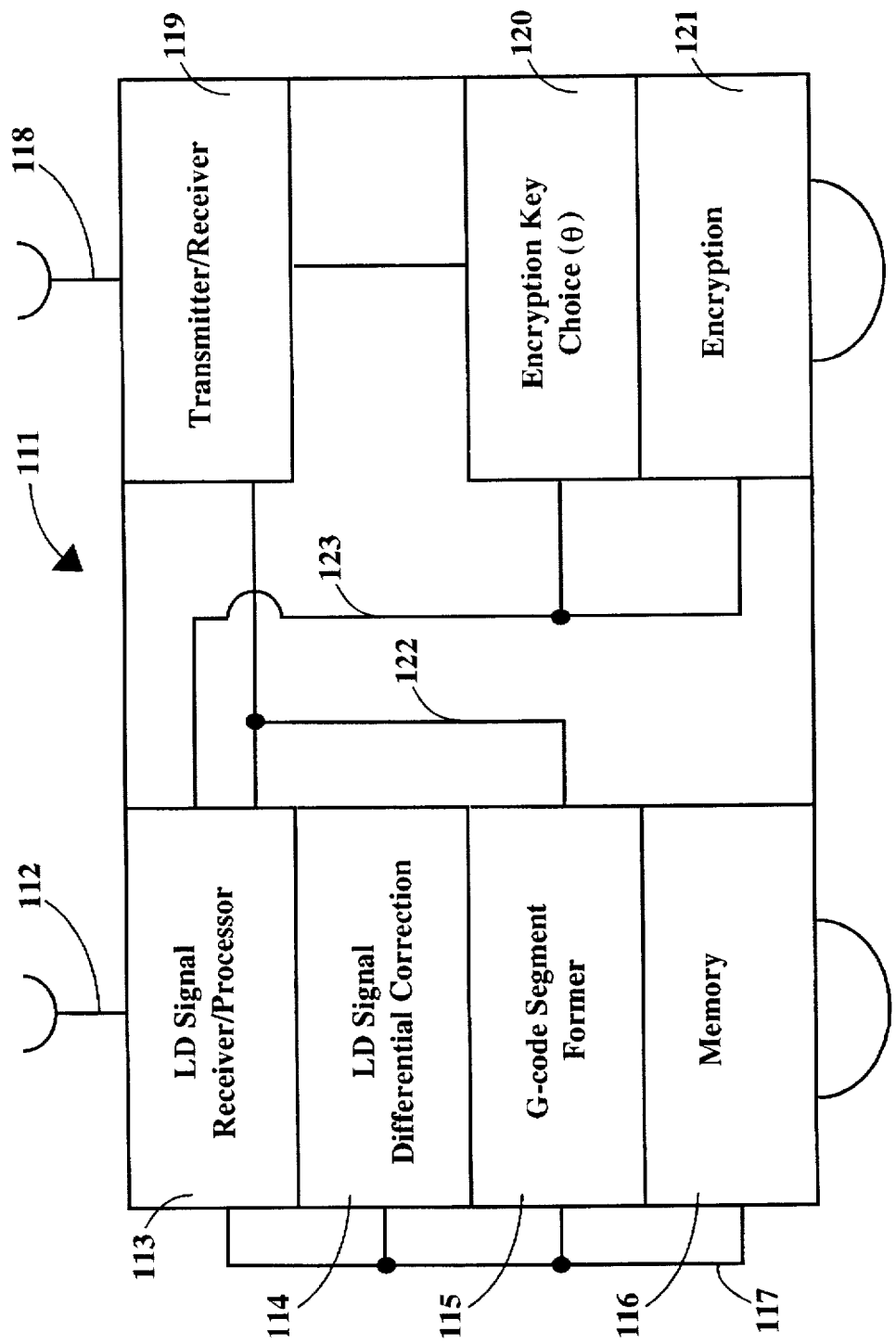
Figure 14D:
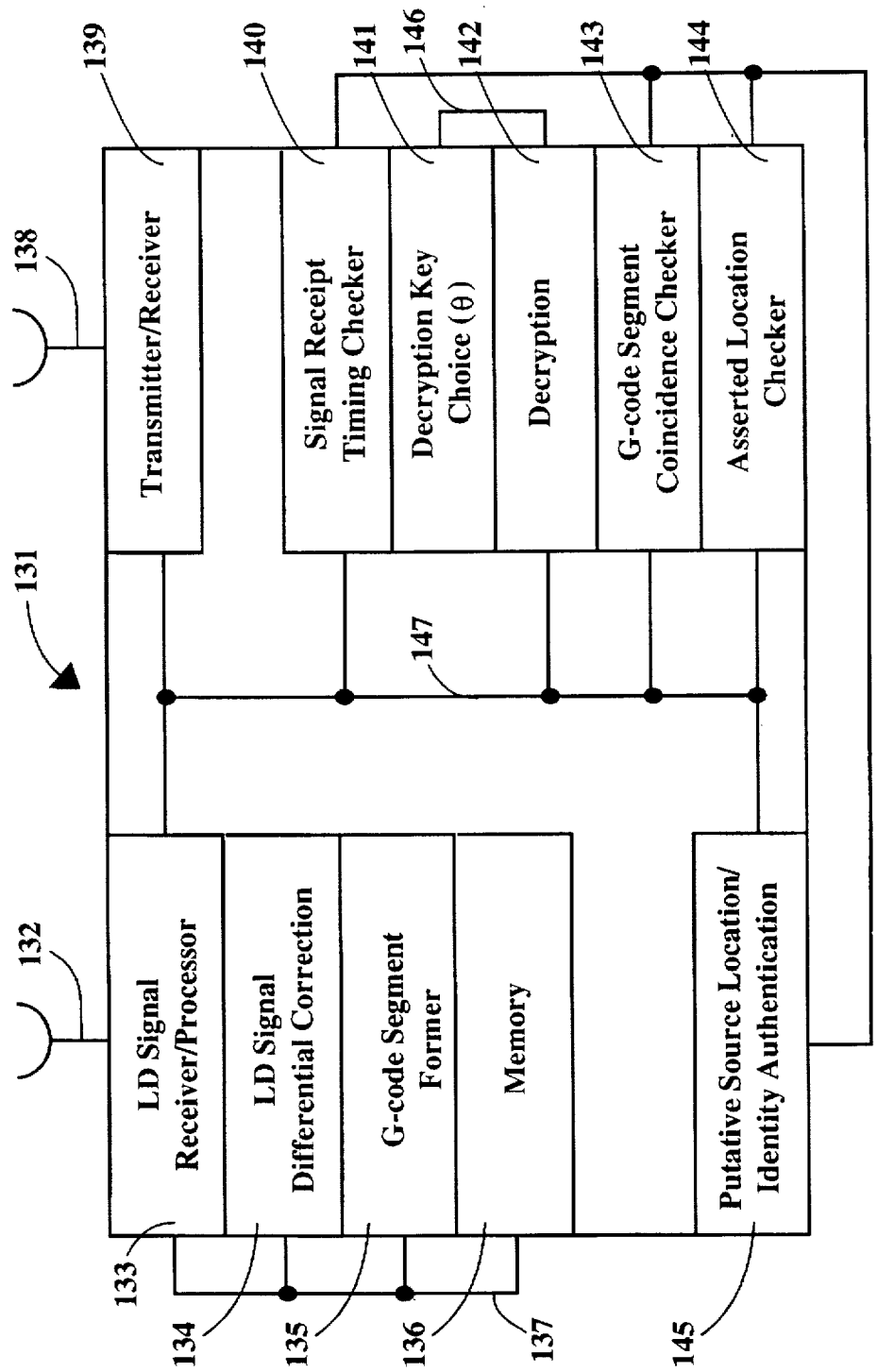

FIGS. 14A and 14B illustrate data signal source apparatus and data receiving station apparatus, respectively, that are suitable for implementing one or more of the embodiments of the invention. The data signal source 111 in FIG. 14A includes an LD signal antenna 112 to receive LD signals from J LD signal sources (J≥1, preferably J≥3). The data signal source 111 also includes an LD signal receiver/processor 113, an LD signal differential correction module 114 (used in the fourth and fifth embodiments, for example), a G-code segment formation module 115 and a memory 116 associated with the G-code segment formation module and/or with the LD signal receiver/processor. A first bus 117 allows communication between these four modules 113, 114, 115 and 116. The data signal station also includes an auxiliary antenna 118, an auxiliary transmitter and/or receiver 119, an encryption key (Θ) choice module 120 (used in the sixth embodiment) and an encryption module 121 (used in the sixth embodiment) that uses the chosen encryption key (Θ) to perform encryption of part or all of the augmented data signal formed by the four modules 113–116. The LD signal receiver/processor 113, the G-code segment formation module 115 and the auxiliary transmitter and/or receiver 119 communicate with each other using a second bus 122. The encryption key choice module 120, the encryption module 121 and the LD signal receiver/processor 113 communicate with each other using a third bus 123.

The data receiving station 131 in FIG. 14B includes an LD signal antenna 132 to receive LD signals from the J LD signal sources ($J \geq 1$, preferably $J \geq 3$). The data signal source 131 also includes an LD signal receiver/processor 133, an LD signal differential correction module 134 (used in the fourth and fifth embodiments, for example), a G-code segment formation module 135 and a memory 136 associated with the G-code segment formation module and/or with the LD signal receiver/processor. A first bus 137 allows communication between these four modules 133–136. The data receiving station 131 also includes an auxiliary antenna 138, an auxiliary transmitter and/or receiver 139, a signal receipt timing checker 140 (for performing step 41 in FIG. 2), a decryption key (Θ) choice module 141, a decryption module 142, a G-code segment coincidence checker 143 (for performing step 42 in FIG. 2), an asserted location checker 144 (for performing step 52 in FIG. 2), and a putative source location/identity authentication module 145 (for performing steps 46 and 55 in FIG. 2). A second bus 146 allows communication between the decryption choice module 141 and the decryption module 142. A third bus 147 allows communication between the modules 133, 139, 140, 142, 143, 144 and 145.

A test for authentication of the message source location or identity, as described in connection with the preceding embodiments, may be used together with one or more other tests for such authentication. In this approach, the message source location or identity is authenticated only if one or more of the above-described tests is satisfied, with one or more additional tests also being required for authentication.

Another application of authentication of location of a message source arises in use of site-licensed software. Typically, the owner of software or other intellectual property ("IP") that is protected by a copyright, a patent or a trade secret will license another organization to make unlimited use of this IP at a prescribed site and/or by a limited group of specified users at the site.

Figure 15:
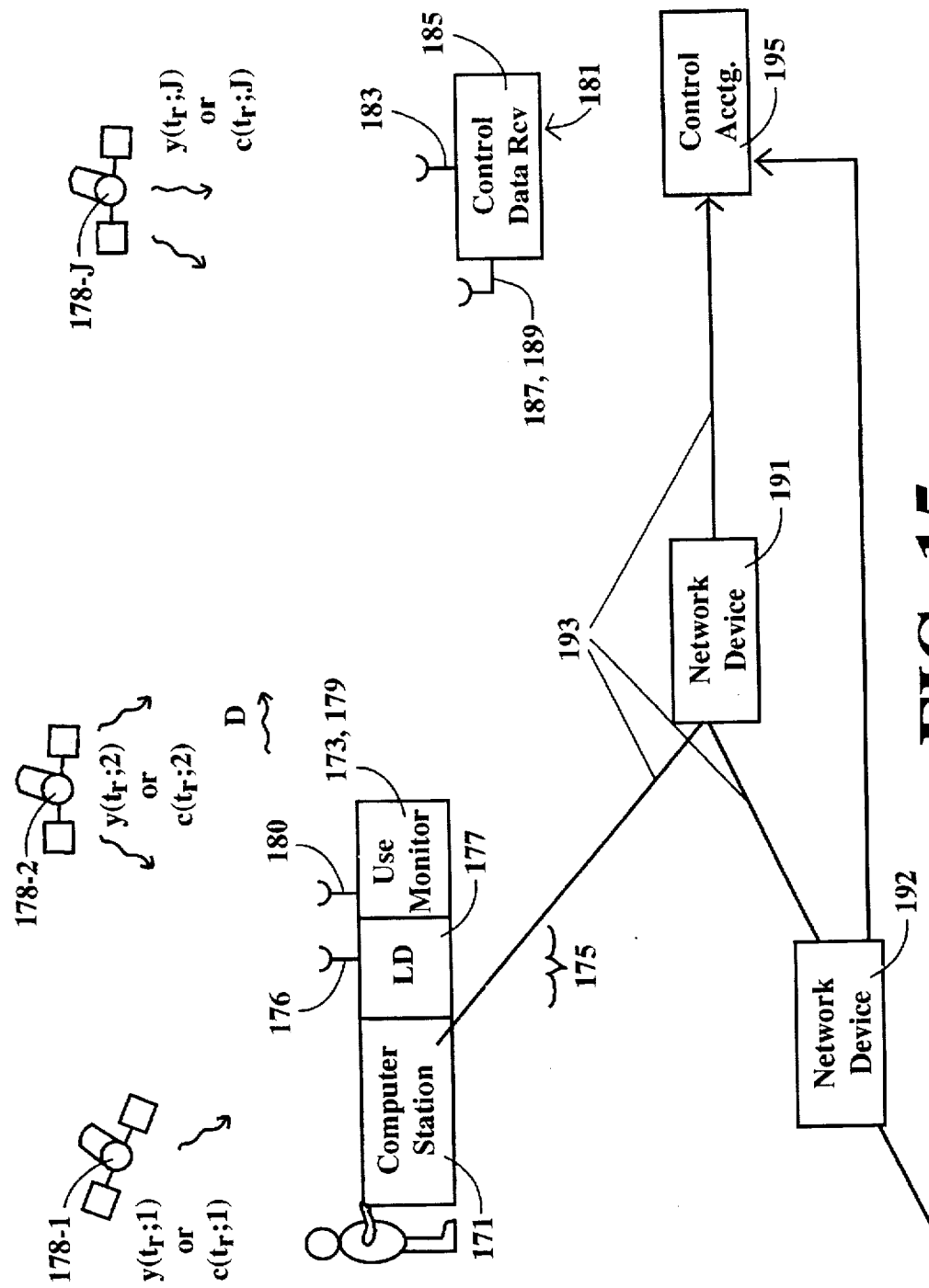
Figure 16:
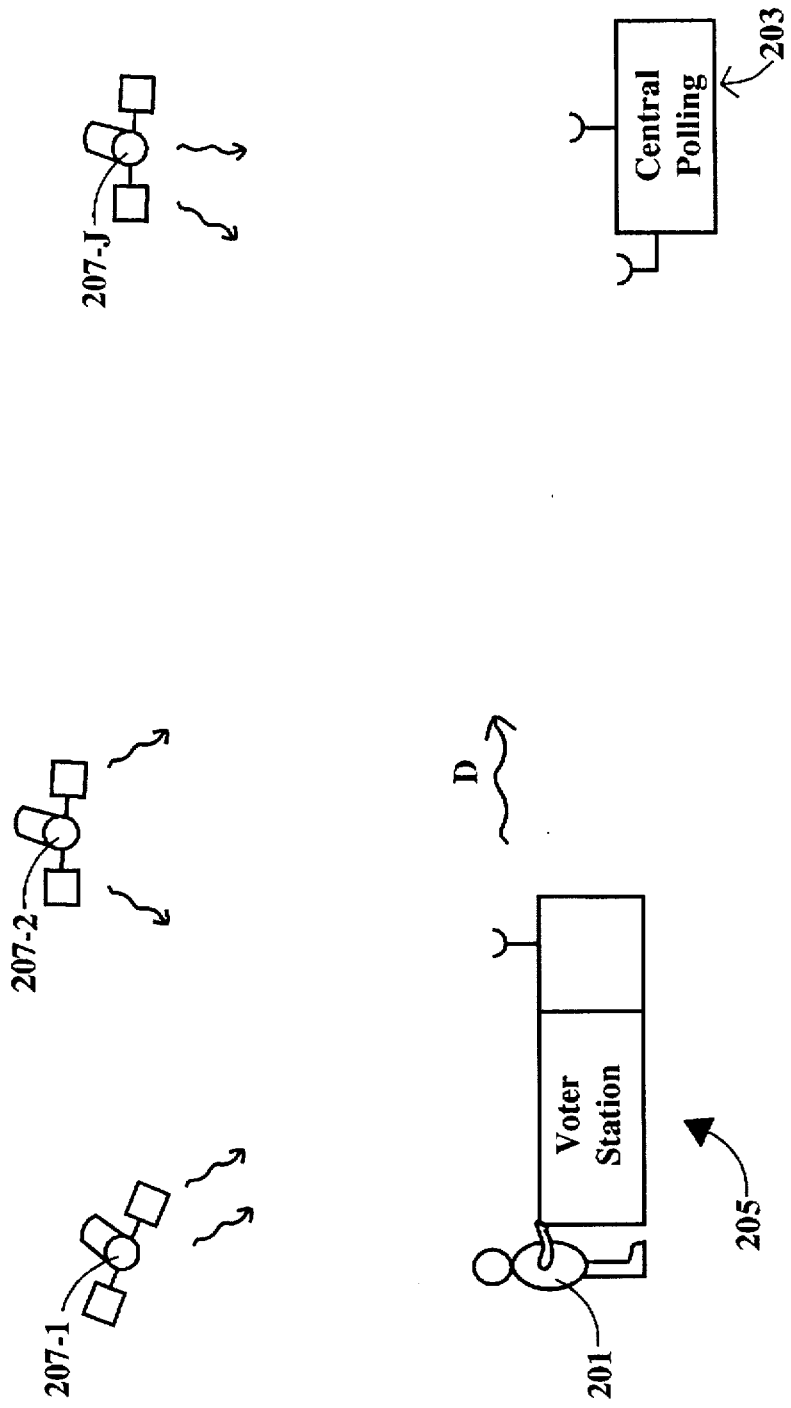

For example, use of this IP might be limited to a subset of less than all the work stations (specified by location or by worker name) on a computer network. The licensor may wish to monitor authorized use of copies of this IP, to verify that that the contract terms are complied with or to facilitate billing for use of this IP. The IP owner might wish to install an IP-use monitor that senses when and where this IP is being used by the licensee's workers, as illustrated in FIG. 15.

In an eighth embodiment, each computer station (cs) or other type of work station 171 where the IP could be used (with or without authorization) is provided with an IP-use monitor 173, as part of the computer station 171, that issues a characteristic signal $S_u$ when the IP is actually being used at that station. The computer station 171 includes a microprocessor and associated memory and also has an LD unit 175 attached thereto that includes an LD signal antenna 176 and an LD signal receiver/processor 177 that receive and process LD signals issued by two or more LD signal sources 178-1, 178-2, 178-3, etc. The LD receiver/processor 177 uses triangulation, signal strength, relative phase values or some other method to determine the present location of the LD antenna 176. The LD may be a Global Positioning System (GPS), a Global Orbiting Navigational Satellite System (GLONASS), an ORBCOM satellite system, Loran-C, Tacan, Decca, Omega, JTIDS Relnav, PLRS, an FM subcarrier signal system disclosed by Kelley et al in U.S. Pat. No. 5,173,710, or any other suitable LD system. The LD unit 173 also has a transmitter and/or receiver 179 and associated antenna 180 that can receive the present location information (such as an augmented data signal, with the data segment $d[t'_0;t'_r]$ deleted and, optionally, the asserted location $L(t''_{k(m)};cs)$ and the location assertion time $t=t''_{k(m)}$ deleted) from the LD receiver/processor 177 and can transmit this information and, optionally, an indicium indicating the particular computer station 171 involved, to a central data receiving station 181, whenever the IP-use monitor 173 indicates that the computer station 171 is using the IP. The central station 181 first estimates the present location of the computer computer station 181, using information contained in the augmented data signal for $J \geq 3$ LD signal sources. The central station 181 checks the estimated present location $L(t''_{k(m)};cs)$ of the computer station against a list of N locations L(auth;n), numbered n=1, . . . , N ($N \geq 1$) of authorized sites for use of the IP. If the computer station present location is within a threshold distance $d_{thr}$ of at least one of these authorized sites, and if the computer station is one of the prescribed computer stations authorized to use the IP, the central station 181 accepts use of the IP by this computer station 171.

Optionally, the central station accumulates the time the computer station 141 uses the IP, for subsequent billing. If the computer station present location is not at or sufficiently close to one of these sites, or if the computer station is not one of the prescribed computer stations authorized to use the IP, as determined from information provided by the IP-use monitor 143, the central station 181 can (1) note this unauthorized use and its accumulated time, (2) issue one or more commands to shut down use of the IP on this computer station 171 or (3) issue an alarm or other message indicating that this computer station 171 is making unauthorized use of the licensed IP.

However, a user of the IP, who operates at an unlicensed location or who is not authorized to use the IP, may attempt to fool the central station 181 by transmitting fabricated information that indicates a false location for the computer station 171 or that includes a false user indicium. The possibility of transmission of a false user indicium is prevented or minimized by assigning each authorized user a confidential indicium that is either (1) transmitted directly to the central station or (2) used to help determine an encryption key that (2a) is used to encrypt a message transmitted to the central station and (2b) used by the central station to decrypt the received message and thus verify that the putative IP user is the authorized user. The approaches used in any of the first eight embodiments may be used here to authenticate the location of the computer station transmitting this information.

The possibility of transmission of false information on the present location of the computer station 171 is prevented or minimized by transmitting some portion of the information contained in the LD signals L'(t;j) from the LD signal source no. j to the central station 181 for analysis.

The central station 181 includes an electronic almanac that indicates, with an acceptable inaccuracy, what should be the LD signal values LD(t,j;cs) received by a computer station (cs) at time t, if this computer station is located at the site the computer station claims to be transmitting from. If the transmitted LD signals L'(t;j;cs) do not agree, within an acceptable error margin, with the known LD signals LD(t;j) for the putative computer station site, the central station 181 concludes that the putative site is not the actual site of the computer station 141 and responds accordingly.

In another version of this eighth embodiment, the IP-use monitor 173 and the LD unit 175 work together to shut down or preclude use of the IP, if the present location of the computer station 171, as determined by the LD module, is not at or sufficiently near an authorized site. Here, the LD signal sources 178-1, 178-2, 178-3 must be in motion or these sources must transmit CDMA signals so that the LD signals received from each LD signal source vary with time in an unpredictable manner. The LD signals may be time-varying pseudorange measurements received from GPS or GLONASS satellites, the number and/or constellation of satellites in view at the time a location fix is made, the perceived locations of the in-view satellites in their respective orbits, time-varying CDMA signals received and the associated signal propagation time delays (based on the known locations of the CDMA signal sources), or any other suitable time-varying signals whose measured values are unique for any given location and cannot be easily predicted for an arbitrary location.

In a ninth embodiment, an owner of a repeater, bridge, router or gateway ("network device") 191 and 192 in FIG. 15, which charges for utilization of the services of its network device, interrogates a packet or frame as the packet or frame passes along a network 193 and through the network device, notes the location and time of interrogation by this network device and the direction of passage of the packet or frame, and levies a charge, which may be based on the size of the packet or frame or on some other measurable attribute. The charge levied, the location of the network device 191, the time for passage and direction of passage of the packet or frame, and/or the attribute used are recorded and transmitted to a central accounting station 195 for final determination of the charge assessed for use of the network device 191.

In a tenth embodiment, shown in FIG. 15, a voter 201 is polled on a particular election issue or candidacy, using a central polling station 203 that transmits polling signals via a network to a plurality of individual voter stations 205. The voter station 205 includes LD apparatus similar to that shown in FIG. 14A, and the central polling station 203 includes LD and authentication apparatus similar to that shown in FIG. 14B. The "vote" cast by the voter 201 and a voter indicium (registration number) are placed in an augmented data signal, similar to the augmented data signals discussed above, which is transmitted to the central polling station, for authentication of the asserted location and identity of the voter 201 and for possible addition of this voter's vote to the other votes being accumulated at the central polling station 203. Use of this approach would preclude, or make more difficult, the "vote early and often" maneuvers, by verifying both (1) the identity of the voter and (2) the voter station where the voter (first) cast his or her vote.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=154\ f0$ and $f2=120\ f0$ of a base frequency $f0=10.23$ MHz. The Li signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of $10\ f0=10.23$ MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

Alternatively, the GPS or GLONASS signals may be replaced by Loran-C signals produced by three or more Loran signal sources positioned at fixed, known locations, for location determination A ground-based Loran-C system relies upon a plurality of ground-based signal towers, preferably spaced apart 100–300 km, that transmit distinguishable, time coded electromagnetic signals that are received and processed by a Loran signal antenna and Loran signal receiver/processor. A representative Loran system is discussed in *Loran-C User Handbook*, Department of Transportation, U.S. Coast Guard, Commandant Publication P16562.5, 18 Nov. 1992 (ISBN 0-16-041594-2), and by Magee et al in U.S. Pat. No. 3,665,086, which are incorporated by reference herein. If a time-coded message sequence is received from each of three Loran transmitters, the relative time delays between these three messages can be used to determine the location of the signal receiver/processor with an estimated inaccuracy of the order of one hundred meters. One disadvantage of use of a Loran system, vis-a-vis an SATPS location determination system, is that a large number of tall structures, with transmitters mounted thereon, may be needed to cover a given area with a Loran system; whereas a relatively small number of GPS or GLONASS satellites suffice for location determination using a GPS or GLONASS configuration. Using a ground-based location determination system, such as Loran, a Loran signal antenna and receiver/processor would replace the GPS signal antenna and receiver/processor in FIG. 1, with all other features remaining as before. Loran-C signals use carrier frequencies of the order of 100 kHz and have maximum reception distances of the order of hundreds of kilometers.

Other ground-based radiowave signal systems that are suitable for use as part of an LD system include Omega, Decca, Tacan, JTIDS Relnav (U.S. Air Force Joint Tactical Information Distribution System) and PLRS (U.S. Army Position Location and Reporting System) and are summarized by Logsdon, op cit, pp. 6–7 and 35–40, incorporated by reference herein.

The combined use of FM subcarrier signals, as discussed by Kelley et al in U.S. Pat. No. 5,173,710 (incorporated by reference herein), for location determination inside a building or similar structure plus SATPS or ground-based LDS signals for location determination outside a building or similar structure can also provide a satisfactory LDS in most urban and suburban communities.

The preceding discussion has focused on determination of putative source locations, such as $L(t''_{k(m)}; j, ps)$, and data receiving station locations in a three-dimensional coordinate system. The approaches discussed here are easily extended to determination of these locations in an N-dimensional coordinate system (N=1, 2, 3).

The invention provides several tests for authentication of a putative source or its location. These approaches can be combined, for example, to provide a sequence of tests, all of which must be satisfied before the putative source or its location is authenticated. Imposition of a sequence of tests for authentication increases the difficulty, and the associated expense, for a putative source that is not located near an asserted location to successfully simulate an augmented data signal transmitted from the asserted location. This simulation might require use of a device that stores, or otherwise obtains, a confidential code such as the W-code. It is unlikely, although not impossible, that any sequence will be spoof-proof in all situations.

We claim:

1. A method for authenticating the location of a source for a message transmitted from a data signal source to a data receiving station, the method comprising the steps of:

receiving, at a data signal source or putative source (ps), a data signal, defined at a sequence of two or more times and changing with time, and receiving measurable location determination (LD) signals from at least one LD signal source at a sequence of two or more LD signal receipt times;

forming at the data signal source and transmitting to the data receiving station an augmented data signal that includes (1) a segment of data signal values, (2) at least one segment of LD signal values received between a selected first LD signal receipt time and a selected second LD signal receipt time, (3) the values of the selected first and second LD signal receipt times, (4) an indicium identifying the LD signal source for each segment of LD signal values included in the augmented data signal, and (5) an asserted location for the data signal source and an asserted data source location time for which this location is asserted, where the asserted data source location time lies in or near a range of times between the selected first and second LD signal receipt times; and receiving the augmented data signal at the data receiving station, estimating a location of the data signal source from information contained in the augmented data signal, comparing the asserted location with the estimated location, and authenticating the asserted location of the data signal source only if the asserted location and the estimated location substantially agree with each other.

2. The method of claim 1, further comprising the step of authenticating said asserted location of said data signal source only if said augmented data signal is received at said data receiving station within a time interval of a selected length after said at least one segment of LD signal values is asserted to have been received by said data signal source.

3. The method of claim 1, wherein said step of causing said data receiving station to compare said asserted location with said estimated location comprises the steps of:

forming a distance function $$S_s = \{a|x(t''_{k(m)};ps) - x'(t''_{k(m)};ps)|^s + b(y(t''_{k(m)};ps) - y'(t''_{k(m)};ps)|^s + c|z(t''_{k(m)};ps) - z'(t''_{k(m)};ps)|^s\}^{1/s},$$

where s is a selected positive parameter, where a, b and c are selected non-negative constants and at least one constant a, b and c is positive, where $(x(t''_{k(m)};ps), y(t''_{k(m)};ps), z(t''_{k(m)};ps))$ are said asserted location coordinates, and where $(x'(t''_{k(m)};ps), y'(t''_{k(m)};ps), z'(t''_{k(m)};ps))$ are said estimated location coordinates; and determining whether the distance function satisfies a relation $S_s \leq S_{s,thr}$, where $S_{s,thr}$ is a selected positive value.

4. A method for authenticating the location of a source for a message transmitted from a data signal source to a data receiving station, the method comprising the steps of:

receiving, at a data signal source or putative source (ps), a data signal, defined at a sequence of two or more times and changing with time, and receiving measurable location determination (LD) signals from at least one LD signal source at a sequence of two or more LD signal receipt times;

forming at the data signal source and transmitting to the data receiving station an augmented data signal that includes (1) a segment of data signal values, (2) at least one segment of LD signal values received between a selected first LD signal receipt time and a selected second LD signal receipt time, (3) the values of the selected first and second LD signal receipt times, (4) an indicium identifying the LD signal source for each segment of LD signal values included in the augmented data signal, and (5) an asserted location for the data signal source and an asserted data source location time for which this location is asserted, where the asserted data source location time lies in or near a range of times between the selected first and second LD signal receipt times;

receiving at the data receiving station the augmented data signal and an LD signal from at least one selected LD signal source for which a segment of LD signal values is included in the augmented data signal;

estimating, at the data receiving station, a segment of LD signal values that should have been received at the data signal source between the selected first and second LD signal receipt times, based on the asserted location, for the at least one selected LD signal source, and comparing the estimated segment of LD signal values with the segment of LD signal values contained in the augmented data signal for the at least one selected LD signal source; and authenticating the asserted location of the data signal source only if the estimated segment of LD signal values and the segment of LD signal values contained in the augmented data signal for the at least one selected LD signal source substantially agree with each other.

5. The method of claim 4, further comprising the steps of:

providing said LD signals from said LD signal sources;

providing said data receiving station with known location coordinates;

causing said data receiving station to use its known location coordinates and information from said augmented data signal to determine estimated location coordinates for said data signal source corresponding to said asserted location time;

causing said data receiving station to compare said asserted location coordinates of said data signal source with the estimated location coordinates for said data signal source; and determining that said asserted location of said data signal source is approximately the actual location of said data signal source only when said asserted location coordinates and the estimated location coordinates of said data signal source approximately agree with each other.

6. The method of claim 4, further comprising the step of authenticating said asserted location of said data signal source only if said augmented data signal is received at said data receiving station within a time interval of a selected length after said at least one segment of LD signal values is asserted to have been received by said data signal source.

7. The method of claim 6, further comprising the step of choosing said LD signals to be confidential signals.

8. The method of claim 6, further comprising the steps of:

choosing as said LD signal sources a group of Global Positioning System (GPS) satellites, that transmit GPS Y-code signals with signal values Y(t,j) received from a GPS satellite numbered j (j=1, ..., J; J≥1) with an associated frequency f1;

defining a first set of LD signal values Y(t,j;ps) to be the signal values Y(t'',j);

defining said LD signals to be the values of the signals $W(t,j;ps) = Y(t,j;ps) \oplus P(t,j;ps)$, where $\{P(t,j;ps)\}_r$ is a selected signal value sequence with an associated maximum frequency of f1; and selecting the signal value sequence $\{P(t,j;ps)\}_r$ so that the signal $W(t,j;ps) = Y(t,j;ps) \oplus P(t,j;ps)$ has an associated maximum frequency f2 that is <<f1.

9. The method of claim 6, further comprising the steps of:

choosing, as said LD signals, Global Positioning System (GPS) P-code signals with signal values P(t,;j) received from a GPS satellite numbered j (j=1, ..., J; J≧1); and defining said LD signal values to be the signal values P(t,;j).

10. The method of claim 6, further comprising the steps of:

choosing, as said LD signals, Global Positioning System (GPS) C/A-code signals with signal values C(t,;j) transmitted by a GPS satellite numbered j (j=1, ..., J; J≧1); and defining said LD signal values to be the signal values C(t,;j).

11. The method of claim 4, further comprising the steps of:

providing said data receiving station with known location coordinates;

providing said LD signals from said LD signal sources, where J≧3;

obtaining, at said data receiving station, LD correction signals ΔG(t;j;rcv), for uncorrected LD signals G(t;j;rcv)$_{unc}$ received at said data receiving station from said LD signal source number j (j=1, ..., J; J≧1), that approximately correct for time varying effects of at least one of (1) propagation of said LD signals through said ionosphere before said LD signals arrive at said data receiving station, (2) propagation of said LD signals through said troposphere before said LD signals arrive at said data receiving station, (3) receipt of multipath LD signals at said data receiving station, and (4) the presence of selective availability upon said LD signals that arrive at said data receiving station;

forming corrected LD signal segments g{$t_{k(m)}$,$t_{k(m+1)}$;j;ps}$_{cor}$={G(t,;j;ps)$_{cor}$=G(t,;j;ps)$_{unc}$+ ΔG(t;j;rcv)|$t_{k(m)}$≦$t_r$>$t_{k(m)+1}$} for LD signal source number j, and estimating corrected location coordinates (x'(t"$_{k(m)}$;ps)$_{cor}$, y'(t"$_{k(m)}$;ps)$_{cor}$, z'(t"$_{k(m)}$;ps)$_{cor}$) for said data signal source at said location assertion time t=t"$_{k(m)}$, based upon the corrected LD signal segments g{$t_{k(m)}$,$t_{k(m+1)}$;j; ps}$_{cor}$ and the known location coordinates of said data receiving station;

comparing, at said data receiving station, asserted location coordinates (x(t"$_{k(m)}$;ps), y(t"$_{k(m)}$;ps), z(t"$_{k(m)}$;ps)) of said data signal source with estimated corrected location coordinates (x'(t"$_{k(m)}$;ps)$_{cor}$, y'(t"$_{k(m)}$;ps)$_{cor}$, z'(t"$_{k(m)}$;ps)$_{cor}$) of said data signal source; and determining that the asserted location of said data signal source is approximately the actual location of said data signal source only if the asserted location coordinates and the estimated corrected location coordinates approximately agree with each other.

12. The method of claim 11, wherein said step of comparing, at said data receiving station, said asserted location coordinates (x(t"$_{k(m)}$;ps), y(t"$_{k(m)}$;ps), z(t"$_{k(m)}$;ps)) with said estimated corrected location coordinates (x'(t"$_{k(m)}$;ps)$_{cor}$, y'(t"$_{k(m)}$;ps)$_{cor}$, z'(t"$_{k(m)}$;ps)$_{cor}$) comprises the steps of:

forming a distance function $$S_r=\{a|x(t"_{k(m)};ps)-x'(t"_{k(m)};ps)_{cor}|^s+b|y(t"_{k(m)};ps)-y'(t"_{k(m)};ps)_{cor}|^s+ c|z(t"_{k(m)};ps)-z'(t"_{k(m)};ps)_{cor}|^s\}^{1/s},$$

where s is a selected positive parameter, where a, b and c are selected non-negative constants and at least one constant a, b and c is positive; and determining whether the distance function satisfies a relation $$S_r > S_{s,thr},$$

where $S_{s,thr}$ is a selected positive value.

13. The method of claim 4, further comprising the steps of:

receiving, at said data receiving station, LD correction signals ΔG(t;j;rcv), for uncorrected LD signals G(t;j;rcv)$_{unc}$ received at said data receiving station from said LD signal source number j (j=1, ..., J; J≧1), that approximately correct for time varying effects of at least one of (1) propagation of said LD signals through said ionosphere before said LD signals arrive at said data receiving station, (2) propagation of said LD signals through said troposphere before said LD signals arrive at said data receiving station, (3) receipt of multipath LD signals at said data receiving station, and (4) the presence of selective availability upon said LD signals that arrive at said data receiving station;

forming corrected LD signal segments g{$t_{k(m)}$,$t_{k(m+1)}$; j; ps}$_{cor}$={G(t,;j;ps)$_{cor}$=G(t,;j;ps)$_{unc}$+ΔG(t;j;rcv)| $t_{k(m)}$ ≦$t_r$≦$t_{k(m)+1}$} for a selected subset j=j1, ..., j=jP of P distinct integers from the set of integers j=1, ..., J, with 1≦P≦J;

determining computed LD signal segments g{$t_{k(m)}$,$t_{k(m+1)}$; j=jp; ps}$_{known}$={G(t,;j=jp;ps)$_{known}$|$t_{k(m)}$ ≦$t_r$≦$t_{k(m)+1}$} (p=1, ..., P) that should have been received at said data signal source, using the LD correction signals ΔG(t, j;rcv) and said asserted location of said data signal source;

forming LD signal segment differences $$\Delta(j; t_{k(m)}, t_{k(m+1)};ps)=F\{|G(t,;j;ps)_{known}-G(t,;j;ps)_{cor}|; t_{k(m)}, t_{k(m+1)}\}$$

for each of said LD signal sources numbered j=jp=j1, ..., jP, where F is a non-negative functional, defined on a sequence of non-negative values |v(t,)|(r=k(m), k(m)+1, ..., k(m+1), that is=0 only if the sequence of values |v(t,)| is identically zero; and determining that said asserted location of said data signal source is approximately the actual location of said data signal source only if the LD signal segment differences Δ(j; $t_{k(m)}$, $t_{k(m+1)}$;ps) are less than selected threshold values,

|Δ(jp; $t_{k(m)}$, $t_{k(m+1)}$;ps)|≦Δ(jp; $t_{k(m)}$, $t_{k(m+1)}$)$_{thr}$ for at least J1 of the numbers jp, where J1 is a positive integer that is ≦J, where Δ(j; $t_{k(m)}$, $t_{k(m+1)}$)$_{thr}$ (j=j1, ..., jP) are selected positive numbers.

14. The method of claim 4, wherein said step of receiving, at said data signal source a sequence of measurable LD signals comprises the steps of:

choosing as said LD signal sources a plurality of satellites that transmit at least one of (i) a set of Global Positioning System (GPS) signals as said LD signals or (ii) a set of Global Orbiting Navigational Satellite System (GLONASS) signals as said LD signals;

obtaining, at said data receiving station, said at least one segment of LD signal values g{$t_{k(m)}$,$t_{k(m+1)}$; j; ps}={G (t,; j; ps)|$t_{k(m)}$≦$t_r$≦$t_{k(m+1)}$} received at said data signal source from LD signal source number j=1, ..., J; J≧1), from said augmented data signal;

obtaining, at said data receiving station, a segment of LD signal values G(t,; j; rcv) from said LD signals received at said data receiving station from said LD signal sources;

despreading said LD signal values $G(t_r; j; ps)$ and $G(t_r; j; rcv)$ to remove any C/A-code signals and any P-code signals from said LD signal values and to form signal values $W(t_r; j; ps)$ and $W(t_r; j; rcv)$, respectively, that approximately represent W-code signal values for said LD signals received at said data signal source and at said data receiving station, respectively; and using said signals $W(t_r; j; ps)$ and $W(t_r; j; rcv)$ as said LD signals received at said data signal source and at said data receiving station, respectively.

15. The method of claim 14, further comprising the steps of:

forming a correlation function $$\chi(\Delta t; j) = \sum_r W(t_r; j; ps) W(t_r + \Delta t; j; rcv)$$

and estimating the set of values $\Delta t = \Delta t(\text{corr}, j)$ for which the correlation function $\chi(\Delta t, j)$ attains a local maximum;

estimating line-of-sight distances $d_{LOS}(t'k(m); j; ps)$ and $d_{LOS}(t''k(m); j; rcv)$ from said data signal source and from said data receiving station, respectively, to said LD signal source number j (j=1, ..., J; J≥1) at said location assertion time $t = t''_{k(m)}$, and forming a time difference $\Delta t(ps/rcv, j) = \{d_{LOS}(t''k(m); j; ps) - d_{LOS}(t''k(m); j; rcv)\}/c'$, where $c'$ is a selected velocity of propagation of electromagnetic signals in the atmosphere; and determining that said asserted location of said data signal source is approximately the actual location of said data signal source only when the value $\Delta t(ps/rcv; j)$ is approximately the same as at least one of the set of values $\Delta t(\text{corr}; j)$ for at least one of said LD signal sources numbered.

16. A method for authenticating the location of a source for a message transmitted from a data signal source to a data receiving station, the method comprising the steps of:

receiving, at a data signal source or putative source (ps), a data signal, defined at a sequence of two or more times and changing with time, and receiving measurable location determination (LD) signals from at least one LD signal sources at a sequence of two or more LD signal receipt times;

forming at the data signal source and transmitting to the data receiving station an encrypted augmented data signal, encrypted using a selected encryption algorithm $E(\Theta)$ that depends upon a selectable encryption parameter $\Theta$, that includes (1) a segment of data signal values, (2) at least one segment of LD signal values received between a selected first LD signal receipt time and a selected second LD signal receipt time, (3) the values of the selected first and second LD signal receipt times, (4) an indicium identifying the LD signal source for each segment of LD signal values included in the augmented data signal, and (5) an asserted location for the data signal source and an asserted data source location time for which this location is asserted, where the asserted data source location time lies in or near a range of times between the selected first and second LD signal receipt times, where the data receiving station is capable of receiving and decrypting an encrypted signal that uses the encryption algorithm $E(\Theta)$; and receiving the encrypted augmented data signal at the data receiving station, determining the encryption parameter $\Theta$ used to encrypt the encrypted augmented data signal, decrypting the encrypted augmented data signal, estimating a location of the data signal source from information contained in the augmented data signal, comparing the asserted location with the estimated location, and authenticating the asserted location of the data signal source only if the asserted location and the estimated location substantially agree with each other.

17. The method of claim 26, further comprising the steps of:

providing said LD signals from J LD signal sources, where J≥3;

providing said data receiving station with known location coordinates;

using said known location of said data receiving station and information from said encrypted augmented data signal to determine estimated location coordinates of said data signal source corresponding to said location assertion time;

comparing, at said data receiving station, said asserted location coordinates with the estimated location coordinates for said data signal source; and determining that asserted location of said data signal source is approximately the actual location of said data signal source only if said asserted location coordinates and the estimated location coordinates of said data signal source approximately agree with each other.

18. The method of claim 17, wherein said step of comparing said asserted location coordinates with said estimated location coordinates comprises the steps of:

forming a distance function $$S_s = \{a|x(t''_{k(m)}; ps) - x'(t''_{k(m)}; ps)|^s + b|y(t''_{k(m)}; ps) - y'(t''_{k(m)}; ps)|^s + c|z(t''_{k(m)}; ps) - z'(t''_{k(m)}; ps)|^s\}^{1/s},$$

where s is a selected positive parameter, where a, b and c are selected non-negative constants and at least one constant a, b and c is positive, where $(x(t''_{k(m)}; ps), y(t''_{k(m)}; ps), z(t''_{k(m)}; ps))$ are said asserted location coordinates of said data signal source, and where $(x'(t''_{k(m)}; ps), y'(t''_{k(m)}; ps), z'(t''_{k(m)}; ps))$ are said estimated location coordinates of said data signal source; and determining whether the distance function satisfies a relation $$S_s \leq S_{s,thr}$$

where $S_{s,thr}$ is a selected positive value.

19. The method of claim 17, further comprising the step of authenticating said asserted location of said data signal source only if said encrypted augmented data signal is received at said data receiving station within a time interval of a selected length after said at least one segment of LD signals is asserted to have been received by said data signal source.

20. The method of claim 19, further comprising the step of choosing said LD signals to be confidential signals.

21. The method of claim 20, further comprising the steps of:

choosing, as said LD signals, Global Positioning System (GPS) Y-code signals with signal values $Y(t''_r; j)$, transmitted by a GPS satellite numbered j (j=1, ... J; J≥1); and defining said LD signal values to be the signal values $Y(t'_r; j)$.

22. The method of claim 20, further comprising the steps of:

choosing as said J LD signal sources a group of J Global Positioning System (GPS) satellites that transmit GPS Y-code signals with signal values Y(t,j) having an associated frequency of f1;

defining a first set of LD signal values Y(t,;j;ps) to be the signal values Y(t",;j), as received at said data signal source from said LD signal source number j;

defining said LD signals [G(t,;j;ps)] to be the values of the signals $W(t_r;j;ps)=Y(t_r;j;ps) \oplus P(t_r;j;ps)$, where $\{P(t_r;j;ps)\}_r$ is a selected signal value sequence with an associated maximum frequency f1; and selecting the signal value sequence $\{P(t_r;j;ps)\}_r$ so that the signal $W(t_r;j;ps)=Y(t_r;j;ps) \oplus P(t_r;j;ps)$ has an associated maximum frequency f2 that is <<f1.

23. The method of claim 19, further comprising the steps of:

choosing, as said LD signals, Global Positioning System (GPS) P-code signals with signal values P(t,;j), transmitted by a GPS satellite numbered j (j=1, ..., J; J≧1); and defining said LD signal values to be the signal values P(t,;j).

24. The method of claim 19, further comprising the steps of:

choosing, as said LD signals, Global Positioning System (GPS) C/A-code signals with signal values C(t,;j), transmitted by a GPS satellite numbered j (j=1, ..., J; J≧1); and defining said LD signal values to be the signal values C(t,;j).

25. The method of claim 16, further comprising the steps of:

providing said data receiving station with known location coordinates;

providing said LD signals from said LD signal sources;

obtaining, at said data receiving station, LD correction signals ΔG(t;j;rcv), for uncorrected LD signals G(t;j;rcv)$_{unc}$ received at said data receiving station from said LD signal source number j (j=1, ..., J; J≧1), that approximately correct for time varying effects of at least one of (1) propagation of said LD signals through said ionosphere before said LD signals arrive at said data receiving station, (2) propagation of said LD signals through said troposphere before said LD signals arrive at said data receiving station, (3) receipt of multipath LD signals at said data receiving station, and (4) the presence of selective availability upon said LD signals that arrive at said data receiving station;

forming corrected LD signal segments g$\{t_{k(m)},t_{k(m+1)}$; j; ps$\}_{cor}=\{G(t_r;ps)_{cor}=G(t_r;j;ps)_{unc}+\Delta G(t;j;rcv)|t_{k(m)} \leq t_r \leq t_{k(m)+1}\}$ for said data signal source number j (j=1, ..., J; J≧1) and estimating corrected location coordinates (x'(t"$^{k(m)}$;ps)$_{cor}$, y'(t"$_{k(m)}$;ps)$_{cor}$, z'(t"$_{k(m)}$;ps)$_{cor}$) at said location assertion time t=t"$_{k(m)}$, based upon the corrected LD signal segments g$\{t_{k(m)},t_{k(m+1)}$; j; ps$\}_{cor}$; and the known location coordinates of said data receiving station;

comparing, at said data receiving station, asserted location coordinates (x(t"$_{k(m)}$;ps), y(t"$_{k(m)}$;ps), z(t"$_{k(m)}$;ps)) of said data signal source with estimated corrected location coordinates (x'(t"$_{k(m)}$;ps)$_{cor}$, y'(t"$_{k(m)}$;ps)$_{cor}$, z'(t"$_{k(m)}$;ps)$_{cor}$) of said data signal source; and determining that the asserted location of said data signal source is approximately the actual location of said data signal source only if said asserted location coordinates and the estimated corrected location coordinates [(x' (t"$_{k(m)}$;ps)$_{cor}$, y'(t"$_{k(m)}$;ps)$_{cor}$, z'(t"$_{k(m)}$;ps)$_{cor}$)] approximately agree with each other.

26. The method of claim 25, wherein said step of comparing, at said data receiving station, said asserted location coordinates (x(t"$_{k(m)}$;ps), y(t"$_{k(m)}$;ps), z(t"$_{k(m)}$;ps)) with said estimated corrected location coordinates (x'(t"$_{k(m)}$;ps)$_{cor}$, y'(t"$_{k(m)}$;ps)$_{cor}$, z'(t"$_{k(m)}$;ps)$_{cor}$) comprises the steps of:

forming a distance function $$S_s=\{a|x(t"_{k(m)};ps)-x'(t"_{k(m)};ps)|^s+b(y(t"_{k(m)};ps)-y'(t"_{k(m)};ps)_{cor}|^s+c|z(t"_{k(m)};ps)-z'(t"_{k(m)};ps)|^s\}^{1/s},$$

where s is a selected positive parameter, where a, b and c are selected non-negative constants and at least one constant a, b and c is positive; and determining whether the distance function satisfies a relation $$S_s \leq S_{s,thr},$$

where $S_{s,thr}$ is a selected positive value.

27. The method of claim 16, further comprising the steps of:

receiving, at said data receiving station, LD correction signals ΔG(t;j;rcv), for uncorrected LD signals G(t;j;rcv)$_{unc}$ received at said data receiving station from said LD signal source number j (j=1, ..., J; J≧1), that approximately correct for time varying effects of at least one of (1) propagation of said LD signals through said ionosphere before said LD signals arrive at said data receiving station, (2) propagation of said LD signals through said troposphere before said LD signals arrive at said data receiving station, (3) receipt of multipath LD signals at said data receiving station, and (4) the presence of selective availability upon said LD signals that arrive at said data receiving station;

forming corrected LD signal segments g$\{t_{k(m)},t_{k(m+1)}$; j; ps$\}_{cor}=\{G(t_r;j;ps)_{cor}=G(t_r;j;ps)_{unc}+\Delta G(t;j;rcv)|t_{k(m)} \leq t_r \leq t_{k(m)+1}\}$ for a selected subset j=j1, ..., j=jP of P distinct integers from the set of integers j=1, 2, ..., J, with 1≦P≦J;

determining computed LD signal segments g$\{t_{k(m)},t_{k(m+1)}$; j=jp; ps$\}_{known}=\{G(t_r;j=jp;ps)_{known}|t_{k(m)} \leq t_r \leq t_{k(m)+1}\}$ (P=1, ..., P) that should have been received at said data signal source, using the LD correction signals ΔG(t;j;rcv) and said asserted location [L(t"$_{k(m)}$;ps)] of said data signal source;

forming LD signal segment differences $$\Delta(j; t_{k(m)}, t_{k(m+1)};ps)=F\{|G(t_r;j;ps)_{known}-G(t_r;j;ps)_{cor}|; t_{k(m)}, t_{k(m+1)}\}$$

for each of said LD signal sources numbered j=jp=j1, ..., jP, where F is a non-negative functional, defined on a sequence of non-negative values |v(t$_r$)|(r=k(m), k(m)+1, ..., k(m+1), that is=0 only if the sequence of values |v(t$_r$)| is identically zero; and determining that said asserted location of said data signal source is approximately the actual location of said data signal source only if the LD signal segment differences Δj; t$_{k(m)}$, t$_{k(m+1)}$;ps) are less than selected threshold values, $$|\Delta(jp; t_{k(m)}, t_{k(m+1)};ps)| \leq \Delta(jp; t_{k(m)}, t_{k(m+1)})_{thr},$$

for at least J1 of the numbers jp, where J1 is a positive integer that is ≦J, where Δ(j;t$_{k(m)}$, t$_{k(m+1)}$)$_{thr}$ (=j1, ..., jP) are selected positive numbers.

28. The method of claim 27, further comprising the step of choosing said encryption parameter Θ so that Θ depends upon at least one of said time varying LD correction values ΔG(t;j;rcv) for a time t=t_Θ that lies in said time interval $t_{k(m)} \leq t_{73} \leq t_{k(m+1)}$.

29. The method of claim 16, wherein said step of receiving, at said data signal source a sequence of measurable LD signals comprises the steps of:

choosing as said LD signal sources a plurality of satellites, numbered j=1, . . . , J (J≧1) that transmit at least one of (i) a set of Global Positioning System signals as said LD signals or (ii) a set of Global Orbiting Navigational Satellite System signals as said LD signals;

obtaining, at said data receiving station, said at least one segment of LD signal values $g\{t_{k(m)}, t_{k(m+1)}; j; ps\} = \{G(t_r; j; ps) | t_{k(m)} \leq t_r \leq t_{k(m+1)}\}$ received at said data signal source, from said encrypted augmented data signal;

obtaining, at said data receiving station, a segment of LD signal values G(t_r; j; rcv) from said LD signals received at said data receiving station from said LD signal sources;

despreading said LD signal values G(t_r; j; ps) and G(t_r; j; rcv) to remove any C/A-code signals and any P-code signals from said LD signal values and to form signal values W(t_r; j; ps) and W(t_r; j; rcv), respectively, that approximately represent W-code signal values for said LD signals received at said data signal source and at said data receiving station, respectively; and using said signals W(t_r; j; ps) and W(t_r; j; rcv) as said LD signals received at said data signal source and at said data receiving station, respectively.

30. The method of claim 29, further comprising the steps of:

forming a correlation function $$\chi(\Delta t; j) = \sum_r W(t_r; j_{ps}) W(t_r + \Delta t; j; rcv)$$

and estimating the set of values Δt=Δt(corr;j) for which the correlation function χ(Δt,j) attains a local maximum;

estimating line-of-sight distances $d_{LOS}(t''_{k(m)}; j; ps)$ and $d_{LOS}(t''k(m); j; rcv)$ from said data signal source and from said data receiving station, respectively, to said LD signal source number j at said location assertion time $t = t''_{k(m)}$, and forming a time difference Δt(ps/rcv, j)={d_{LOS}(t"k(m);j;ps)−d_{LOS}(t"k(m);j;rcv)}/c', where c' is a selected velocity of propagation of electromagnetic signals in the atmosphere; and determining that said asserted location of said data signal source is approximately the actual location of said data signal source only when the value Δt(ps/rcv;j) is substantially the same as at least one of the set of values Δt(corr;j) for at least one of said LD signal sources.

31. A method for authenticating the location of a site where a software package is being used, the method comprising the steps of:

receiving at a computer station a segment of location determination (LD) signals with measurable LD signal values from at least three LD signal sources at a sequence of two or more LD signal receipt times, where the computer station is asserted to be located at one of N selected locations (N≧1) and includes a microprocessor, a computer memory, a transmitter, a receiver and a software package that requires a license for use of the software;

forming at the computer station and transmitting to a data receiving station an authentication signal that includes (1) a computer station indicium identifying the computer station that includes the software package, and (2) a segment of LD signals received at the computer station between a first selected time and a second selected time and the corresponding first and second selected times, for each of at least three distinct LD signal sources, and (4) an indicium identifying the LD signal source for the at least three segments of LD signal values included in the authentication signal;

receiving the authentication signal at the data receiving station, estimating a location of the computer station from information contained in the authentication signal, and comparing the estimated location with a list of N authorized locations, at which use of the software package is approved; and approving use of the software package at the computer station only when the distance between the estimated location and at least one of the N authorized locations is no greater than a selected threshold distance.

32. The method of claim 31, further comprising the steps of:

comparing said computer station indicium with an approved list of indicia for computer stations at which use of said software package is approved; and approving use of said software package at said computer station only if said computer station indicium appears on said approved list.

33. The method of claim 31, further comprising the step of disabling use of said computer station if use of said software at said computer station is not approved.

34. The method of claim 31, further comprising the step of authenticating said asserted location only if said augmented data signal is received at said data receiving station within a time interval of a selected length after said segment of said LD signals is asserted to have been received by said computer station.

35. A method for authenticating the location of a site where a vote is cast by a voting station user, the method comprising the steps of:

receiving at a computer station a segment of location determination (LD) signals with measurable LD signal values from at least three LD signal sources at a sequence of two or more LD signal receipt times, where the computer station is asserted to be located at one of N selected locations (N≧1) and includes a microprocessor, a computer memory, a transmitter, a receiver and a voter module that allows a voter to cast a vote on a designated election issue;

forming at the computer station and transmitting to a data receiving station an authentication signal that includes (1) a computer station indicium identifying the computer station that includes the software package, and (2) a segment of LD signals received at the computer station between a first selected time and a second selected time and the corresponding first and second selected times, for each of at least three distinct LD signal sources, and (4) an indicium identifying the LD signal source for the at least three segments of LD signal values included in the authentication signal;

receiving the location authentication signal at the data receiving station, estimating a location of the computer station from information contained in the authentication signal, and comparing the estimated location with a list of N authorized locations, at which casting a vote upon the designated election issue is approved; and accumulating the vote cast by the voter at the computer station only when the distance between the estimated location and at least one of the N authorized locations is no greater than a selected threshold distance.

36. The method of claim 35, further comprising the steps of:

comparing said computer station indicium with an approved list of indicia for computer stations at which votes may be cast on said designated election issue; and accumulating the vote cast by the voter at said computer station, with other votes cast by other voters on the designated election issue, only if said computer station indicium appears on said approved list.

37. The method of claim 35, further comprising the step of disabling use of said computer station if use of said computer station for casting votes on said designated election issue is not approved.

38. The method of claim 35, further comprising the step of authenticating said asserted location only if said augmented data signal is received at said data receiving station within a time interval of a selected length after said segment of said LD signals is asserted to have been received by said computer station.

39. The method of claim 35, further comprising the steps of:

including in said authentication signal an indicium identifying said voter;

comparing said voter's indicium with an approved list of voter indicia on said designated election issue; and accumulating the vote cast by the voter at the computer station, with other votes cast by other voters on the designated election issue, only if said voter's indicium appears on this approved list of voter indicia.

40. A system for authenticating the location of a source for a message transmitted from a data signal source to a data receiving station, the apparatus comprising:

a data signal source or putative source, having a data signal defined at a sequence of two or more times and changing with time, and having the capacity to transmit the data signal to a data receiving station, where the data signal source receives measurable location determination (LD) signals from at least one LD signal source at a sequence of two or more LD signal receipt times;

where the data signal source forms and transmits to a data receiving station an augmented data signal that includes (1) a segment of data signal values, (2) at least one segment of LD signal values received between a selected first LD signal receipt time and a selected second LD signal receipt time, (3) the values of the selected first and second LD signal receipt times, (4) an indicium identifying the LD signal source for each segment of LD signal values included in the augmented data signal, and (5) an asserted location for the data signal source and an asserted data source location time for which this location is asserted, where the asserted data source location time lies in or near a range of times between the selected first and second LD signal receipt times; and a data receiving station having the capacity to receive the augmented data signal, estimate a location of the data signal source from information contained in the augmented data signal, compare the asserted location with the estimated location, and authenticate the asserted location of the data signal source only if the asserted location and the estimated location substantially agree with each other.

41. A system for authenticating the location of a source for a message transmitted from a data signal source to a data receiving station, the apparatus comprising:

a data signal source or putative source, having a data signal defined at a sequence of two or more times and changing with time, and having the capacity to transmit the data signal to a data receiving station, where the data signal source receives measurable location determination (LD) signals from at least one LD signal source at a sequence of two or more LD signal receipt times;

where the data signal source forms and transmits to a data receiving station an augmented data signal that includes (1) a segment of data signal values, (2) at least one segment of LD signal values received between a selected first LD signal receipt time and a selected second LD signal receipt time, (3) the values of the selected first and second LD signal receipt times, (4) an indicium identifying the LD signal source for each segment of LD signal values included in the augmented data signal, and (5) an asserted location for the data signal source and an asserted data source location time for which this location is asserted, where the asserted data source location time lies in or near a range of times between the selected first and second LD signal receipt times;

a data receiving station having the capacity to receive the augmented data signal, to receive LD signals from at least one selected LD signal source for which a segment of LD signal values is included in the augmented data signal, to estimate a segment of LD signal values that should have been received at the data signal source between the selected first and second LD signal receipt times, for the at least one selected LD signal source, to compare the estimated segment of LD signal values with the segment of LD signal values contained in the augmented data signal for the at least one selected LD signal source, and to authenticate the asserted location of the data signal source only if the estimated segment of LD signal values and the segment of LD signal values contained in the augmented data signal for the at least one selected LD signal source approximately agree with each other.

42. The method of claim 6, further comprising the steps of:

choosing, as said LD signals, Global Positioning System (GPS) Y-code signals with signal values $Y(t'',j)$ received from a GPS satellite numbered j (j=1, ..., J; J≧1); and defining said LD signal values to be the signal values $Y(t'',j)$.

* * * * *